(12) United States Patent
Redman

(10) Patent No.: US 10,046,926 B2
(45) Date of Patent: Aug. 14, 2018

(54) PALLET DISPENSER AND METHOD THEREOF

(71) Applicant: Paul W. Redman, London (CA)

(72) Inventor: Paul W. Redman, London (CA)

( * ) Notice: Subject to any disclaimer, the term of this patent is extended or adjusted under 35 U.S.C. 154(b) by 158 days.

(21) Appl. No.: 14/331,705

(22) Filed: Jul. 15, 2014

(65) Prior Publication Data

US 2015/0023773 A1 Jan. 22, 2015

Related U.S. Application Data

(63) Continuation-in-part of application No. 14/200,772, filed on Mar. 7, 2014, now Pat. No. 9,181,047, which is a continuation-in-part of application No. PCT/IB2014/059533, filed on Mar. 7, 2014.

(60) Provisional application No. 61/847,010, filed on Jul. 16, 2013.

(51) Int. Cl.
| | |
|---|---|
| *B65G 59/00* | (2006.01) |
| *B65H 3/30* | (2006.01) |
| *G07F 11/16* | (2006.01) |
| *B65G 59/06* | (2006.01) |

(52) U.S. Cl.
CPC .... *B65G 59/063* (2013.01); *B65G 2201/0267* (2013.01)

(58) Field of Classification Search
CPC .............. B65G 59/063; B65G 2201/0267
USPC ................. 221/1, 297; 206/531, 538, 534; 414/798.1, 798.4
See application file for complete search history.

(56) References Cited

U.S. PATENT DOCUMENTS

| | | | | |
|---|---|---|---|---|
| 3,623,618 A | | 11/1971 | Shaw | |
| 3,757,971 A | * | 9/1973 | Frish | B65G 57/00 414/797.5 |
| 4,624,616 A | * | 11/1986 | Freese | B65G 59/066 221/251 |
| 4,701,092 A | * | 10/1987 | Reynaud | B65G 59/063 221/251 |
| 4,960,362 A | * | 10/1990 | Karpisek | B65G 59/063 414/797.4 |
| 4,964,782 A | * | 10/1990 | DeCrane | B65G 59/063 414/798.1 |
| 5,020,966 A | | 6/1991 | Kiker | |

(Continued)

FOREIGN PATENT DOCUMENTS

| | | | | |
|---|---|---|---|---|
| CA | 2215759 A1 | * | 3/1999 | B65G 57/303 |
| GB | 1201836 A | | 8/1970 | |

(Continued)

OTHER PUBLICATIONS

Office Action, corresponding U.S. Appl. No. 14/200,772; notification date Apr. 13, 2015.

(Continued)

*Primary Examiner* — Rakesh Kumar
(74) *Attorney, Agent, or Firm* — Tarolli, Sundheim, Covell & Tummino LLP

(57) ABSTRACT

A method for dispensing pallets, comprising: moving a pallet stack held in a movable frame from a pallet-storage position to a pallet-dispensation position including: raising the pallet stack held in the movable frame, the movable frame being configured to be moved between the pallet-storage position and the pallet-dispensation position once the pallet stack is raised; and dispensing a pallet from the movable frame.

8 Claims, 45 Drawing Sheets

(56) References Cited

U.S. PATENT DOCUMENTS

| | | | | |
|---|---|---|---|---|
| 5,033,935 A * | 7/1991 | Decrane | ................ | B65G 59/063 414/798.1 |
| 5,276,957 A * | 1/1994 | Murphy | ................ | B29C 31/00 118/64 |
| 5,480,280 A * | 1/1996 | Bordon | ................ | B65G 59/062 221/292 |
| 5,575,613 A * | 11/1996 | Lierop | ................ | B65G 59/066 414/797.4 |
| 6,045,324 A * | 4/2000 | Redman | ................ | B65G 57/302 414/788.9 |
| 6,139,254 A | 10/2000 | Ouellette | | |
| 6,632,067 B1 * | 10/2003 | Ouellette | ............ | B65G 59/062 414/788 |
| 7,673,743 B2 * | 3/2010 | Ruff | ................ | B65H 29/34 198/861.4 |
| 8,267,637 B2 * | 9/2012 | Ouellette | ............ | B65G 47/22 198/836.3 |
| 2004/0146390 A1 * | 7/2004 | Lancaster | ............ | B65G 57/03 414/797.4 |
| 2010/0119348 A1 * | 5/2010 | Snapp | ................ | B65G 57/00 414/798.1 |
| 2015/0023773 A1 * | 1/2015 | Redman | ............ | B65G 59/063 414/797.5 |

FOREIGN PATENT DOCUMENTS

| | | | | |
|---|---|---|---|---|
| WO | | 9809898 | 3/1998 | |
| WO | WO 9809898 A1 * | | 3/1998 | ........... B65G 59/063 |

OTHER PUBLICATIONS

Notice of Allowance and Fee(s) Due; corresponding U.S. Appl. No. 14/200,772; dated Jul. 22, 2015.

Office Action, corresponding U.S. Appl. No. 14/200,772; dated Dec. 31, 2014.

<http://dngroup.dk/>; retrieved on May 30, 2014.

<http://www.eqm.co.nz/shop/New+Product+Range/Materials+Handling/EQM+Pallet+Dispensers.html>; retrieved on May 30, 2014.

<http://www.palletdispenser.com/?gclid=COLojczZqbcCFYU-Mgod7gQAiw>; retrieved on May 30, 2014.

<http://www.palomat.com/palletmagazine/stand-alone.aspx>; retrieved on May 30, 2014.

<http://www.palletizing.com/products/accessories/pallet-dispensers>; retrieved on May 30, 2014.

International Search Report and Written Opinion; International application No. PCT/IB2014/059533; dated Jun. 13, 2014.

* cited by examiner

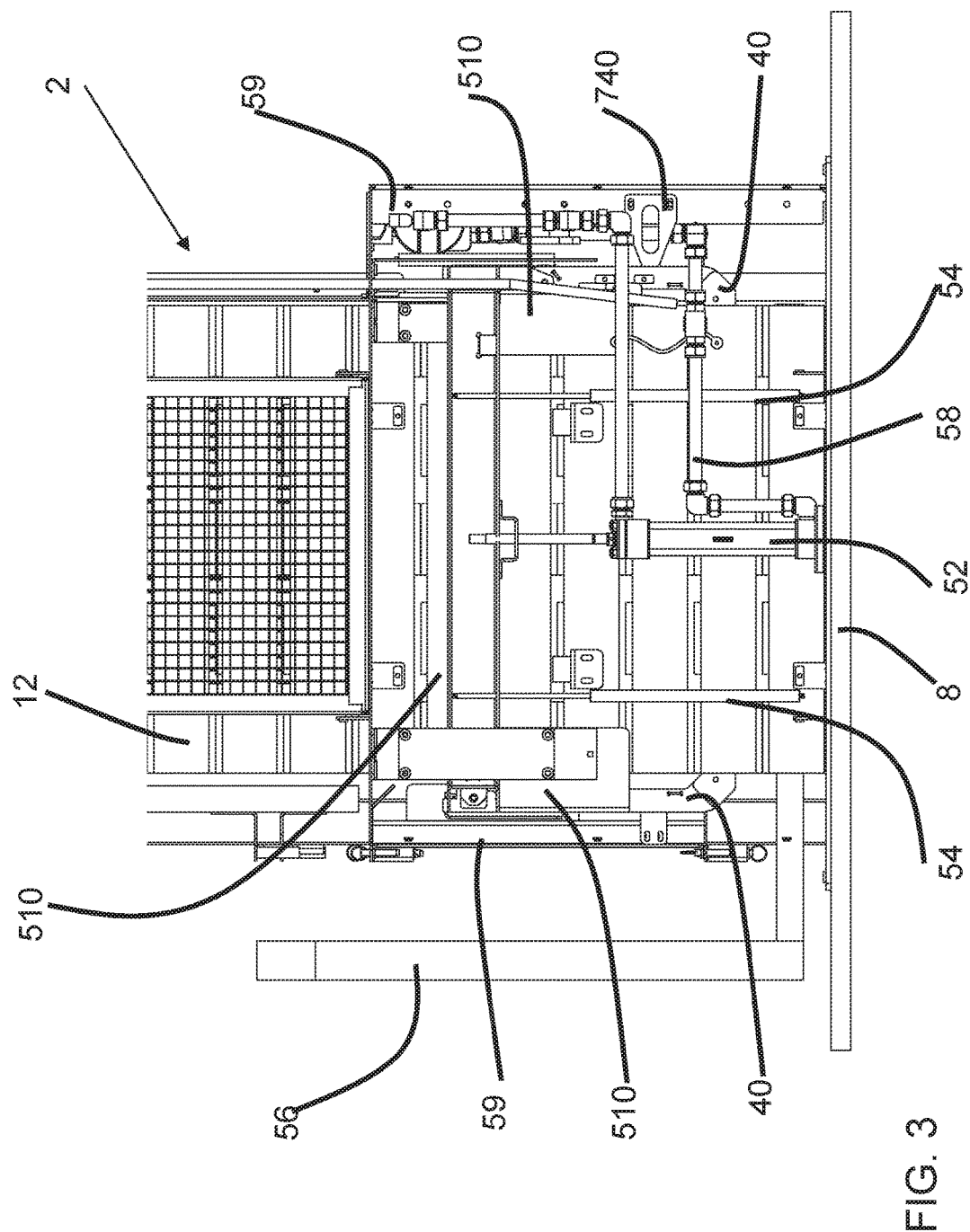

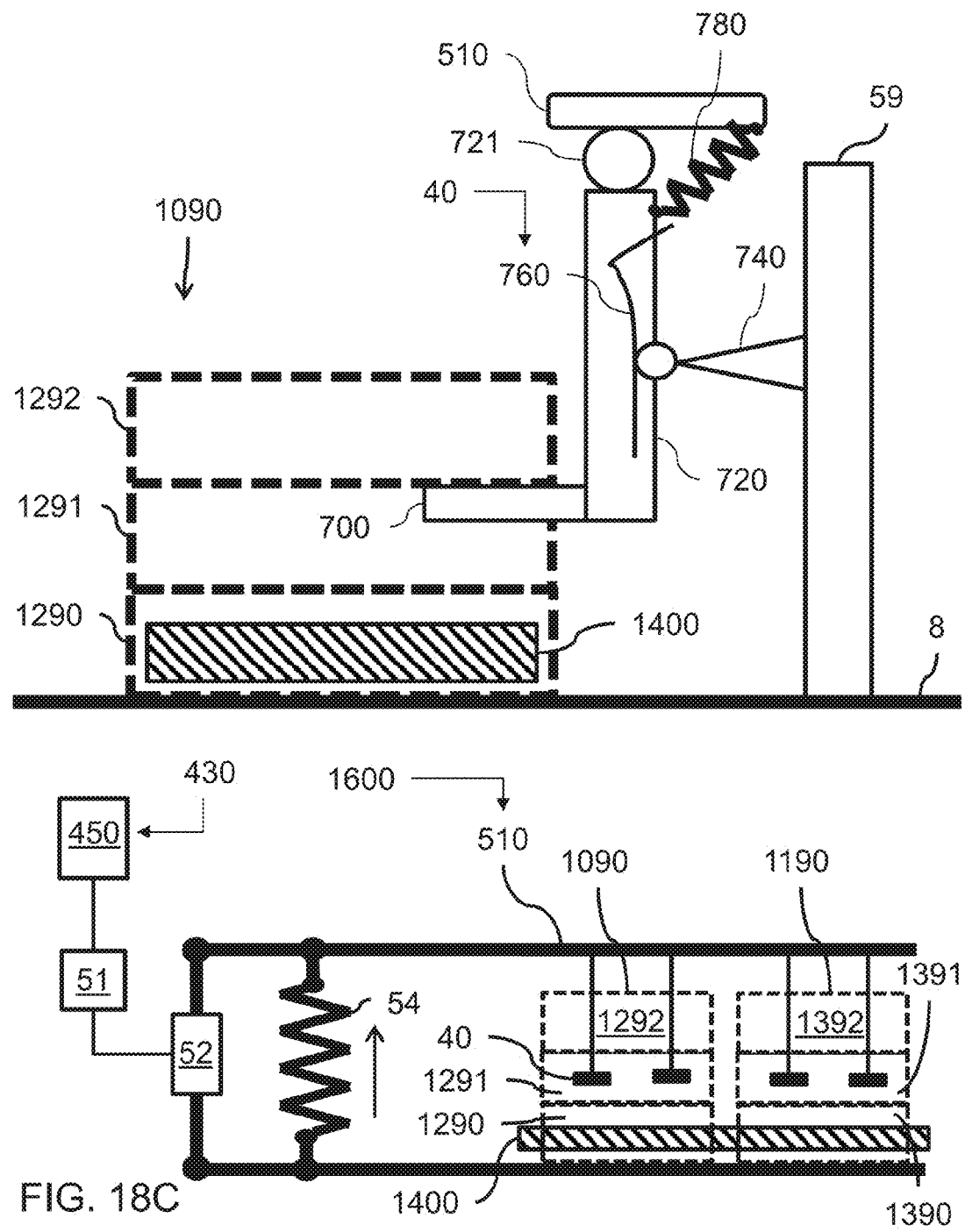

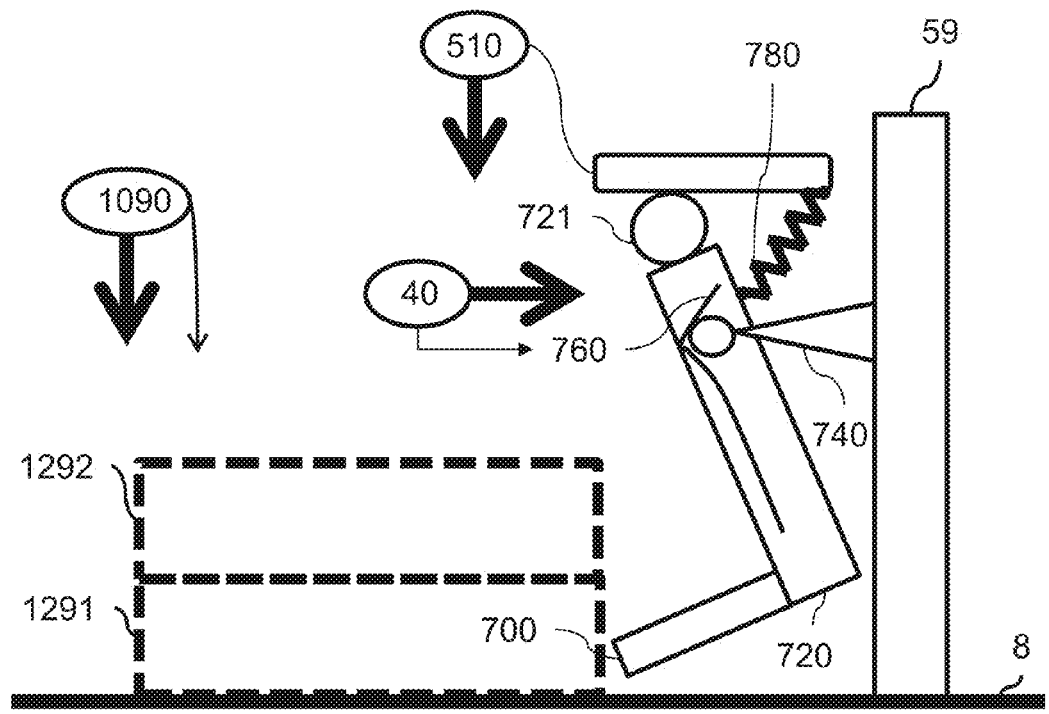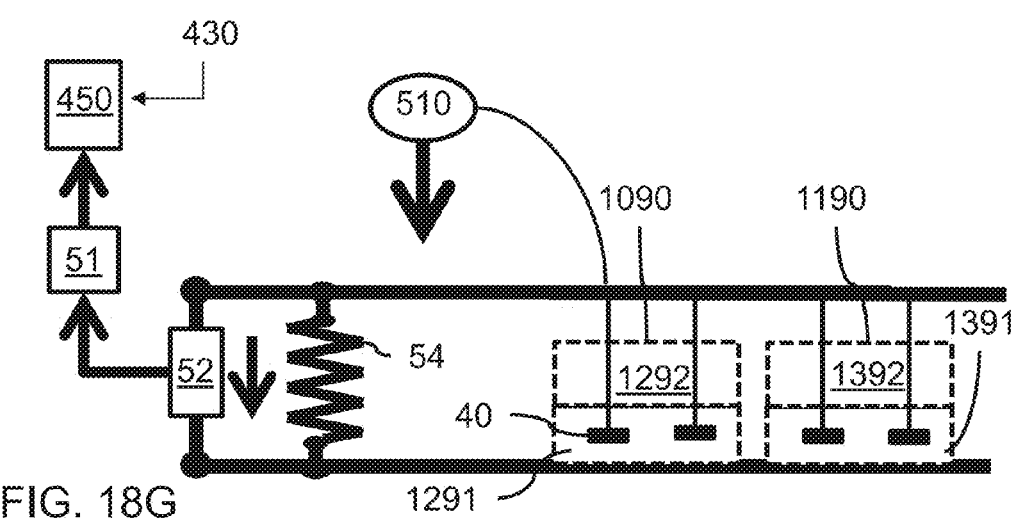
FIG. 18G

PALLET DISPENSER AND METHOD THEREOF

CROSS-REFERENCE TO RELATED APPLICATIONS

This application is a continuation-in-part of U.S. application Ser. No. 14/200,772 filed Mar. 7, 2014, which, in turn, claims the benefit of U.S. provisional application Ser. No. 61/847,010 filed Jul. 16, 2013, the disclosures of which are hereby incorporated in their entirety by reference herein. This application directly claims benefit of U.S. provisional application Ser. No. 61/847,010 filed Jul. 16, 2013. This application is also a continuation-in-part of International application No. PCT/IB2014/059533 filed Mar. 7, 2014 which claims benefit of U.S. provisional application Ser. No. 61/847,010 filed Jul. 16, 2013.

TECHNICAL FIELD

Aspects generally relate to apparatus and method for dispensing pallets.

BACKGROUND

A pallet dispenser dispenses one or more pallets from a pallet stack onto a work surface. In an automated environment, this work surface may be a chain conveyor. In other environments, the one or more pallets may be dispensed onto the floor. In these environments, a pallet transporter such as a pallet truck, pallet jack, or forklift can be used to collect and move the one or more dispensed pallets.

Pallet dispensers are generally powered and require a connection to a power source. For instance, pallet dispensers may require motors or pumps that must be powered by an external power source. Examples of external power sources (for powering or energizing the pallet dispenser) might include electrical utility grids, generators, steam, hydraulic pressure or compressed air, etc.

In some environments, however, providing power to the pallet dispenser may be difficult or expensive. For example, deploying a pallet dispenser may require modifications to the power layout of the facility. In other scenarios it may be prohibitively expensive to deliver power to the optimal installation location of the pallet dispenser. In yet another scenario, the reliability of power delivery may prevent the use of a powered pallet dispenser.

SUMMARY

What is provided are systems, apparatuses, and methods for an unpowered pallet dispenser. The power grid-independent, or unpowered, pallet dispenser of the present disclosure uses input provided by the pallet transporter to dispense pallets.

The pallet dispenser of the present disclosure may be deployed in an environment where pallets are used without the need to route power to the pallet dispenser's location. This may reduce the cost of deploying and/or operating a pallet dispenser since altering the power layout of a facility is not required.

The present disclosure also allows for deployment in environments where a power source, such as an electrical utility grid, may be unreliable or non-existent. This is because the presently disclosed pallet dispenser uses input provided by the pallet transporter to dispense pallets.

Known pallet dispenser machines are configured to hold a stack of pallets, typically about fifteen pallets high and some up to about twenty five pallets high. The known pallet dispensers are electrically powered, and they are configured to automatically dispense a single pallet onto a chain conveyor for automated systems, or to dispense a pallet onto the floor, etc. An advantage of dispensing a pallet onto the floor is the pallet can then be removed using a pallet truck or a pallet jack. The usage of the pallet trucks verses a forklift in picking warehouses is because of their cost and operator ergonomics. There are many known pallet dispensers on the market today, and they all require electrical power, and/or electrical power in combination with air power or hydraulic power to provide the force necessary (essential) to achieve the dispensing function (to dispense a pallet from a pallet stack) and to raise or lower the pallet stack Typically, there is a cost for installing electrical services to the warehouse location where the known pallet dispenser is to be installed.

In order to mitigate, at least in part, the problem(s) identified above, in accordance with an aspect, there is provided an apparatus, comprising: a pallet dispensing system, including: a movable frame being configured to movably hold, at least in part, a pallet stack between a pallet-storage position and a pallet-dispensation position, and the movable frame also being configured to hold the pallet stack relative to a pallet transporter in such a way that the pallet transporter is permitted to vertically lift, at least in part, the pallet stack as the movable frame is provided, at least in part, with vertical-lift assistance through stored potential energy.

In order to mitigate, at least in part, the problem(s) identified above, in accordance with another aspect, there is provided an apparatus including a pallet dispensing system. The pallet dispensing system includes a movable frame configured to movably hold, at least in part, a pallet stack between a pallet-storage position and a pallet-dispensation position. The movable frame is also configured to hold a pallet of the pallet stack relative to a pallet transporter in such a way that the pallet transporter is permitted to vertically lift the pallet stack and allow the movable frame to travel upwards.

In order to mitigate, at least in part, the problem(s) identified above, in accordance with an aspect, there is provided a pallet dispensing system including a movable frame configured to movably hold, at least in part, a pallet stack between a pallet-storage position and a pallet-dispensation position. The movable frame is also configured to hold a pallet of the pallet stack relative to a pallet transporter in such a way that the pallet transporter is permitted to vertically lift the pallet stack allowing the movable frame to travel upwards. The pallet dispensing system also includes a dampening device configured to dampen, at least in part, free-fall descent of the movable frame under influence of gravity from the pallet-storage position toward the pallet-dispensation position. Since the transporter lifts the pallet stack, a taller instance of the pallet stack may be possible.

In order to mitigate, at least in part, the problem(s) identified above, in accordance with an aspect, the pallet dispensing system is adapted such that the movable frame is configured to movably hold the pallet stack having the pallet between the pallet-storage position and the pallet-dispensation position without consuming electrical energy, and the dampening device is configured to dampen free-fall descent of the movable frame under influence of gravity from the pallet-storage position toward the pallet-dispensation position without consuming electrical energy.

In order to mitigate, at least in part, the problem(s) identified above, in accordance with an aspect, there is provided, by way of example, the dampening device that includes a hydraulic cylinder configured to cooperate with a hydraulic reservoir.

In order to mitigate, at least in part, the problem(s) identified above, in accordance with an aspect, there is provided the pallet dispensing system that further includes a raising device being configured to move the movable frame away from the pallet-dispensation position toward the pallet-storage position without consuming electrical energy.

In order to mitigate, at least in part, the problem(s) identified above, in accordance with an aspect, there is provided, by way of example, the raising device that includes a spring assembly being configured to apply, at least in part, an amount of mechanical kinetic energy being converted, at least in part, from an amount of mechanical potential energy to the movable frame in such a way that application, at least in part, of the amount of mechanical kinetic energy to the movable frame urges, at least in part, movement of the movable frame away from the pallet-dispensation position toward the pallet-storage position.

In order to mitigate, at least in part, the problem(s) identified above, in accordance with an aspect, there is provided a pallet dispensing system, including a movable frame being configured to: be non-electrically powered in such a way as to operate without consuming electrical energy; selectively latch with a pallet stack having a pallet between an unlatched state and a latched state; and movably hold, at least in part, the pallet stack between a pallet-storage position and a pallet-dispensation position once the movable frame and the pallet stack are latched together. The pallet dispensing system also includes a dampening device being configured to: be non-electrically powered in such a way as to operate without consuming electrical energy; operatively couple to the movable frame; and slow down free-fall descent of the movable frame under the influence of gravity from the pallet-storage position toward the pallet-dispensation position for the case where the movable frame becomes unlatched from the pallet stack, and the movable frame is free to descend under the influence of gravity from the pallet-storage position toward the pallet-dispensation position.

In order to mitigate, at least in part, the problem(s) identified above, in accordance with an aspect, there is provided, by way of example, the raising device that includes a counterweight assembly configured to: store the amount of mechanical potential energy; and convert the amount of mechanical potential energy to the amount of mechanical kinetic energy.

In order to mitigate, at least in part, the problem(s) identified above, in accordance with an aspect, there is provided a method of operating a pallet dispensing system, including dampening, at least in part, free-fall descent of the pallet stack under the influence of gravity from the pallet-storage position toward the pallet-dispensation position without consuming electrical energy.

In order to mitigate, at least in part, the problem(s) identified above, in accordance with an aspect, there is provided a method for dispensing pallets, comprising: moving a pallet stack held in a movable frame from a pallet-storage position to a pallet-dispensation position including: raising the pallet stack held in the movable frame, the movable frame being configured to be moved between the pallet-storage position and the pallet-dispensation position once the pallet stack is raised; and dispensing a pallet from the movable frame.

In order to mitigate, at least in part, the problem(s) identified above, in accordance with an aspect, there is provided the method that further includes movably holding, at least in part, a pallet stack between a pallet-storage position and a pallet-dispensation position without consuming electrical energy.

In order to mitigate, at least in part, the problem(s) identified above, in accordance with an aspect, there is provided a method for dispensing pallets, comprising: moving a pallet stack held in a movable frame from a pallet-dispensation position to a pallet-storage position including: raising the pallet stack held in the movable frame, the movable frame being configured to be moved between the pallet-dispensation position and the pallet-storage position once the pallet stack is raised; and dispensing a pallet from the movable frame.

In order to mitigate, at least in part, the problem(s) identified above, in accordance with an aspect, there is provided a method of establishing a vertical pallet stack and dispensing at least one pallet from a bottom end of the vertical pallet stack, the method comprising: receiving, in the vertical pallet stack, a plurality of individual pallets in overlying relationship; supporting a pallet dispensed from the bottom end of the vertical pallet stack on a support surface in overlying relationship to a remainder of the vertical pallet stack; supporting the remainder of the vertical pallet stack above the support surface at a support position; lifting the remainder of the vertical pallet stack from the support position to an elevated position; supporting the remainder of the vertical pallet stack at the elevated position; removing a dispensed pallet so that the dispensed pallet is no longer in overlying relationship with the remainder of the vertical pallet stack; allowing the remainder of the vertical pallet stack to fall from the elevated position towards the support surface under the influence of gravity after removing the dispensed pallet; dampening the fall of the remainder of the vertical pallet stack towards the support surface; dispensing a lower most pallet from the bottom end of the remainder of the vertical pallet stack; supporting the dispensed lower most pallet on the support surface; lifting an un-dispensed remainder of the vertical pallet stack after the step of dispensing to the support position; and supporting the un-dispensed remainder of the vertical pallet stack at the support position after lifting the un-dispensed remainder of the vertical pallet stack after dispensing to the support position.

In order to mitigate, at least in part, the problem(s) identified above, in accordance with an aspect, there is provided a method of operating a pallet dispensing system, comprising: holding a pallet stack relative to a pallet transporter in such a way that the pallet transporter is permitted to vertically lift, at least in part, the pallet stack and a movable frame being configured to movably hold, at least in part, the pallet stack, from a pallet-dispensation position toward a pallet-storage position as the movable frame is provided, at least in part, with vertical-lift assistance through stored potential energy; and automatically vertically descending the movable frame from the pallet-storage position toward the pallet-dispensation position in response to the pallet transporter withdrawing, at least in part, vertical support to the movable frame.

In order to mitigate, at least in part, the problem(s) identified above, in accordance with an aspect, there is provided an apparatus, comprising: a pallet dispensing system, including: a movable frame being configured to movably hold, at least in part, a pallet stack between a pallet-dispensation position toward a pallet-storage position; the movable frame also being configured to hold the pallet stack relative to a pallet transporter in such a way that the pallet transporter is permitted to vertically lift, at least in part, the pallet stack and the movable frame from a pallet-dispensation position toward a pallet-storage position as the movable frame is provided, at least in part, with vertical-lift assistance through stored potential energy; and the movable frame also being configured to automatically vertically descend from the pallet-storage position toward the pallet-dispensation position in response to the pallet transporter withdrawing, at least in part, vertical support to the movable frame.

In order to mitigate, at least in part, the problem(s) identified above, in accordance with an aspect, there is provided other aspects as identified in the claims.

Other aspects and features of the non-limiting embodiments may now become apparent to those skilled in the art upon review of the following detailed description of the non-limiting embodiments with the accompanying drawings.

BRIEF DESCRIPTION OF THE DRAWINGS

The non-limiting embodiments (examples) may be more fully appreciated by reference to the following detailed description of the non-limiting embodiments when taken in conjunction with the accompanying drawings, in which:

FIG. 3 is cross-sectional view of an embodiment of the pallet dispenser;

FIGS. 18A to 18H depict examples of the operations sequences of the multi-stack pallet dispensing apparatus 1600 of FIG. 16.

Figure 1:
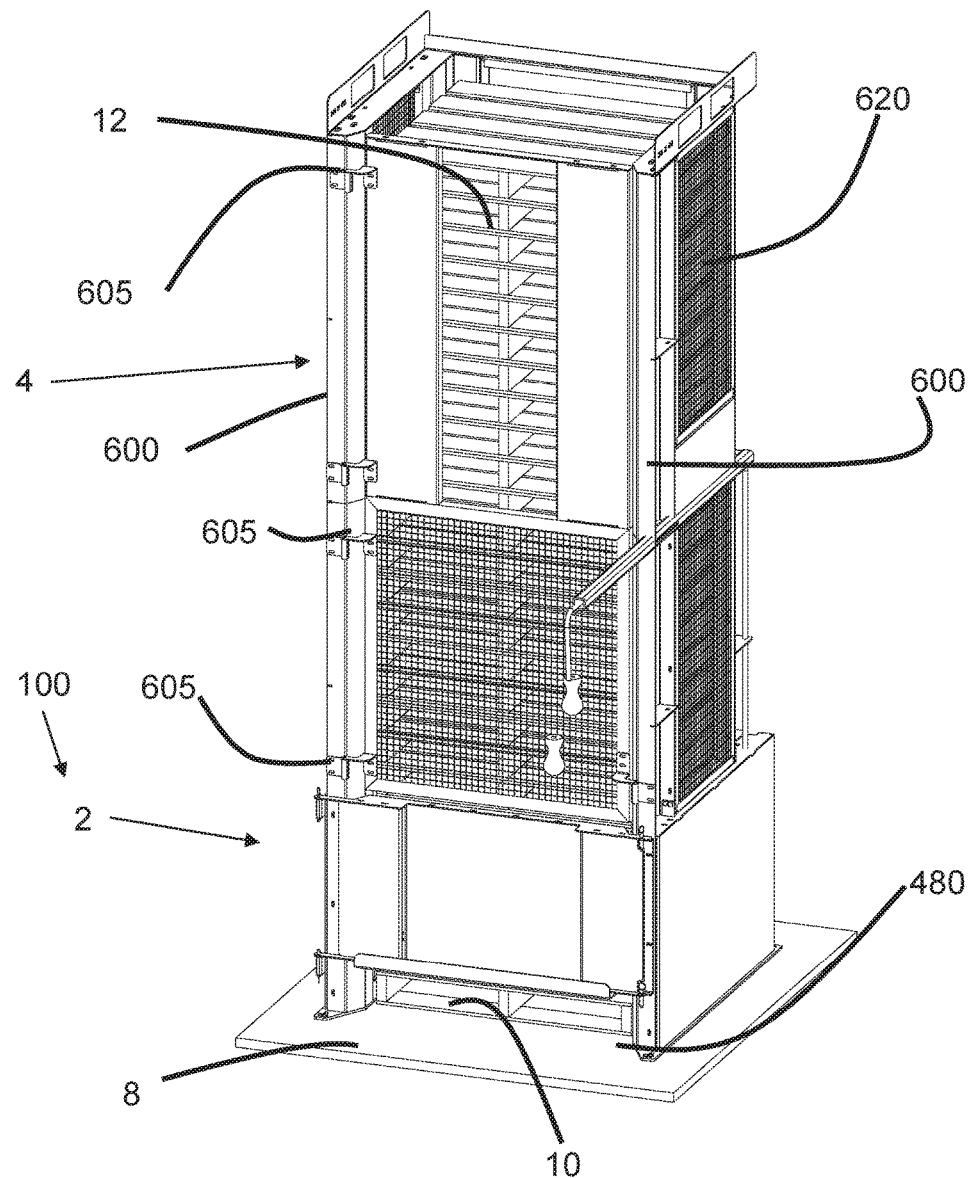
FIG. 1 is a perspective view of an embodiment of the pallet dispenser.

The drawings are not necessarily to scale and may be illustrated by phantom lines, diagrammatic representations and fragmentary views. In certain instances, details not necessary for an understanding of the embodiments (and/or details that render other details difficult to perceive) may have been omitted.

Corresponding reference characters indicate corresponding components throughout the several figures of the Drawings. Elements in the several figures are illustrated for simplicity and clarity and have not necessarily been drawn to scale. For example, the dimensions of some of the elements in the figures may be emphasized relative to other elements for facilitating understanding of the various presently disclosed embodiments. In addition, common, but well-understood, elements that are useful or necessary in commercially feasible embodiments are often not depicted in order to facilitate a less obstructed view of the various embodiments of the present disclosure.

LISTING OF REFERENCE NUMERALS USED IN THE DRAWINGS 2 pallet dispenser, or unpowered pallet dispenser
4 pallet-stack enclosure
8 work surface
10 pallet
11 pallet
12 pallet stack
13 pallet
14 gates
15 pallet
16 doors
17 pallet
18 bar
18 pipe
19 pallet
21 pallet
30 raised position
30 raised state
32 lowered position
32 lowered state
34 position
34 raised position
40 latch or latches or securing mechanism
51 hydraulic valve
52 hydraulic cylinder, or telescoping hydraulic cylinder
54 spring assembly
55 pallet moving assembly
56 pallet transporter
58 hydraulic circuit
59 stationary support frame
100 pallet dispensing system
100 unpowered pallet dispensing system 430 closed-loop hydraulic circuit
450 hydraulic reservoir
480 front opening
480 opening
490 hinge, or hinges
495 cotter pins
510 movable frame
600 support, or supports
605 hinges
610 pallet-enclosing assembly
620 mesh walls
630 solid walls
700 dog, or dogs (bars)
710 spring-loaded latch assembly
720 arm, or arms, or cam arm
721 cam pivot
730 hinge
740 cam roller, or cam rollers
760 cam follower, or cam followers
780 cam spring
790 counterweight assembly
800 detection assembly
810 actuator
820 limit switch assembly
1000 locking-restraint apparatus
1100 spring-loaded restraints
1200 spring
1300 restraint

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of the description herein, the terms "upper," "lower," "left," "rear," "right," "front," "vertical," "horizontal," and derivatives thereof shall relate to the examples as oriented in the drawings. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments (examples), aspects and/or concepts defined in the appended claims. Hence, specific dimensions and other physical characteristics relating to the embodiments disclosed herein are not to be considered as limiting, unless the claims expressly state otherwise. It is understood that "at least one" is equivalent to "a".

FIG. 1 depicts a perspective view of an example of the pallet dispenser 2.

FIGS. 2A to 2G depict cross-sectional views of example stages of the pallet dispenser 2 of FIG. 1 in operation.

FIG. 3 depicts a cross-sectional view of the pallet dispenser 2 of FIG. 1.

Examples of a pallet dispensing system 100 of the present disclosure are shown in FIGS. 1 to 3.

Referring to FIG. 1, there is depicted the pallet dispenser 2, a pallet-stack enclosure 4, a work surface 8, a pallet 10, a pallet stack 12, an opening 480, supports 600, hinges 605, and mesh walls 620.

In this example, the pallet dispensing system comprises a pallet dispenser 2, a pallet transporter 56, and a pallet-stack enclosure 4. The pallet dispenser 2 can be configured to be used with any typically constructed pallet such as a two-way pallet or a four-way pallet (also known as the CHEP pallet). The pallet dispenser 2 can also be configured to be used with different kinds of surfaces used for transporting loads. For example, in some environments flat boards are used like pallets, and the pallet dispenser 2 can be used to dispense these flat boards.

FIGS. 2A to 2G depict examples of a dispensing cycle for dispensing pallets from the pallet dispensing system 100 of FIG. 1.

Figures 2A, 12:
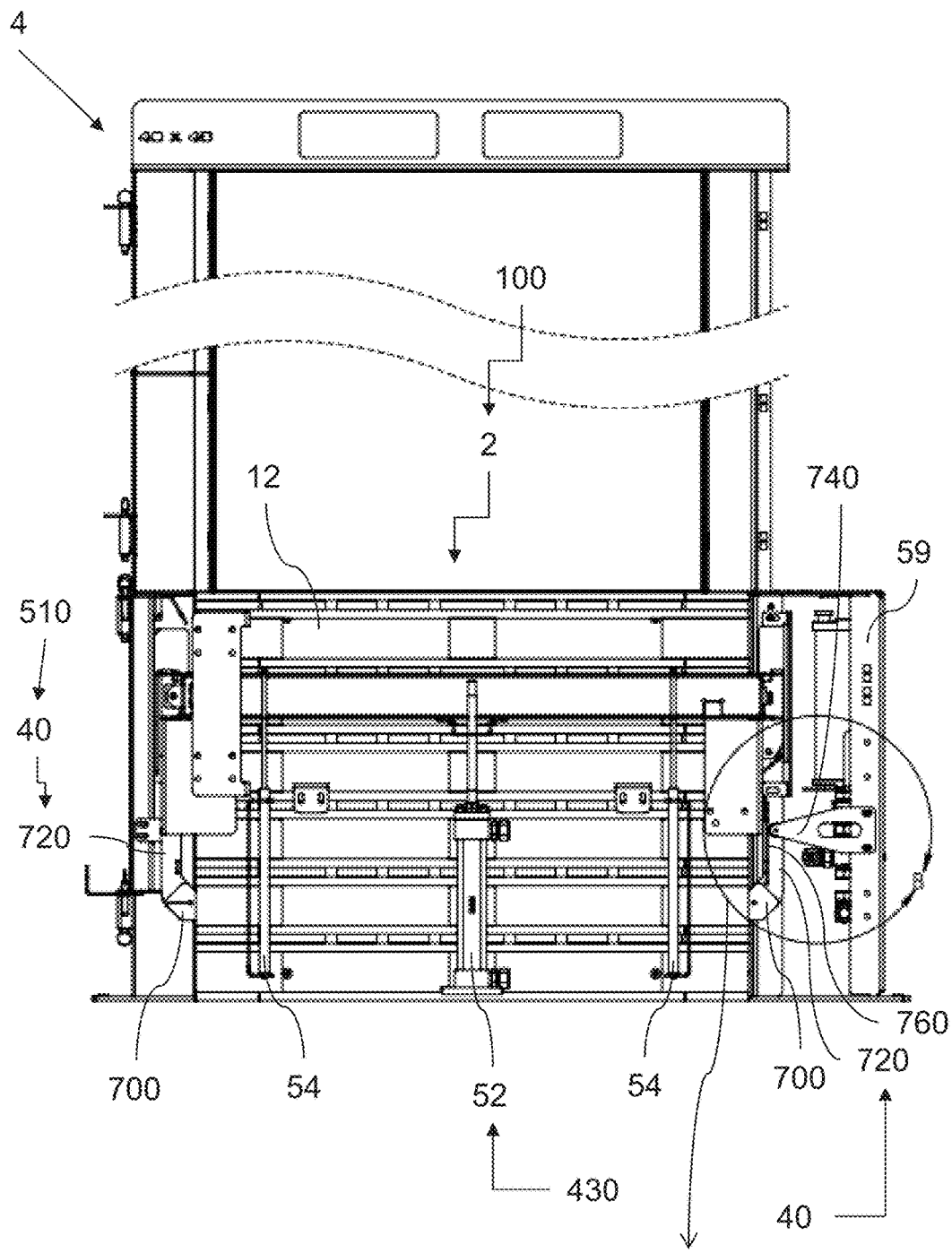
FIGS. 2A to 2G are cross-sectional views displaying the various stages of an embodiment of the pallet dispenser in operation.
FIG. 12 depicts a partial side view of an example of a latch assembly of the pallet dispenser, encircled in FIG. 2A.

The following are depicted in FIG. 2A: the pallet dispensing system 100, the pallet dispenser 2, the pallet-stack enclosure 4, the pallet stack 12, a latch 40, a hydraulic cylinder 52, a spring assembly 54, a stationary support frame 59, a closed-loop hydraulic circuit 430, a movable frame 510, a dog 700, arms 720, a cam roller 740, and a cam follower 760.

Referring to FIGS. 2A to 2G, in an embodiment, the pallet dispensing cycle comprises raising a pallet stack 12, separating and removing one or more pallets 10 from the pallet stack 12, and lowering the pallet stack 12.

In an example as shown in FIG. 2A, the pallet dispenser 2 and pallet-stack enclosure 4 (partially shown) enclose a pallet stack.

Figure 2B:
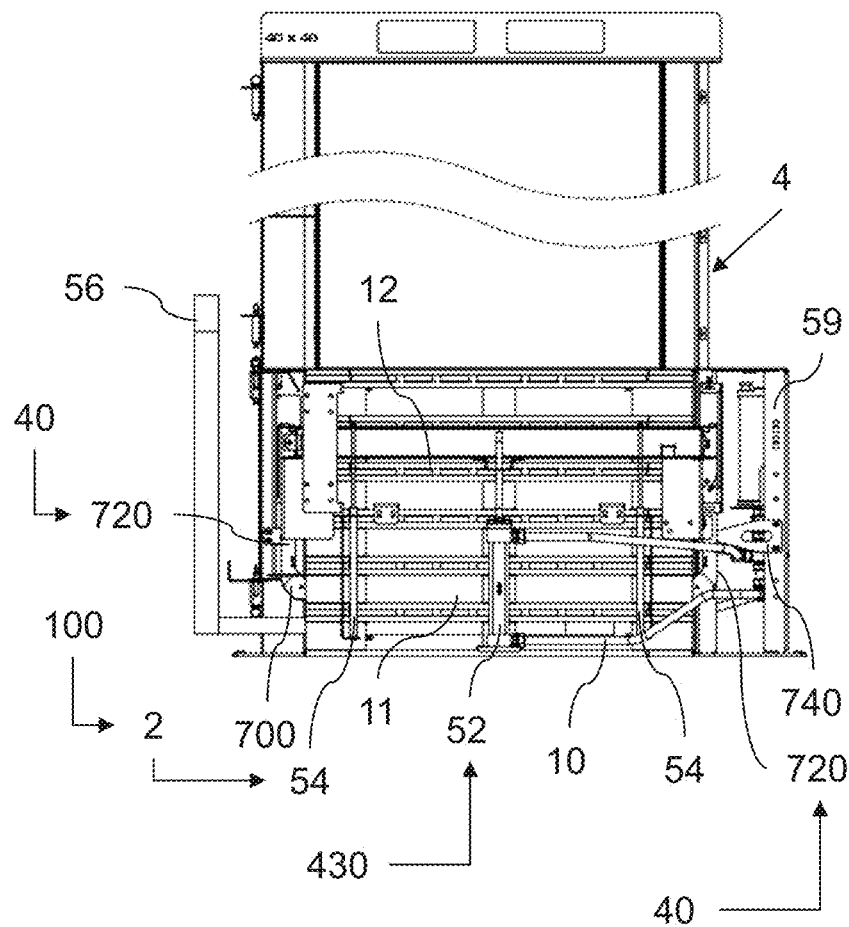

As shown in FIG. 2B, a pallet transporter 56 enters the pallet dispenser 2 and engages a pallet 10 in the pallet stack 12.

Figure 2C:
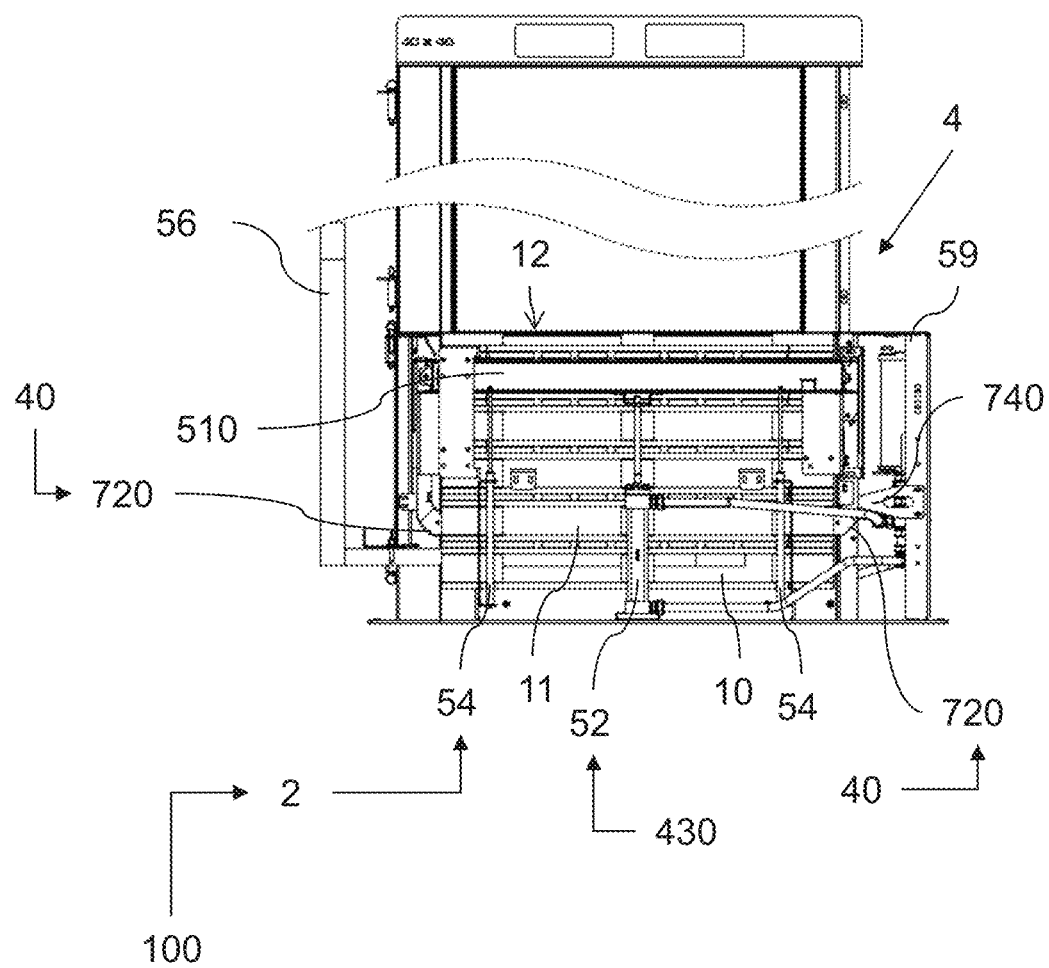

As shown in FIG. 2C, the pallet transporter 56 raises the pallet stack 12 and the pallet dispenser 2 transitions to a raised position 30. The pallet stack 12 is secured such that when the pallet dispenser 2 is in the raised position 30 one or more pallets 10 can be separated from the pallet stack 12. In an example, a securing mechanism 40 is provided for securing the pallet stack 12 to the pallet dispenser 2. The securing mechanism 40 may be referred to as a latch 40.

Figure 2D:
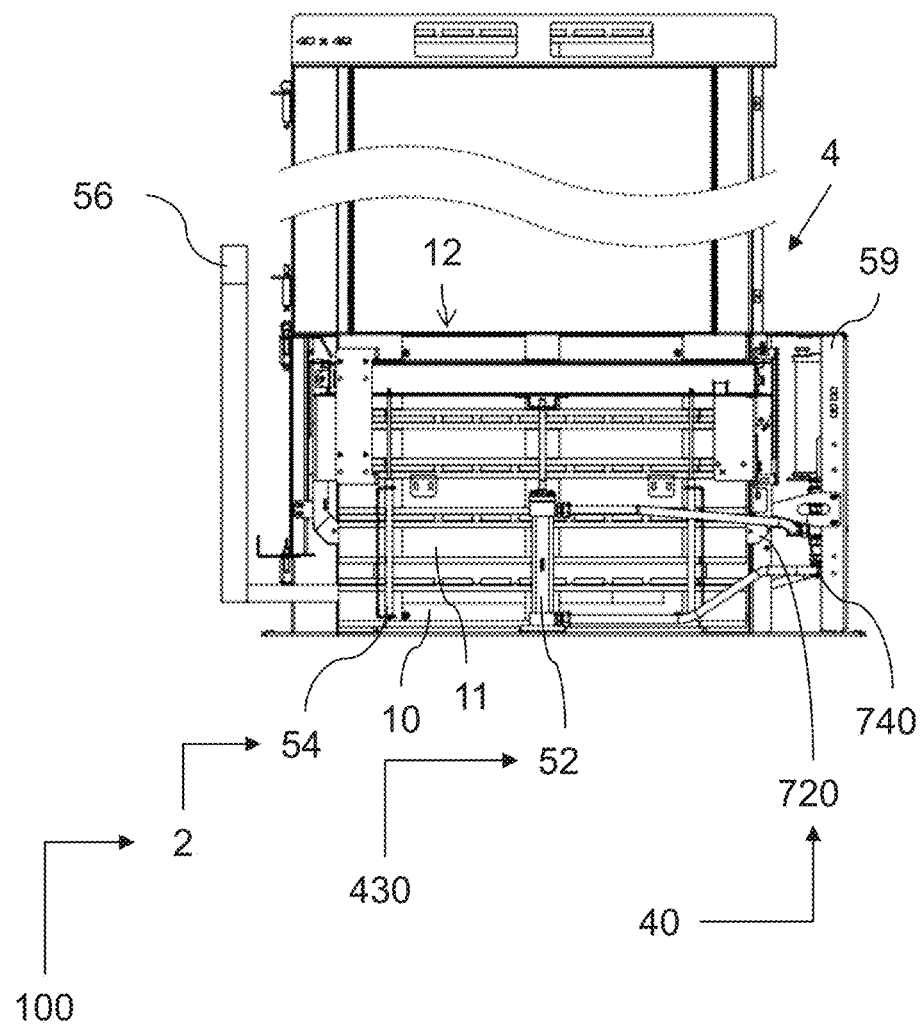

As shown in FIG. 2D, the pallet transporter 56 lowers and separates the one or more pallets 10 from the pallet stack 12.

Figure 2E:
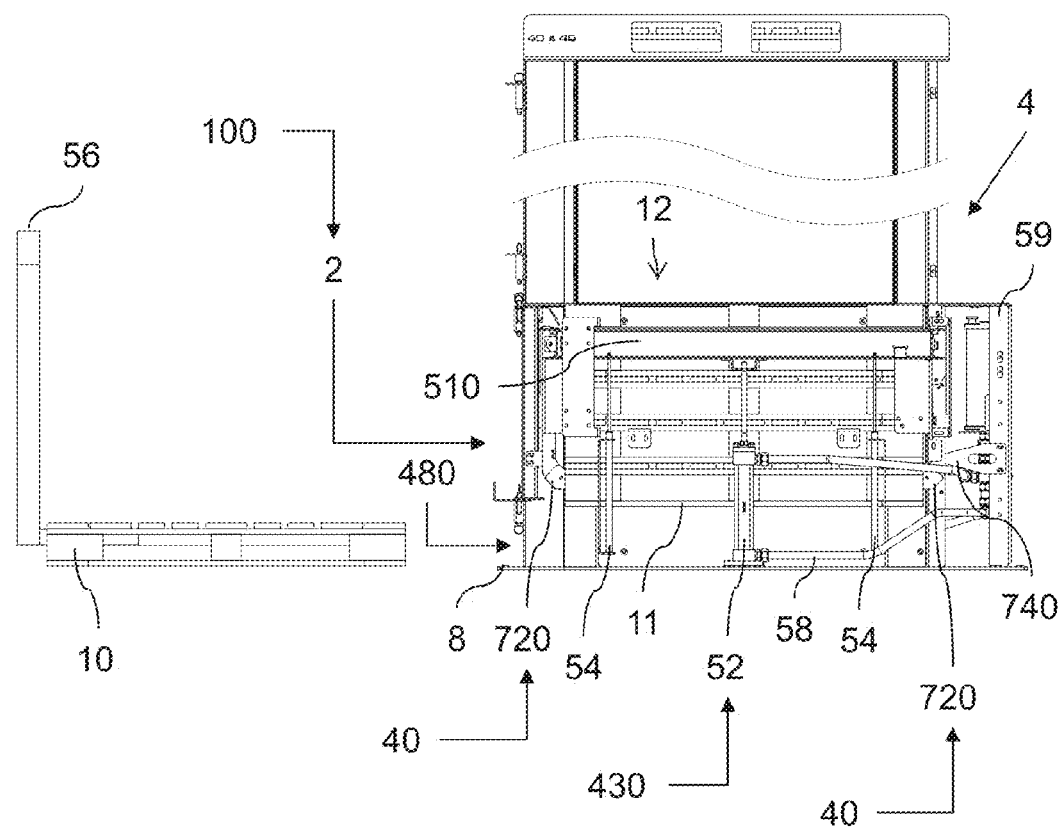

As shown in FIG. 2E, the pallet transporter 56 then removes the one or more separated pallets 10 from the pallet dispenser 2.

Figure 2F:
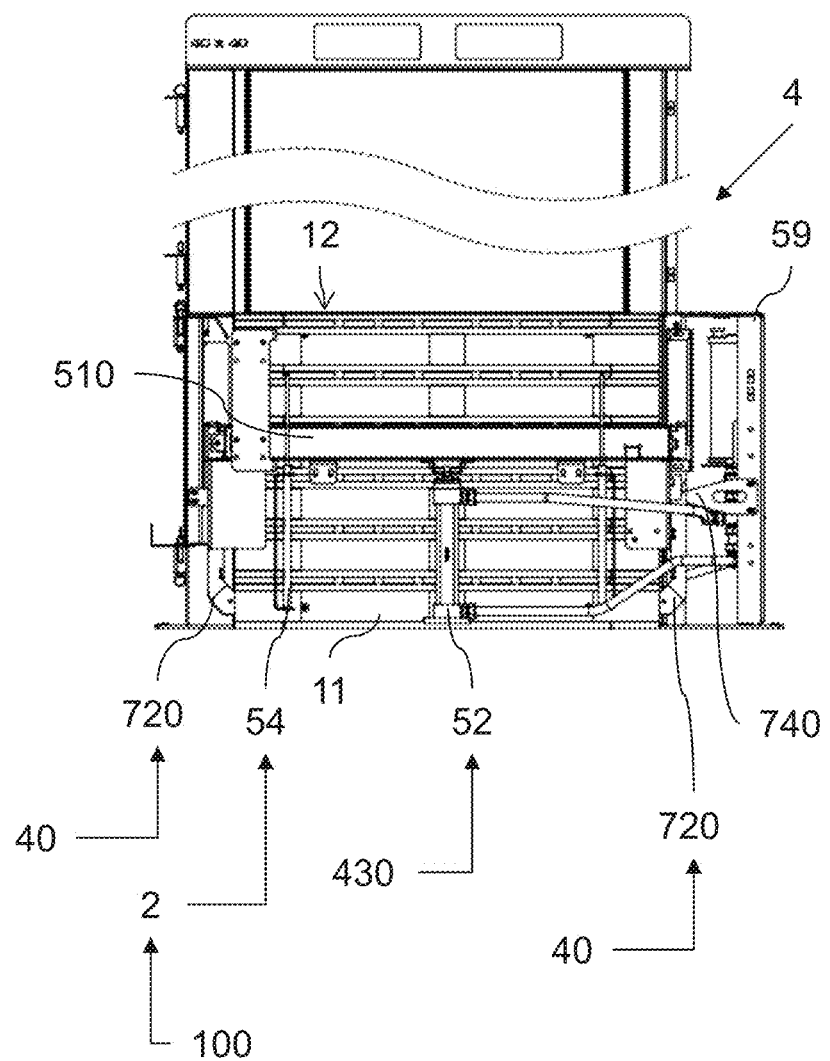

As shown in FIG. 2F, the pallet stack 12 is then lowered to the work surface using the weight of the pallet stack 12. The pallet dispenser 2 transitions to the lowered position 32 when the pallet stack 12 is lowered. The lowered position 32 may be referred to as the lowered state 32.

In some examples, dampeners are used to dampen the lowering of the pallet stack 12. In the example shown in FIGS. 5 and 2A to 2G, the dampeners comprise one or more telescoping hydraulic cylinders 52 connected to a hydraulic circuit 58 of the closed-loop hydraulic circuit 430. The telescoping hydraulic cylinder 52 is hereafter referred to as the hydraulic cylinder 52.

Figure 5:
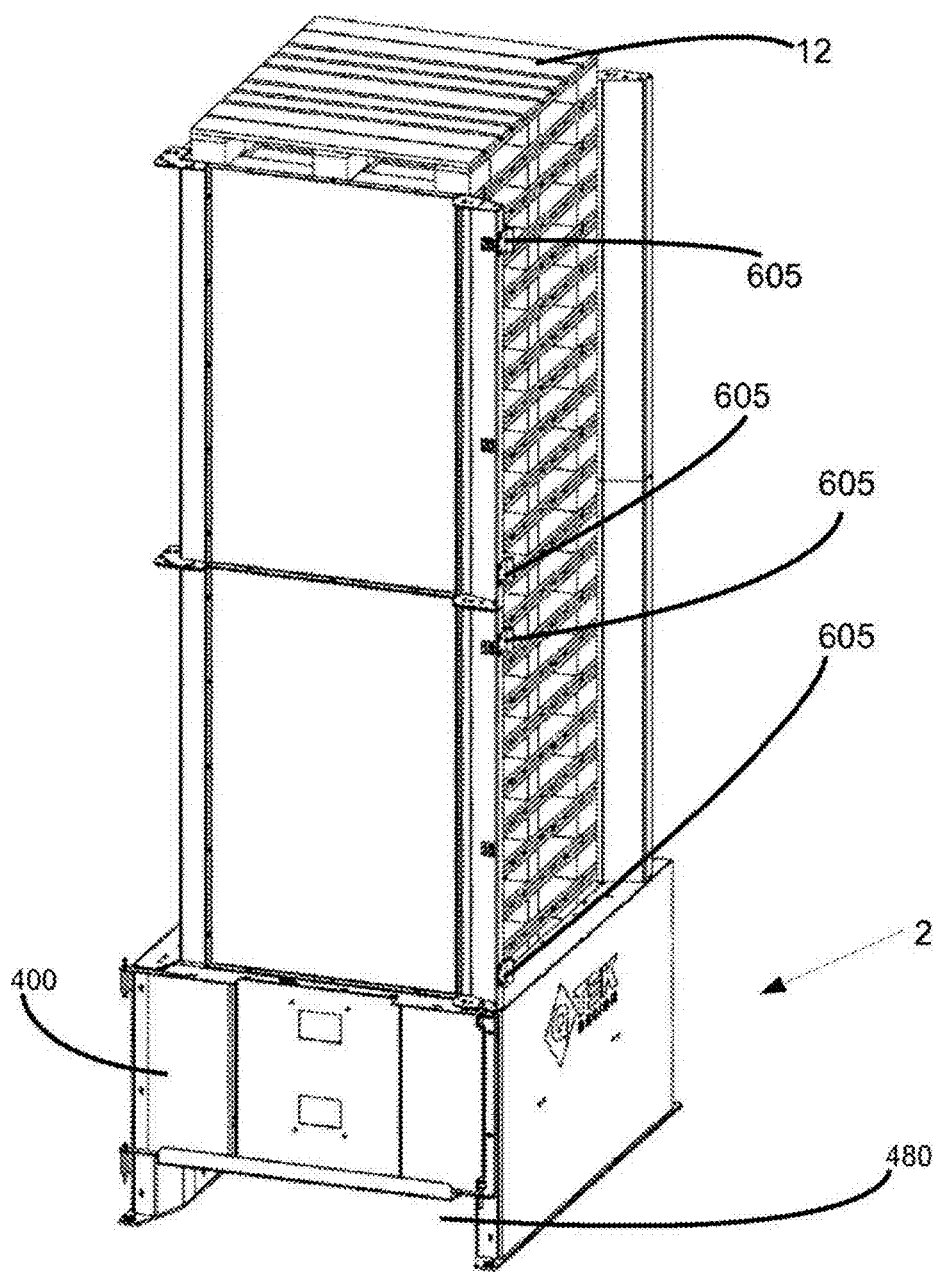
FIG. 5 is a perspective view of another embodiment of the pallet dispenser having the pallet-stack enclosure.

In another example, the pallet dispensing cycle further comprises transitioning to a ready raised position 34 after the pallet dispenser 2 has reached the lowered position 32. In the ready raised position 34 the pallet stack 12 is secured so that when the pallet dispenser 2 is in the raised position 30 one or more pallets 10 can be separated from the pallet stack 12, as is shown in FIGS. 5 and 2A.

Figure 2G:
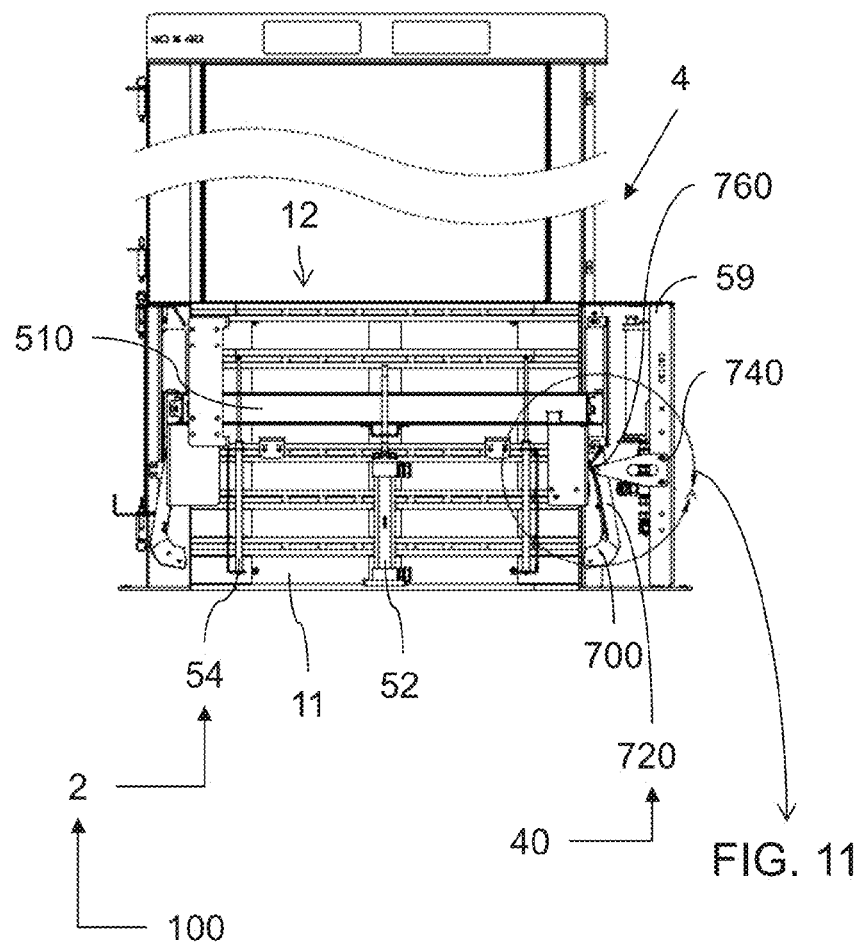

As shown in FIG. 2G, in one example, the pallet stack 12 is released when the pallet dispenser 2 is in the lowered state 32. This allows the pallet dispenser 2 to transition to the ready raised position 34, as shown in FIGS. 5 and 2A. In some examples, the raisers are used to raise the pallet dispenser 2 to the ready raised position 34. In the example shown in FIGS. 5 and 2A to 2G, the raisers comprise one or more telescoping cylinders or air springs filled with a compressible gas in a spring assembly 54.

In another embodiment, the pallet dispenser 2 comprises a stationary support frame 59 and a movable frame 510. The movable frame 510 may be called a pallet-magazine assembly. The movable frame 510 can be transitioned, by using a pallet transporter 56, between a raised 30 and lowered position 32 relative to the stationary support frame 59. The movable frame 510 comprises a securing mechanism 40 for securing a pallet stack 12. When the movable frame 510 is in the raised position, the movable frame 510 and securing mechanism 40 secures the pallet stack 12 so that one or more pallets 10 can be separated from the pallet stack 12.

In some examples, the pallet dispenser 2 comprises one or more dampeners for dampening the transition of the movable frame 510 from the raised to the lowered state. In the example where the movable frame 510 also has a ready state, the pallet dispenser 2 further comprises one or more raisers for transitioning the movable frame 510 between the lowered and ready states.

In another embodiment, the pallet dispenser 2 comprises a stationary support frame 59 for supporting the movable frame 510. The stationary support frame 59 may also support parts of the dampening mechanism, the raising mechanism, and the securing mechanism 40, if present. The stationary support frame 59 may be secured to a work surface 8, such as a warehouse floor, using fasteners such as bolts. In other example, the stationary support frame 59, and hence the pallet dispenser 2, may be mobile. For instance, the stationary support frame 59 may comprise lockable wheels rather than be affixed to the work surface 8. This would facilitate the easy relocation of the pallet dispenser 2.

In an example, the stationary support frame 59 comprises a front side 400, a back side 420, and a first side 440 and a second side 460. The first side 440 and the second side 460 are connected to the front side 400 and the back side 420 such that the assembly defines an enclosure capable of enclosing a pallet stack 12. In an example as shown in FIG. 5, an opening 480 is defined in the front side 400 of the stationary support frame 59 so that one or more pallets 10 can be removed from the enclosure.

In another example, one or more of the sides of the stationary support frame 59 may allow for a user to access the interior of the pallet dispenser 2. For example, in some situations the user may be required to manually add or remove pallets 10 from the pallet dispenser 2. In other situations, maintenance personnel may need access to the interior of the pallet dispenser 2 to service it. In some examples, one or more of the sides may be configured to be a door or gate. In other examples, one or more sides may be removable.

In another example, the stationary support frame 59 comprises a plurality of support posts (not shown) configured to surround a pallet stack 12. In this example, the stationary support frame 59 comprises four support posts corresponding to each of the four corners of the pallet stack 12. Since no walls or sides are defined between any of the four posts, a pallet transporter 56 would be able to remove one or more pallets from the pallet dispenser 2 from between at least two support posts.

Figure 6:
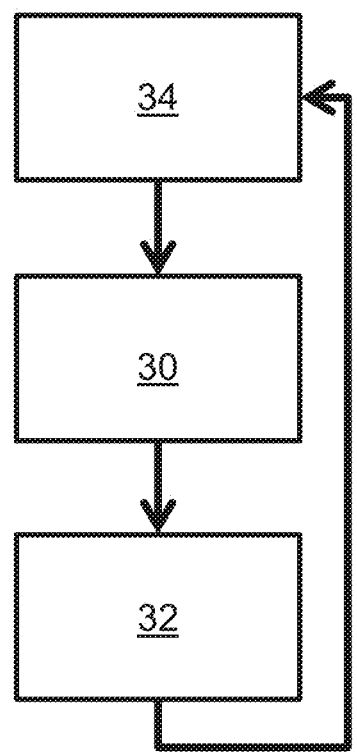
FIG. 6 depicts a flowchart showing various states of a cycle of an embodiment of the pallet dispenser.

In another example, the pallet dispenser 2 comprises a movable frame 510 that is connected to the stationary support frame 59. The movable frame 510 is configured to be movable between a raised 34 and lowered position 32 relative to the stationary support frame 59, as shown in the flowchart of FIG. 6.

When in the raised position 34, the movable frame 510 secures the pallet stack 12 so that one or more pallets 10 are removable from the pallet dispenser 2. This is illustrated, for example, in FIGS. 2C to 2E. When the movable frame 510 is in the lowered position the pallet stack 12 rests on the work surface 8. This is illustrated, for example, in FIGS. 2F and 2G.

In another embodiment, the movable frame 510 comprises a securing mechanism that secures the pallet stack 12 to the movable frame 510. In an example, the securing mechanism comprises one or more latches 40 configured to engage a pallet in a stack of pallets.

Referring now to FIG. 3, there is depicted the following: the pallet dispenser 2, the work surface 8, the pallet stack 12, the latch 40, the hydraulic cylinder 52, the spring assembly 54, the pallet transporter 56, the hydraulic circuit 58, the stationary support frame 59, the movable frame 510, and the cam roller 740.

Figure 4A:
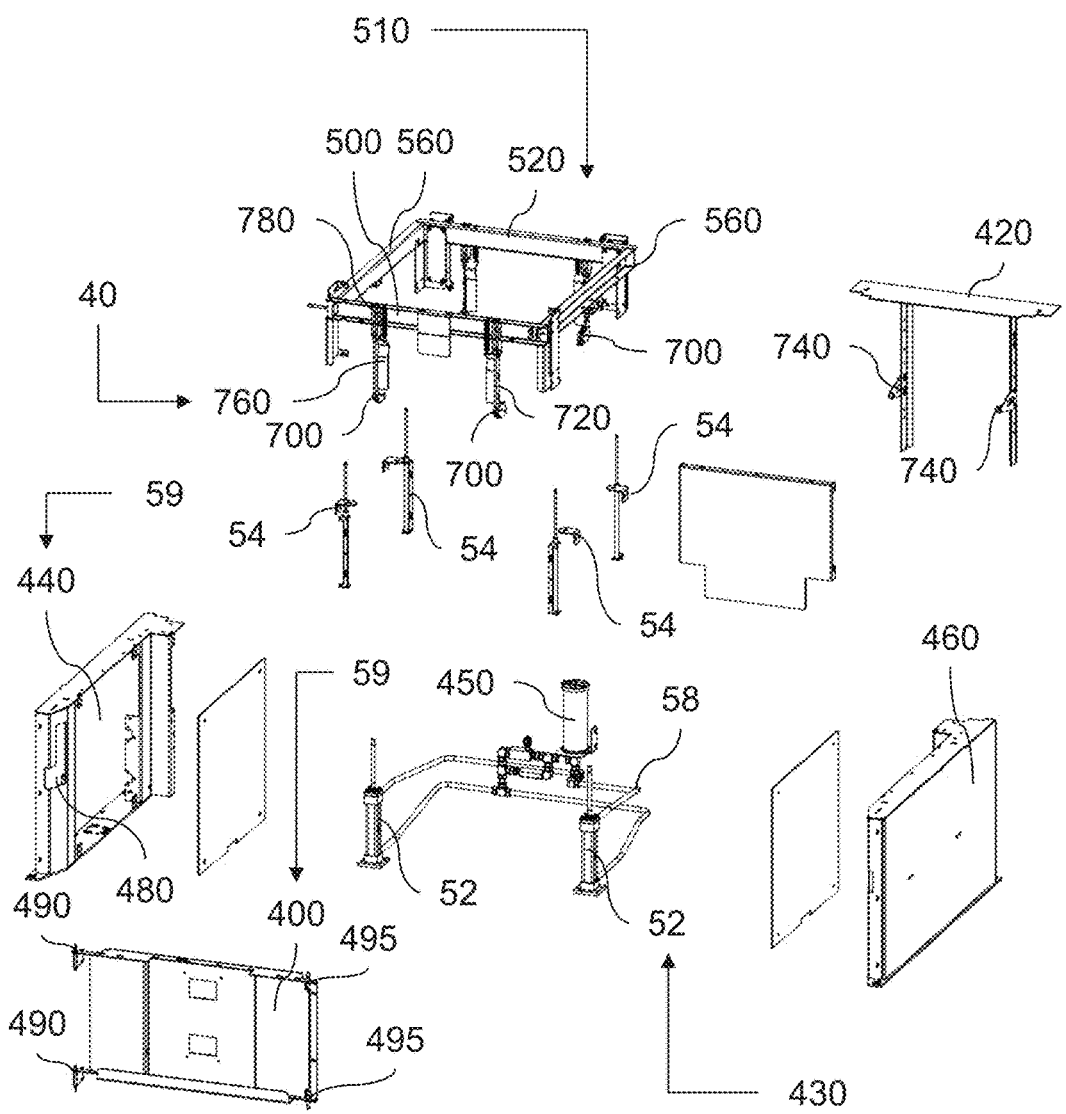
FIG. 4A depicts an exploded perspective view of an example of the pallet-magazine assembly of the pallet dispenser of FIG. 1.

FIG. 4A depicts an exploded perspective view of an example of the stationary support frame 59 of the pallet dispenser 2 FIG. 1. It will be appreciated that the stationary support frame 59 may be called a pallet-magazine assembly.

FIG. 4A depicts the following components: the hydraulic cylinder 52, the spring assembly 54, the stationary support frame 59, the closed-loop hydraulic circuit 430, the hydraulic reservoir 450, the cotter pins 495, the side 400, the back side 420, the closed-loop hydraulic circuit 430, the support frame side 440, the support frame side 460, the hinge 490, the opening 480, the movable frame 510, the back side 520, the second side 560, the dog 700, the arm 720, the cam roller 740, the cam follower 760, and the cam spring 780.

Figure 4B:
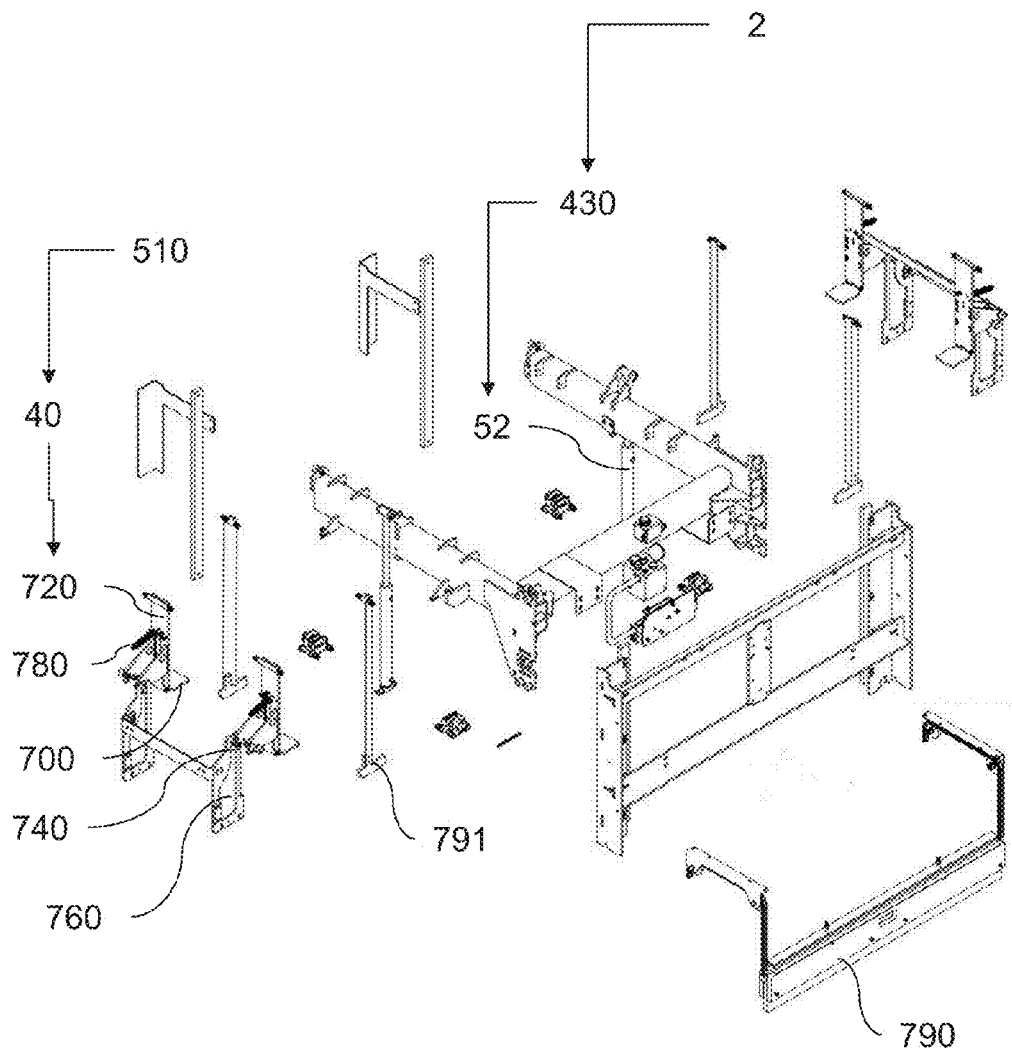
FIG. 4B depicts an exploded perspective view of an alternate example of a pallet-magazine assembly of the pallet dispenser 2 of FIG. 1.

FIG. 4B depicts an exploded perspective view of another example of the stationary support frame 59 of the pallet dispenser 2 of FIG. 1.

Referring to FIG. 4A, in another embodiment, the movable frame 510 may also be connected to one or more dampeners for dampening the lowering of the pallet stack when the movable frame 510 transitions from the raised to the lowered position. In an example, the dampeners comprise one or more telescoping hydraulic cylinders 52 fillable with a compression-resistant fluid in a closed-loop hydraulic circuit 430. As the movable frame 510 transitions to the raised position 30 the one or more telescoping hydraulic cylinders 52 are filled with the compression-resistant fluid. As the movable frame 510 transitions to the lowered position 32 the compression-resistant fluid is drained from the one or more telescoping hydraulic cylinders 52 through the closed-loop hydraulic circuit 430 to a hydraulic reservoir 450 containing the compression-resistant hydraulic fluid.

In some examples, the movable frame 510 may also be configured to be movable to a ready raised position 34. When in the ready raised position 34, the securing devices secure the pallet stack 12 so that one or more pallets 10 can be separated from the pallet stack 12 when the movable frame 510 is in the raised position 30. In an example, the rest position is defined between the raised and lowered position. In this example, the movable frame 510 comprises one or more raisers for raising the movable frame 510 from the lowered state to the ready state. In this example, the securing devices release the pallet stack 12 when the movable frame 510 is in the lowered position, and the raisers (raising mechanisms) raise the movable frame 510 to the ready position where the securing device secures the pallet stack to the movable frame 510. In an example, the raisers include one or more gas spring cylinders 52 filled with a compressible fluid. A skilled person would understand that alternate means for raising the movable frame could be used without departing from the scope of this disclosure. For example, in another example, the raisers may be counterweights, pulleys, and cables configured to raise the movable frame 510 from the lowered position to the ready raised position 34.

In some examples, the movable frame 510 may have a first side 540 and the second side 560 corresponding to the first side 440 and the second side 460 of the stationary support frame 59. In other examples, the movable frame 510 has a front side 500, a back side 520, a first side 540, and the second side 560, corresponding to the front side 400, the back side 420, the first side 440, and the second side 460 of the stationary support frame 59. In yet another example, the movable frame 510 may have the first side 540, the second side 560, and the back side 520, corresponding to the first side 440, the second side 460, and the back side 420 (respectively) of the stationary support frame 59.

In some examples, the movable frame 510 is connected to the stationary support frame 59 using matching cam rollers and cam guides. This allows the movable frame 510 to move smoothly from the raised 30 to lowered state 32. In another example where the stationary support frame 59 has sides, and channels or opening 480 may be defined in the side 440 and the side 460 of the stationary support frame 59 that allow the movable frame 510 to move from the raised to lowered state. A skilled technician would understand that alternate ways of connecting the stationary support frame 59 to the movable frame 510 could be used without departing from the scope of this disclosure. For example, the movable frame 510 may be connected to the stationary support frame 59 by shocks and springs that allow the movable frame to move relative to the stationary support frame 59. In another example, counterweights, pulleys, and cables could be used.

When the movable frame is in the raised state 30, the securing mechanism 40 of the pallet dispenser 2 secures the pallet stack 12 so that one or more pallets 10 can be separated from the pallet stack 12. When the pallet dispenser 2 is in the lowered state 32 the pallet stack 12 rests on the work surface 8. When the pallet stack is resting on the work surface 8 the pallet transporter 56 can engage a pallet 10 in the pallet stack 12.

A pallet transporter 56 is used to transition the movable frame 510 to its raised state 30. In this example, the pallet transporter 56 engages a pallet 10 in the pallet stack 12 and raises the pallet stack 12. As the pallet stack 12 is raised, the movable frame 510 transitions to a raised state 30. In an example, the movable frame's securing mechanism secures the pallet stack 12 so that as the pallet stack 12 is being raised by the pallet transporter 56 the movable frame transitions to a raised state 30. In this example, when the pallet dispenser 2 is in its raised state 30 the pallet stack 12 is raised from the work surface 8 and one or more pallets 10 can be removed from the pallet stack 12.

While in the raised state 30, the securing mechanism of the movable frame 510 secures the pallet stack 12 so that one or more pallets 10 can be separated from the pallet stack 12 and removed from the pallet dispenser 2. In this example, the pallet transporter 56 is lowered, separating one or more pallets 10 from the pallet stack 12. The pallet transporter 56 can then remove the one or more pallet stack 12 from the pallet dispenser 2.

In one example, the movable frame 510 is configured to remain in the raised state 30 until a state change event has been triggered. For example, the movable frame 510 may hold the pallet stack 12 in the raised state 30 until the one or more pallets 10 have been removed from the pallet dispenser 2. Once the one or more pallets 10 are cleared from the pallet dispenser 2, the movable frame 510 will begin transitioning to the lowered state 32.

In another example, the movable frame 510 may begin transitioning to the lowered state 32 once the one or more pallets 10 have been separated from the pallet stack 12, but before the one or more pallets 10 have been removed from the pallet dispenser 2. In this example, the rate at which the pallet transporter 56 lowers the one or more pallets 10 is faster than the rate at which the movable frame 510 transitions to its lowered state 32. This allows the one or more pallets 10 to be removed from the pallet dispenser 2 before the movable frame 510 fully transitions to the lowered state 32.

In both of the examples provided above, gravity alone is used to transition the movable frame from the raised state 30 to the lowered state 32. In the examples provided above, the weight of the pallet stack 12 combined with the weight of parts of the pallet dispenser 2 are used to transition the movable frame from the raised state 30 to the lowered state 32.

In some examples, the pallet dispensing cycle may be complete once the movable frame 510 has reached the lowered state 32. In other examples, the movable frame 510 may need to transition to a ready raised position 34 before another pallet dispensing cycle may restart. In this example, the movable frame 510 transitions to a ready raised position 34 from the lowered state 32 by way of a raising device. Once in the ready raised position 34, the securing device secures the pallet stack 12 so that one or more pallets 10 can be separated from the pallet stack 12 when the movable frame is in the raised state 30.

In another aspect, a securing mechanism is provided for securing the pallet stack to the movable frame. The securing mechanism secures the pallet stack so that when the pallet stack 12 is raised or lowered by the pallet transporter 56 the movable frame 510 is also raised or lowered. In this example, the securing mechanism comprises one or more latches 40 that are configured to engage a single pallet 10. A skilled person would understand that alternate means of securing a pallet stack 12 to the movable frame 510 could be used without departing from the scope of this disclosure. For instance, a plurality of friction plates could be used to secure the pallet stack. Alternately, a blade or removable support could be used between the bottom pallet and the pallet stack 12, thereby securing the pallet stack 12 above the bottom pallet.

Figure 7A:
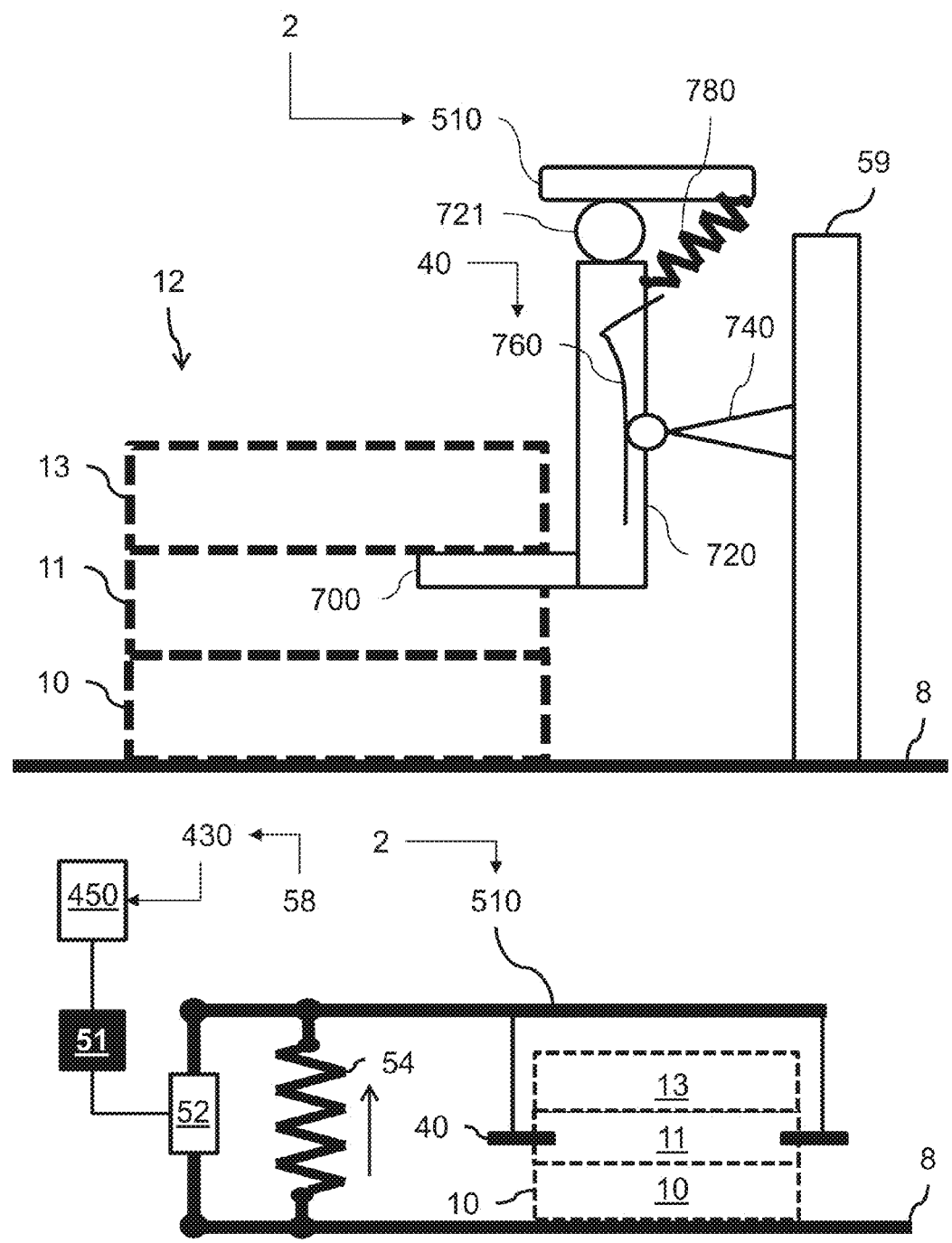
FIGS. 7A to 7I depict cross sectional view of an embodiment for a securing mechanism as used in an example of the pallet dispenser.

In this example as partially shown in FIG. 7A, the latches 40 are dogs 700, or hooks, connected to the arms 720 movably attached to the movable frame 510 by a hinge 730, and are configured to engage one or more pallets 10. The cam spring 780 is connects the movable frame 510 to the arm 720 so that, when the spring is un-sprung, the latch pivots towards the stationary support frame 59, thereby disengaging the one or more pallets 10. It will be appreciated that the dogs 700 may be called support bars.

In some examples, the movable frame 510 transitions from a raised position and a lowered position substantially vertically. In this example, a cam follower 760 is integrated with the arm 720, and the assembly extends vertically from the movable frame 510 to take advantage of the substantially vertical movement of the movable frame 510. A corresponding cam roller 740 is configured on the stationary support frame 59 that interfaces with the cam follower 760. In other example, however, the configuration of cam follower 760 and corresponding cam roller 740 may be reversed.

In this example, the arms 720 are configured to interface with a cam follower 760 on the stationary support frame 59 so that when the movable frame 510 is in the lowered position 32 the latches do not engage a pallet. In this example, the tension provided by the cam spring 780 causes the latch to pivot away from the pallet stack, thereby disengaging the pallet 10 when the movable frame 510 is in the lowered position 32. When the movable frame 510 is in any other position, however, the latches engage the pallet 10, thereby securing all pallets above the engaged pallet 10. In this example, the cam follower 760 engages the arm 720 so as to prevent the latch from springing back and disengaging the pallet 10.

A skilled person would understand that alternate ways of causing a latch to secure and unsecure a pallet or pallet stack could be used without departing from the scope of this disclosure. In alternate example, the latch may comprise a cam roller 740 that interfaces with a cam follower on the stationary support frame 59. In this example, the cam followers 760 are configured to interface with the cam rollers 740 on the stationary support frame 59 such that when the movable frame 510 is in the lowered position the latches 40 disengage from the pallet 10 and unsecure the pallet stack 12. In this example, the cam follower 760 allows the cam spring 780 to pull the arm 720 and the dog 700 away from the pallet. When the movable frame 510 is in any other position, for example raised or ready, the cam followers interface with the arm so that the latches engage a pallet 10.

In other examples, the cam followers 760 or cam rollers 740 may not be integrated with the arms 720. In some examples, the arms 720 may extend diagonally from the movable frame 510 rather than vertically as was previously discussed. In these examples the cam followers 760 or cam rollers 740 may need to be independent of the arm 720 in order to take advantage of the substantially vertical movement of the movable frame 510.

In another aspect, each latch 40 comprises a dog 700. The dogs 700 are configured to engage one or more pallets 10, thereby securing the pallet stack 12. In some examples, the dogs 700 may be chamfered in order to facilitate the engagement of the pallet 10. The orientation of the dogs 700 may also depend on the configuration of the pallets 10 used. In this example, the dogs 700 extend substantially perpendicularly from the arm 720.

The number of latches 40 and their placement on the movable frame 510 will depend on the type of pallets used in the facility. Generally, two types of pallets are used in the field: two-way and four-way pallets. Two-way pallets are designed so that a pallet transporter 56 can only engage the pallet from the front side and the back side of a two-way pallet. Four-way pallets are designed so that a pallet transporter 56 such as a pallet jack, hand truck, or forklift can engage the pallet from any one of its four sides. CHEP, for example, manufactures, leases, and sells four-way pallets to various manufacturing and distribution companies.

Referring to FIG. 4A, in the example where the pallet dispenser 2 is used with two-way pallets, the latches should be configured on the movable frame 510 to interface with the front side and the back side of the pallet 10. In the example where the movable frame 510 has a front side 500 and a back side 520, the latches 40 may be configured on the front side 500 and back side 520 of the movable frame 510 to correspond to the front side and the back side of a two-way pallet. In the example where the movable frame 510 does not have a front side, the latches may be configured on the back side 520 and the ends of first side 540 and the second side 560 of the movable frame 510 opposite the back side 520.

For example, in some examples, the front side 400 of the stationary support frame 59 and the front side of the movable frame 510 may interfere with the ability of the pallet transporter 56 to engage the pallet 10 in the pallet dispenser 2. For instance, the forks of some hand operated pallet trucks may only be slightly longer than the length of a pallet. In these scenarios, the front side of the pallet dispenser 2 will need to be configured to minimize the interference between the pallet truck and the pallet 10. For instance, in some examples, the front side 400 of the stationary support frame 59, the front side of the movable frame 510, or both may not be present.

In one example, a pallet transporter 56 may be able to engage a pallet 10 when the stationary support frame 59 has a front side 400 but the movable frame 510 does not have a front side 500. In this example, the securing device must be configured to secure a pallet stack 12 without the front side 500 of the movable frame 510. In these examples, in order to secure the front side of a pallet 10 or pallet stack 12, parts of the securing device may need to extend from the first side 540 and the second side 560 of the movable frame 510. In some examples, the first side 540 and the second side 560 may have ends located opposite the back side 520 where the parts of the securing device may be attached.

In one example, the securing device comprises one or more latches 40 that are configured at the back side 520 of the movable frame 510 and at the ends of the first side 540 and second side 560 of the movable frame 510 located opposite the back side 520. In this example, some of the latches 40 are configured to extend diagonally from the ends of the first side 540 and the second side 560 towards the front of the pallet 10 so as to secure the front side of the pallet 10.

In this example, the latches 40 on the ends of the first side 540 and the second side 560 may be configured as angled arms that extend diagonally downwards from the movable frame 510 towards the front of the pallet 10 from the end of the first side 540 or the second side 560. Each of the angled arms have a dog 700 configured at the end of the angled arm to engage the front of the pallet 10.

In this example, since the arms extend diagonally towards the front the pallet, the cam follower 760 or cam roller 740 of the latch 40 may be independent of, but mechanically linked to, the arm. This allows the latch 40 to take advantage of the substantially vertical motion of the movable frame 510 to secure and release the pallet stack 12. In the example where the latch 40 has a cam follower 760, the cam follower 760 may extend substantially vertically from the end of the first side 540 or the second side 560 of the frame of the movable support, whereas the arm extends diagonally from the end of the first side 540 or the second side 560 of the movable support. In this example, a mechanical linkage such as a plate or a connecting rod may connect the arm to the cam follower 760 or cam roller 740. The corresponding cam roller 740 on the support frame then interacts with the cam follower 760 to cause the latch 40 to secure and release the pallet stack 12.

A skilled technician would understand that the configuration of the movable frame 510 and the securing device will depend on the type of pallet being used. For example, in some environments a four-way pallet, or CHEP pallet, may be used. In the example where latches 40 are used to secure the pallet stack, the configuration of the latches 40 on the movable frame 510 may be different that the configuration used on a pallet dispenser 2 for two-way pallets or flat-board pallets.

For instance, in an example, the pallet dispenser 2 is configured for use with four-way pallets, the securing devices can be configured only on the first side 540 and the second side 560 of the movable frame 510. In this example, the latches 40 can be configured along the first side 540 and the second side 560 of the movable frame 510 so as to secure the pallet stack 12 along the sides.

In other example, a pallet dispenser 2 is configured for use with four-way pallets, and the latches 40 may also be configured along the front side 500 and the back side 520 of the movable frame 510 so as to secure the pallet stack 12 on all four sides (of the pallet in the pallet stack 12).

In yet another example, the pallet dispenser 2 (for use with the two-way pallet) may be used with four-way pallets without modification. That is, the pallet dispenser 2 may only secure the front and back of the pallet 10. In other example where the pallet dispenser 2 (for use with the two-way pallet) secures the sides of the pallet, then the pallet dispenser 2 would secure the four-way pallet on the sides of the pallet.

FIG. 4A depicts an example of the movable frame 510 configured to be used with two-way pallets. FIG. 4A depicts an exploded perspective view of an example of the movable frame 510 of the pallet dispensing system 100 of FIG. 1. The latches 40 are configured placed on the movable frame 510 to correspond to the openings of a two-way pallet. In this example, this corresponds to the front side 500 and the back side 520 of the movable frame 510.

FIG. 4B depicts the following components: the pallet dispenser 2, the latch 40, the hydraulic cylinder 52, the closed-loop hydraulic circuit 430, the movable frame 510, the dog 700, the arms 720, the cam roller 740, the cam follower 760, the cam spring 780 and the counterweight assembly 790. Referring to FIG. 4B, there is depicted instance of a vertical bar 791. The vertical bars 791 are configured to prevent the latches 40 from pivoting outward and are held in place by the hydraulic brakes at the bottom. The hydraulic brakes are powered from the hydraulic pressure produced from the weight of the pallet stack 12. When the pallet stack 12 touches the floor, the pressure goes to zero, the brakes release, and the latches 40 are allowed to pivot outward, springs are pulling the dogs 700 (also called the support latches) out from the bottom most positioned pallet positioned in the pallet stack 12.

As depicted in FIG. 4A and partially in FIG. 4B, the closed-loop hydraulic circuit 430 includes a check valve (not shown and known) connected to a hydraulic reservoir 450 and a flow control valve (not shown and known) connected to the check valve (known and not depicted). The closed-loop hydraulic circuit 430 includes a hydraulic cylinder 52 connected to the flow control valve, and the hydraulic cylinder 52 is configured to support and to move (lower) the movable frame 510 having the pallet stack 12 to ground level (working surface). In this example, the hydraulic cylinder 52 includes telescoping extendable cylinders that are configured to telescope (extend) in response to the movement (introduction or removal) of a compression-resistant hydraulic fluid in the hydraulic cylinder 52.

In other examples, the amount of mechanical kinetic energy used to raise the pallet stack 12 may be converted, at least in part, to the amount of mechanical potential energy. The mechanical potential energy may then be stored in the pallet dispenser 2. For the case where the pallet dispenser 2 includes a counterweight assembly 790, as depicted in FIG. 4B, the counterweight assembly 790 is configured to store at least in part the amount of mechanical potential energy, and to convert at least in part the amount of mechanical potential energy to the amount of mechanical kinetic energy.

As depicted in FIG. 4B, the counterweight assembly 790 is configured to convert at least in part the amount of mechanical kinetic energy of moving the pallet stack 12 to the amount of mechanical potential energy. This mechanical potential energy is then stored, at least in part, as mechanical potential energy by the counterweight assembly 790. The counterweight assembly 790 is configured to convert and store at least in part the amount of energy in a multi-step process. In the first step of the process, the mechanical kinetic energy used to raise the pallet stack 12 can be converted to the amount of mechanical potential energy and stored, at least in part, by the counterweight assembly 790 by partially raising the counterweight assembly 790 from its initial rest position. As the sequence continues, the counterweight assembly 790 is further raised so that the stored amount of mechanical potential energy can be used to move the movable frame 510 from the lowered position 32 (also called the pallet-dispensation position) to the raised position 34 (also called the pallet-storage position). It will be appreciated that the state changes for the movable frame happen automatically (without user input or user intervention).

Regarding four-way pallets, or CHEP pallets, the configuration of the latches 40 on the latch 40 spring-loaded may be different from the latch 40 for use with the two-way pallet described above. FIG. 4B depicts an exploded perspective view of an alternate example of the movable frame 510 of the pallet dispensing system 100 of FIG. 1. The latch 40 depicted in FIG. 4B may be used in an environment using the four-way pallet if so desired.

As depicted in FIG. 4B, the latches 40 are configured to interface with the sides of the pallet 11 that are parallel to the direction in which the pallet transporter 56 engages the pallet 11. The latches 40 are configured placed on the first side 540 and the second side 560 of the movable frame 510.

In another example for use with the four-way pallet, the latches 40 are also configured positioned along the front side 500 and the back side 520 of the movable frame 510 so that the pallet 11 is engaged on all four sides of the pallet 11. In yet another example, the pallet dispenser 2 is for use with the two-way pallet.

The pallet dispenser 2 may be used with the four-way pallet without modification if so desired. That is, the latch 40 configuration of a pallet dispenser 2 is configured for two-way pallets, and may in many circumstances be use four-way pallets without further modification if so desired.

FIG. 5 depicts a perspective view of an example of the pallet dispenser 2 of FIG. 1, having the pallet-stack enclosure 4 presenting an opening that is oriented orthogonal to the opening of the pallet dispenser 2. FIG. 5 depicts the following components: the pallet dispenser 2, the pallet stack 12, the front side 400, the opening 480 and the hinges 605.

FIG. 6 depicts a flowchart showing an example of a method (various states) of a cycle of the pallet dispenser 2 of FIG. 1.

The pallet dispenser 2 operates in a ready raised position 34, a raised position 30, and a lowered position 32. The pallet dispenser 2 cycles from the ready raised position 34, to the raised position 30, and the lowered position 32.

In a ready raised position 34, the pallet dispenser 2 waits for the pallet transporter 56 to engage the bottom most positioned pallet in the pallet stack 12.

In a raised position 30, the pallet dispenser 2 waits for separation of the bottom pallet from the pallet stack 12 by having the pallet transporter 56 lower the bottom most pallet away from the pallet stack 12. The pallet stack 12 is secured to the movable frame 510 while the bottom most pallet in the pallet stack 12 is separable from (not secured to) the pallet stack 12.

In a lowered position 32, the pallet stack 12 is positioned on the working surface by the pallet transporter 56, and the pallet dispenser 2 raises the pallet stack 12 to the ready position 34.

FIGS. 7A to 7H depict schematic example of a sequence of operations of the pallet dispenser 2 of FIG. 1. Each of FIGS. 7A to 7H include an upper schematic and a lower schematic, for the purpose of facilitating an understanding of the examples of the pallet dispenser 2.

Referring now to FIG. 7A, an operational sequence is depicted.

The pallet stack 12 rests on the work surface 8 or any equivalent working surface. The pallet stack 12 is held in the pallet dispensing system 100. Specifically, the pallet stack 12 is latched to the movable frame 510. The movable frame 510 is configured to surround (at least in part) the pallet stack 12. For the sake of convenience, the pallet stack 12 is depicted as being shorter in height than the top section of the movable frame 510. It is understood that the pallet stack 12 may extend vertically beyond the upper section of the movable frame 510. The pallet stack 12 includes a series of pallets positioned or stacked vertically one over the other, one next to the other forming a vertical column of pallets. The pallet stack 12 includes the pallet 10 that contacts the work surface 8. The pallet 11 is positioned on (and contacts) a top surface of the pallet 10. The pallet 13 rests on (and contacts) the pallet 11, and so on, etc.

The movable frame 510 is configured to be movable relative to the work surface 8. The stationary support frame 59 is configured to be stationary relative to the work surface 8 (such as connected to or securely mounted to the work surface 8). It will be appreciated that only a portion of the stationary support frame 59 is depicted on one side of the movable frame 510 (for the sake of convenient depiction and explanation).

The closed-loop hydraulic circuit 430 includes a hydraulic cylinder 52, a hydraulic valve 51 and a hydraulic reservoir 450. The hydraulic valve 51 is configured to selectively connect the hydraulic cylinder 52 to the hydraulic reservoir 450 in such a way that for the case where the hydraulic valve 51 is placed in the open state (open position), hydraulic fluid may flow between the hydraulic cylinder 52 and the hydraulic reservoir 450, and for the case where the hydraulic valve 51 is placed in the closed state (closed position), hydraulic fluid cannot flow between the hydraulic cylinder 52 and the hydraulic reservoir 450. In the open state, the hydraulic valve 51 is configured to provide a restriction (relatively smaller hydraulic orifice) so that the flow (flow rate, liters per hour) of hydraulic fluid may be moderated. As depicted for FIG. 7A, the hydraulic valve 51 is placed in the closed state so that the hydraulic fluid cannot flow between the hydraulic cylinder 52 and the hydraulic reservoir 450.

The hydraulic cylinder 52 includes opposite ends (a first end and a second end): the first end of the hydraulic cylinder 52 is securely mounted (operatively coupled) to the work surface 8. The second end of the hydraulic cylinder 52 is securely mounted (operatively coupled) to the movable frame 510. The hydraulic cylinder 52 is configured to moderate movement (limit speed) of the movable frame 510 along a vertical direction relative to the work surface 8. For instance, for the case where the movable frame 510 is released and is permitted to fall (under the influence of gravity) toward the work surface 8, the hydraulic cylinder 52 is configured to limit the speed of free fall in such a way that the movable frame 510 does not come crashing down to the work surface 8, and cause unwanted damage to the movable frame 510. During free fall of the movable frame 510, the movable frame 510 pushes against the operating rod of the hydraulic cylinder 52 so that the hydraulic fluid in the hydraulic cylinder 52 becomes pushed from the hydraulic cylinder 52, past the hydraulic valve 51 (the hydraulic valve 51 presents a flow restriction or a flow resistance) which slows down the flow rate of the hydraulic fluid leaving the hydraulic cylinder 52), and into the hydraulic reservoir 450.

As depicted, for the case where the hydraulic valve 51 is placed in the closed state, the movable frame 510 cannot be moved because the hydraulic fluid cannot be moved from the hydraulic cylinder 52 to the hydraulic reservoir 450, and for this case, the movable frame 510 is said to be in a locked (unmovable) position regardless of any forces applied to vertically) move the movable frame 510. It is preferred that the movable frame 510 is movable along the vertical axis or direction, and not laterally (side to side).

The movable frame 510 is configured to surround the pallet stack 12. The movable frame 510 includes latches 40 positioned on opposite sides of the pallet stack 12. The latches 40 are configured to selectively latch the movable frame 510 with the pallet stack 12 (with the opposite sides of the pallet stack 12), between a latched state (latched condition as depicted in FIG. 7A) and an un-latched condition (an un-latched position) as depicted in FIG. 7G.

As depicted in FIG. 7A, the latches 40 latch the pallet 11 of the pallet stack 12 with the movable frame 510; in this manner the movable frame 510 and the pallet stack 12 are latched or locked together; it will be understood that as depicted in FIG. 7A, the pallet 10 is positioned on the ground, and supports the weight of the pallet stack 12 in this case.

For the case where the hydraulic valve 51 is positioned in the open state, the weight of the pallet stack 12 keeps (urges) the movable frame 510 in a stationary position relative to the work surface 8, and keeps the movable frame 510 from moving vertically upward away from the work surface 8.

The spring assembly 54 includes opposite ends: specifically, the spring assembly 54 includes a first end configured to be operatively connected to the movable frame 510. The spring assembly 54 also includes a second end configured to be operatively connected to the work surface 8. The spring assembly 54 is configured to provide energy storage and conversion. The spring assembly 54 may also be called an energy-storage assembly. The spring assembly 54 is configured to selectively (directly or indirectly) convert mechanical kinetic energy into potential energy and vice versa. For example, the spring assembly 54 is configured to push or to move the movable frame 510 back to the position as depicted in FIG. 7A, which is also depicted in FIG. 7H as well. In FIG. 7H, the spring assembly 54 becomes compressed (receives mechanical kinetic energy from the movable frame 510 as the movable frame (510) moves under the force of gravity under a controlled decent), and the spring assembly 54 continues to stay compressed or become compressed as long as the latches 40 continue to latch the movable frame 510 with the pallet stack 12. Once the latches 40 release (release the movable frame 510 from the pallet stack 12), the spring assembly 54 is permitted to expand (because the latches have been released), and the spring assembly 54 converts potential energy (stored energy) into mechanical kinetic energy in such a way as to vertically move the movable frame 510 away from the work surface 8. As depicted in FIG. 7A, the spring assembly 54 is in the neutral state (in which no energy stored in the spring assembly 54). The action of the spring assembly 54 is described in connection with FIG. 7F and FIG. 7G.

Referring to FIG. 7A, in accordance with a specific example, the latch 40 includes: a cam roller 740, a cam pivot 721, an arm 720, a cam follower 760, and a dog 700. It will be appreciated that the instance of the latch 40 is depicted in the above schematic in FIG. 7A (for the sake of convenience). The dog 700 may be called an arm extension. The cam follower 760 is provided by the arm 720. The cam roller 740 is fixedly connected to the stationary support frame 59, and rollably contacts the cam follower 760 provided by the arm 720. The cam pivot 721 is operatively connected to the movable frame 510. The arm 720 is pivotally connected to the cam pivot 721 in such a way that the arm 720 is configured to pivot relative to the movable frame 510 between a latching state or a latching condition (as depicted in FIG. 7A), and a non-latching state or a non-latching condition as depicted in FIG. 7G. The arm 720 is configured to move relative to the cam roller 740 in response to vertical movement of the movable frame 510 in such a way that contact between the cam roller 740 and the cam follower 760 is operatively maintained. The dog 700 extends from the arm 720, at a lower portion of the arm 720. The dog 700 is configured to selectively engage a pallet of the pallet stack 12. For the case where the latch 40 is placed in the latched position (FIG. 7A), the dog 700 engages the pallet, such as the pallet 11. For the case where the latch 40 is placed in the un-latched position (FIG. 7G), the dog 700 does not engage (not latch) the pallet, such as the pallet 11.

Referring to FIG. 7A, the spring assembly 54 (which is an example of a rising device) is configured to apply a vertical lifting force to the movable frame 510, and the vertical lifting force is large enough to vertically lift the movable frame 510 upwardly away from the work surface 8. However, the movable frame 510 moves vertically upwardly and once the movable frame 510 engages with the pallet stack 12 (via the dogs 700 of the latches 40), the lifting force provided by the spring assembly 54 is not large enough to continue to vertically lift both the combined weight of the movable frame 500 and the pallet stack 12 upwardly and away from the working surface 8. As depicted in FIG. 7A, once the movable frame 510 moves vertically and engages (becomes latched) with the pallet stack 12, the movable frame 510 remains stationary relative to the pallet stack 12 while the lifting force of the spring assembly 54 continues to be applied to the movable frame 510, while the weight of the pallet stack 12 continues to overcome or defeat the lifting force provided by the spring assembly 54 to the movable frame 510.

Figure 7B:
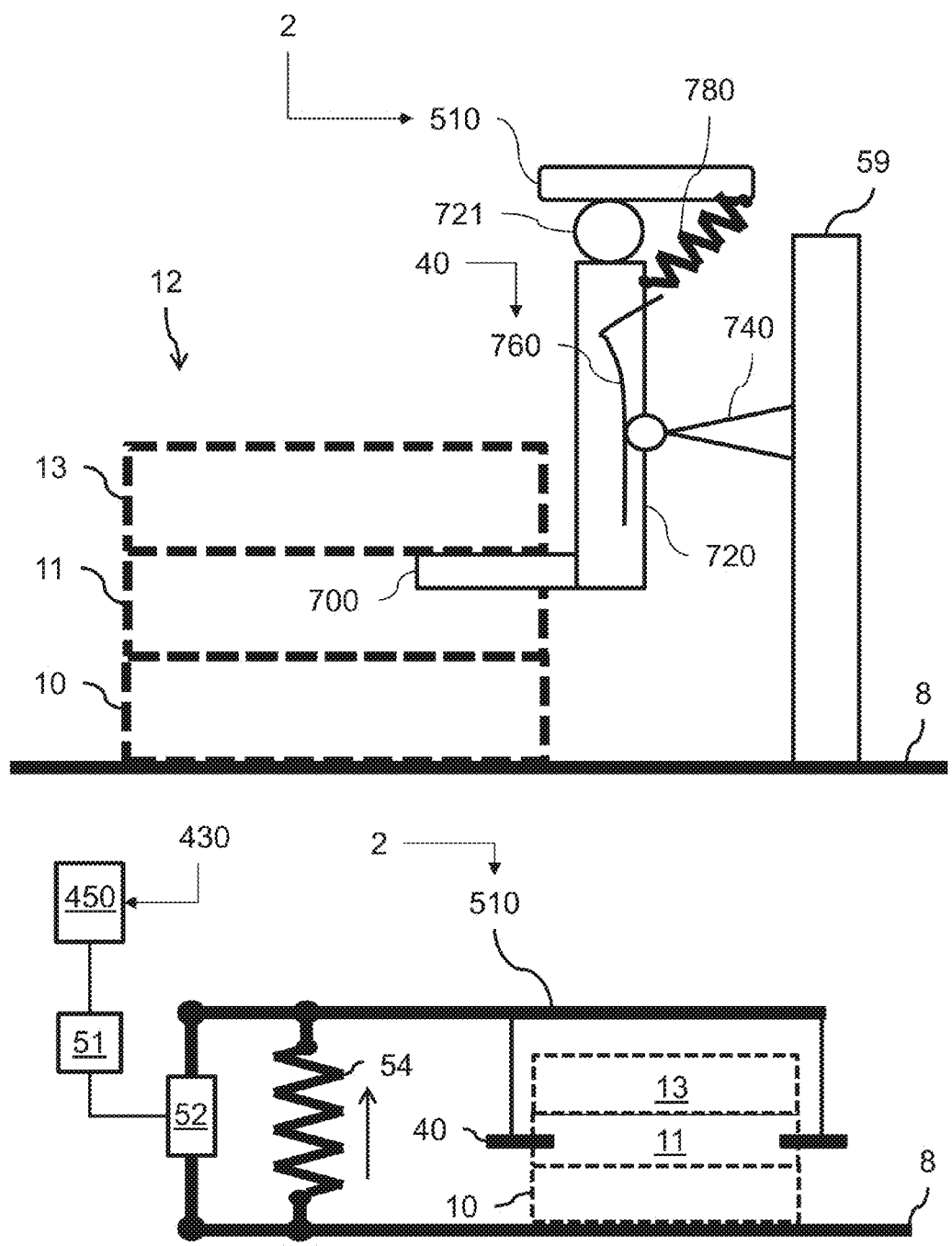

Referring now to FIG. 7B, the next operational sequence is depicted.

Figure 7C:
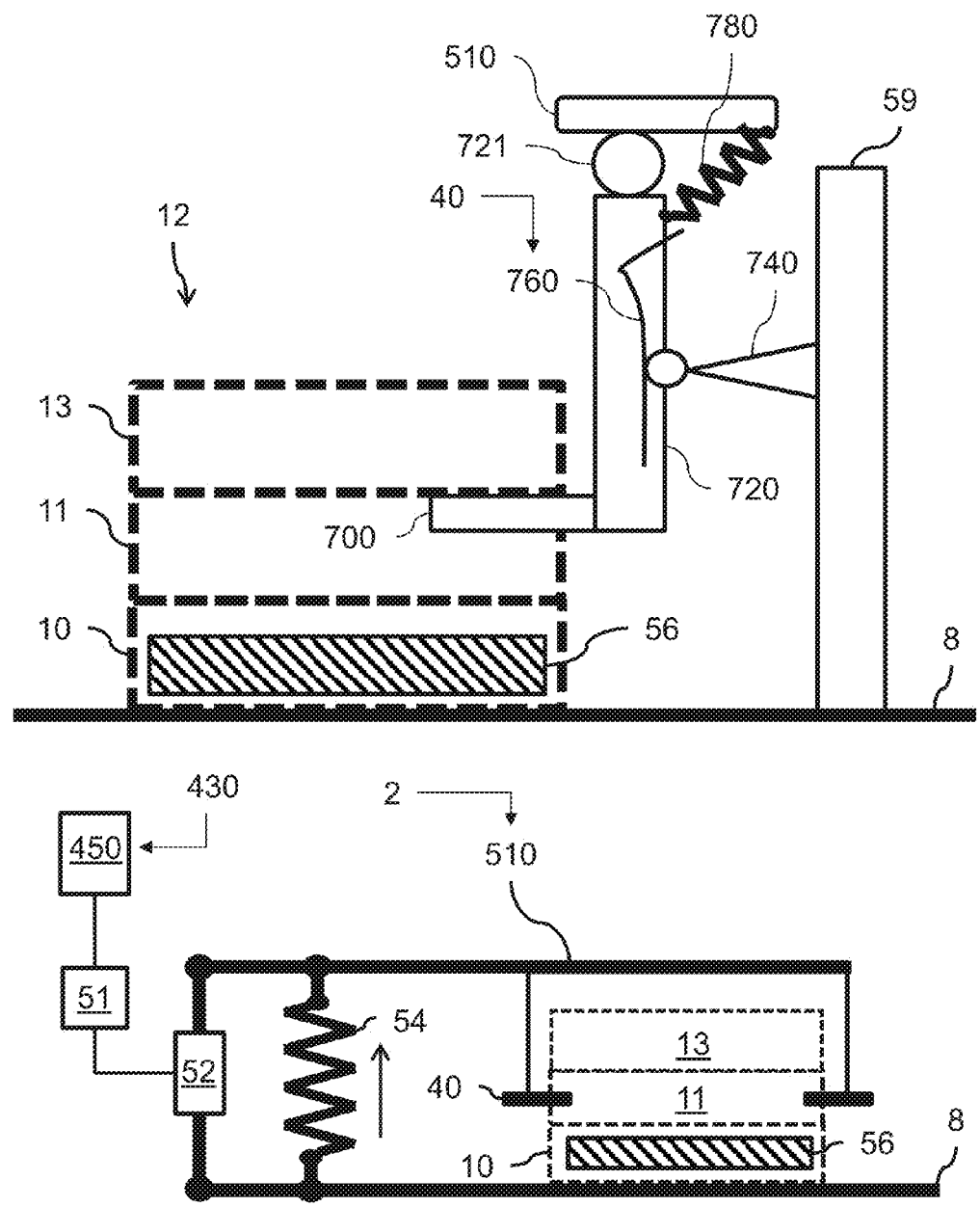

The hydraulic valve 51 is placed in the open state so that in this manner the hydraulic fluid may flow between the hydraulic reservoir 450 and the hydraulic cylinder 52 in response to vertical movement of the movable frame 510 (to be caused by the pallet transporter 56, which is not depicted in FIG. 7B but is depicted in FIG. 7C). For the case where the hydraulic valve 51 is placed in the open state and the movable frame 510 is not urged to be moved, then the fluid does not flow between the hydraulic reservoir 450 and the hydraulic cylinder 52. Once the hydraulic valve 51 is placed in the open state, and the movable frame 510 is free to fall (under influence of gravity) so that the dog 700 contacts the lower section of the pallet 11.

Referring now to FIG. 7C, the next operational sequence is depicted.

The pallet transporter 56 is moved into the pallet 10. The pallet 10 defines an opening configured to receive the forks of the pallet transporter 56. The pallet transporter 56 is now ready to vertically lift the pallet stack 12 (and the movable frame 510) away from the work surface 8. As depicted, the pallet transporter 56 is ready to lift the pallet stack 12 and the movable frame 510 (since the pallet stack 12 and the movable frame 510 are latched together by the latches 40).

Figure 7D:
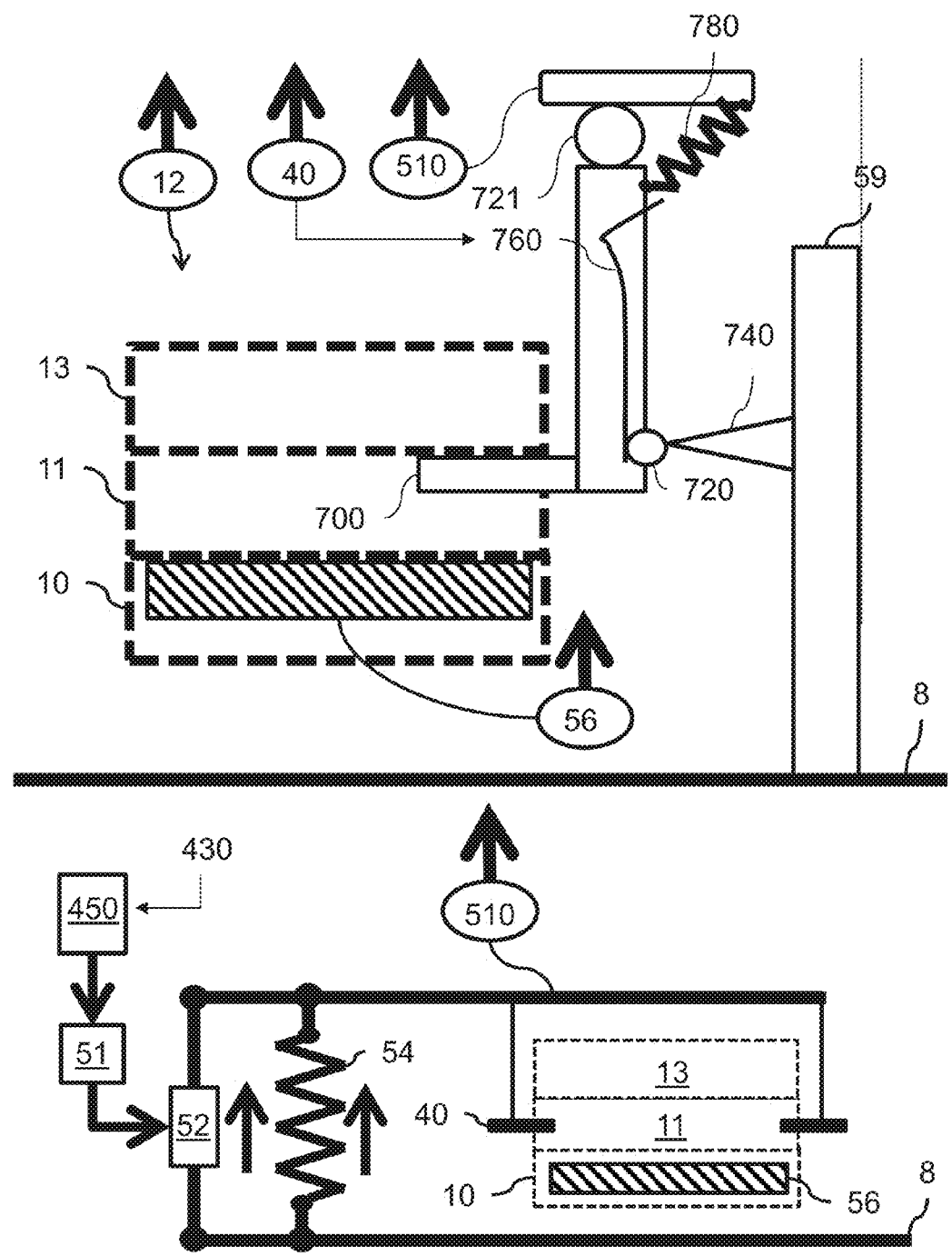

Referring now to FIG. 7D, the next operational sequence is depicted.

The spring assembly 54 is configured to apply the lifting force to the movable frame 510, and the lifting force is not large enough to lift the movable frame 510 vertically upwards away from the work surface 8 while the movable frame 510 remains engaged (latched) with the pallet stack 12 (via the dogs 700 of the latches 40), because the weight of the pallet stack 12 overcomes the lifting force applied by the spring assembly 54 to the movable frame 510. The lifting force provided by the spring assembly 54 is not large enough to vertically lift the combined weight of the movable frame 500 and the pallet stack 12 upwardly and away from the working surface 8. However, once the pallet transported 56 is engaged with the pallet 10 (with the lower most pallet of the pallet stack 12), the pallet transporter 56 is used to apply just enough vertical lifting force to the pallet stack 12 in such a way that the combination of the lifting force provided by the spring assembly 54 and the lifting force provided by the pallet transporter 56 (in combination) are applied to the combination of the movable frame 510 and the pallet stack 12. The combined lifting force from both the spring assembly 54 and the pallet transporter 56 is enough to vertically lift the combination of the movable frame 510 and the pallet stack 12 upwardly away from the working surface 8. Therefore, the movable frame 510 is configured to movably hold, at least in part, the pallet stack 12 between the pallet-storage position and the pallet-dispensation position. The movable frame 510 is also configured to hold the pallet stack 12 relative to the pallet transporter 56 in such a way that the pallet transporter 56 is permitted to vertically lift the pallet stack 12 as the movable frame (510) is provided with vertical-lift assistance; the vertical-lift assistance may be provided, for example, from the spring assembly 54. In accordance with an option, the raising device (such as the spring assembly 54) is configured to vertically lift the movable frame 510 away from the pallet-dispensation position toward the pallet-storage position while the pallet transporter 56 is permitted to vertically lift the pallet stack 12. In accordance with an option, the raising device (such as the spring assembly 54 may be electrically unpowered if so desired. For the case where the riser assembly or the spring assembly 54 is electrically unpowered, a technical advantage is that the apparatus may operate relatively faster than for the case where electrical power is used to vertically lift the movable frame 510.

The hydraulic valve 51 is in the open state. The pallet transporter 56 vertically lifts the pallet 10 away from the work surface 8, thus lifting the pallet stack 12 and the movable frame 510 vertically above the work surface 8 because movable frame 510 is latched to the pallet stack 12 by way of the latch 40. The pallet transporter 56 does the work of vertically lifting the pallet stack 12. The movable frame 510 pulls on the rod of the hydraulic cylinder 52, and since the hydraulic valve 51 is placed in the open state, then the hydraulic fluid flows from the hydraulic reservoir 450 to the hydraulic cylinder 52, thus filling the hydraulic cylinder 52 with additional hydraulic fluid. As the pallet stack 12 is moved vertically upward, and the latch 40 continues to contact the bottom section of the pallet 11 as the pallet stack 12 is vertically lifted away from the work surface 8. As depicted, for the case where the pallet stack 12 is vertically lifted, the latch 40 transfers the weight of the movable frame 510 to the pallet 11 of the pallet stack 12; and for this case, the weight of the pallet stack 12 is fully supported by the pallet transporter 56. The arm 720 is also vertically moved while the cam roller 740 remains stationary relative to the movement of the cam arm 720.

Figure 7E:
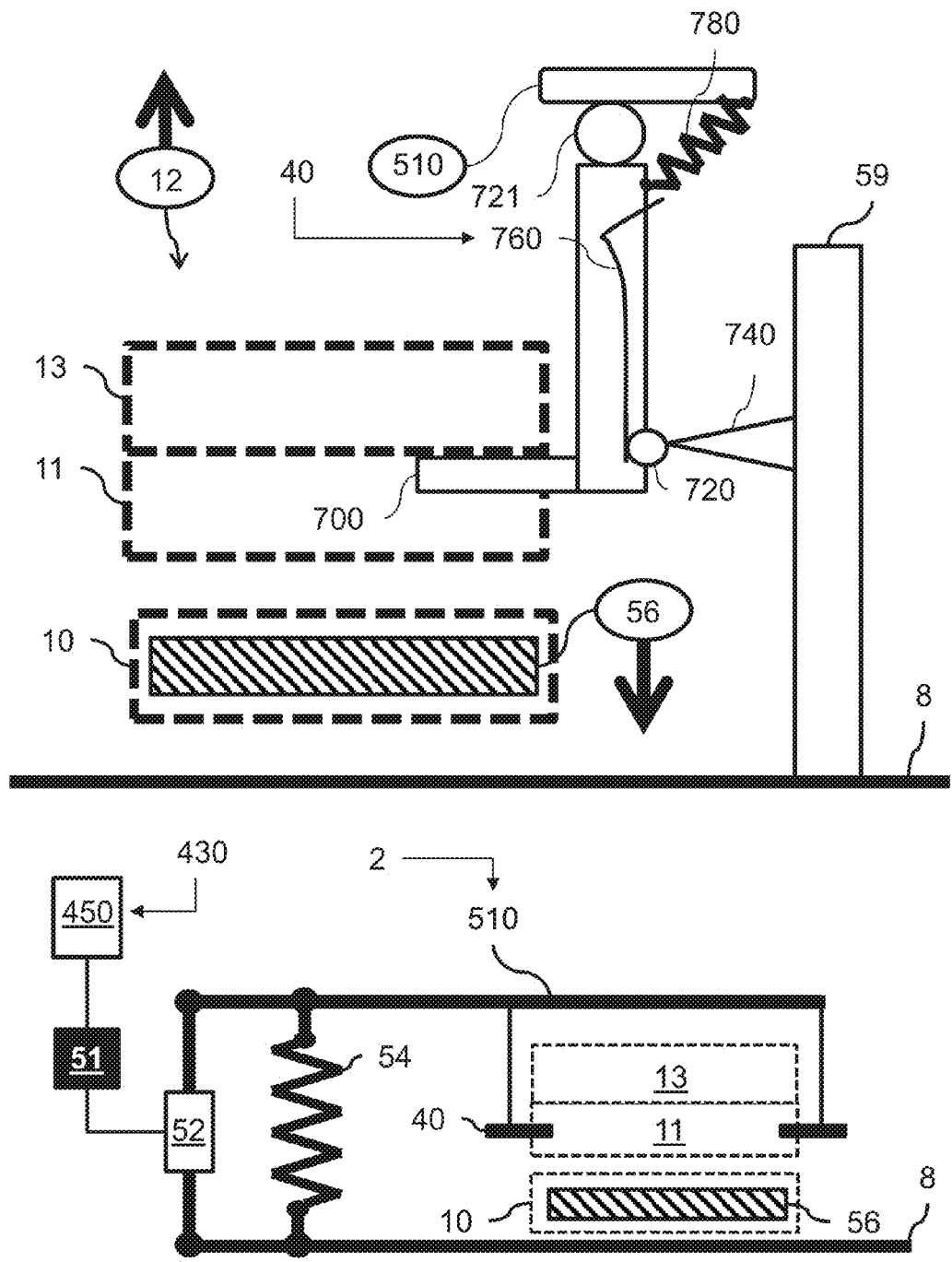

Referring now to FIG. 7E, the next operational sequence is depicted.

The hydraulic valve 51 is placed in a closed state. In this case, the fluid cannot flow out from the hydraulic cylinder 52, and so the hydraulic cylinder 52 is locked up and cannot move. The movable frame 510, as well, cannot move since the rod of the cylinder cannot move. Now, the pallet transporter 56 moves the pallet 10 vertically down and away from the pallet stack 12, vertically downward towards the work surface 8. This is done in such a way that a clearance gap is formed between the top of pallet 10 and the bottom of pallet 11. The pallet transporter 56 lowers the pallet 10 while pallet 11 remains latched to the movable frame 510, with the rest of the pallet stack 12 resting on pallet 11. The weight of the movable frame 510 and the pallet stack 12 is supported by the hydraulic cylinder 52. Since there is no fluid flowing from the hydraulic cylinder 52, the hydraulic cylinder 52 is locked, and keeps the movable frame 510 from falling vertically toward the work surface 8. For the case depicted in FIG. 7E, gravity cannot overcome the force of the hydraulic cylinder 52 that acts to push or to maintain the position of the movable frame 510 in a stationary position relative to the stationary support frame 59. Thus, the movable frame 510 and pallet stack 12 remain in static position, hanging above the work surface 8.

Figure 7F:
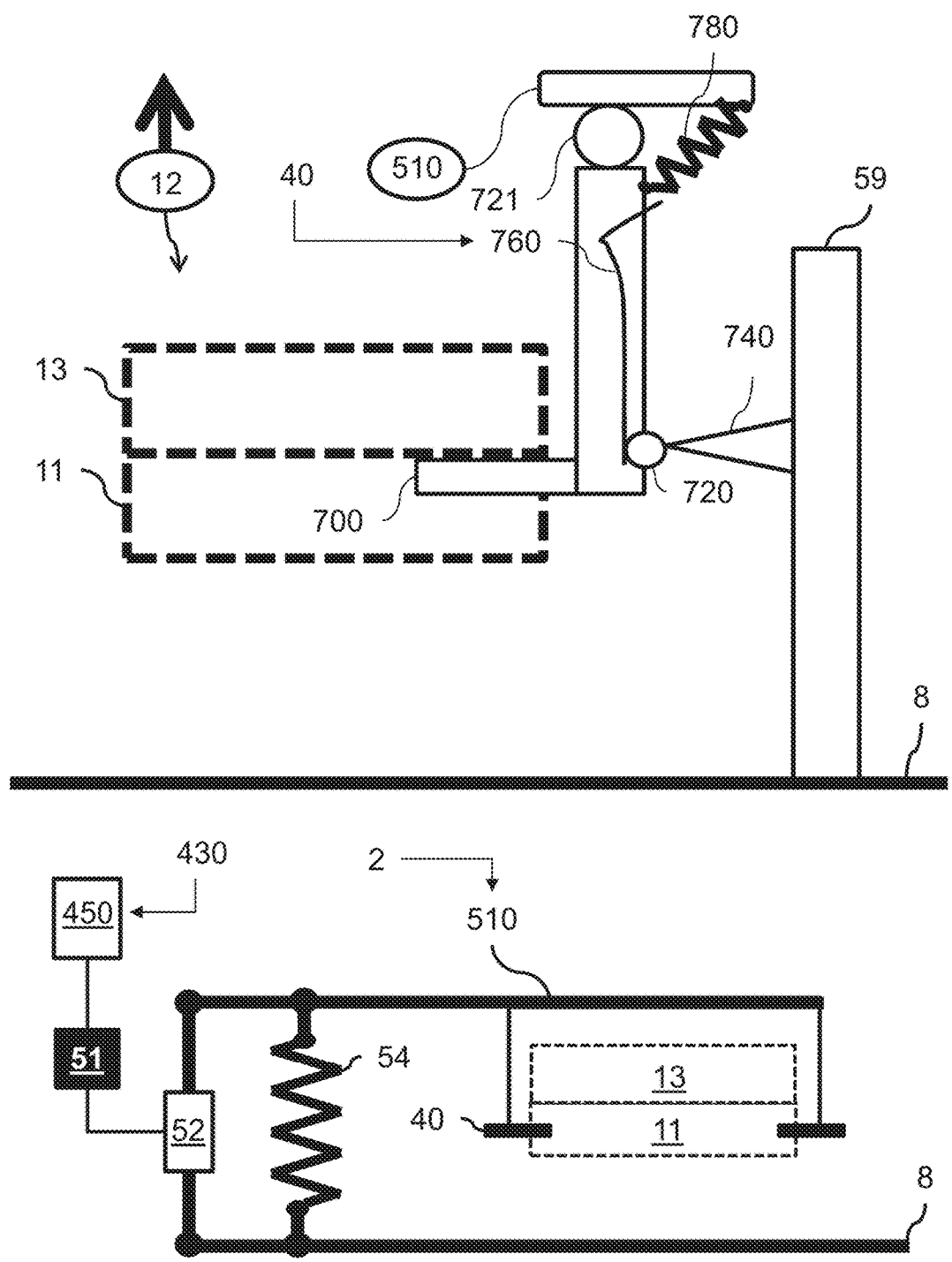
Figure 7G:
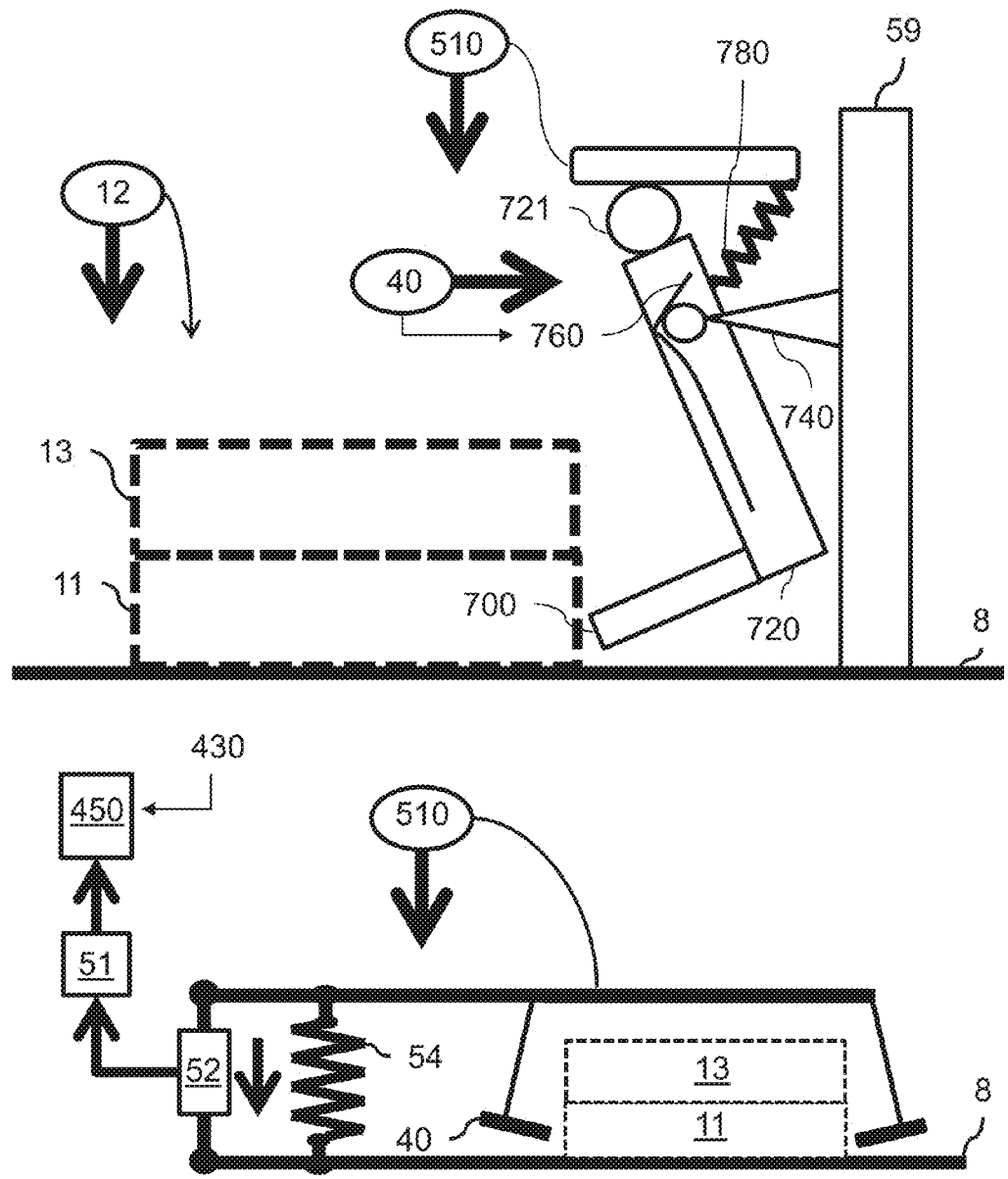
Figure 7H:
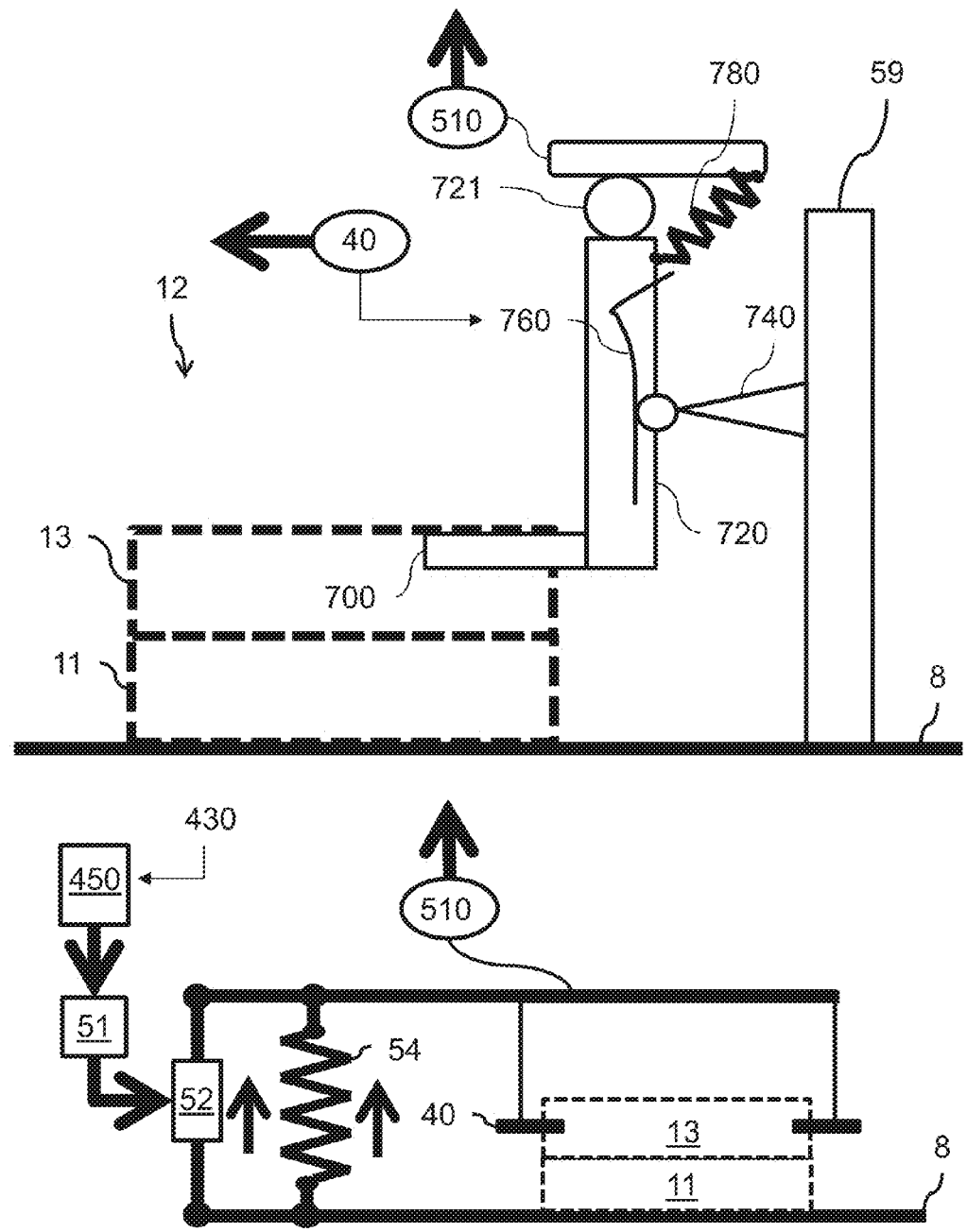

Referring now to FIG. 7F, the next operational sequence is depicted.

The hydraulic valve 51 remains in the closed state, there is no flow of fluid between the hydraulic cylinder 52 and the hydraulic reservoir 450, and the hydraulic cylinder 52 remains in a locked state and supports the weight of the movable frame 510 and the pallet stack 12 while the pallet transporter 56 is moved entirely away from the movable frame 510. For instance, a detection assembly 800 of FIG. 10a may include an arm 810 or a photocell (not depicted and known) that may be used to detect that the pallet transporter 56 is no longer present below the movable frame 510. The detection assembly may be mechanical and/or electric-mechanical in nature. For example, the signal from the photocell may be used to initiate the opening (or closing) of an electro-mechanical hydraulic valve 51 (depicted in FIG. 7G). For example, the arm 810 may be operatively connected to the hydraulic valve 51 and be used to initiate the opening (or closing) of the hydraulic valve 51. As depicted in FIG. 7F, the movable frame 510 is held in the static (stationary) position above ground because the hydraulic valve 51 is closed, thus locking out movement of the movable frame 510.

In another example, there is an embodiment where the hydraulic valve 51 (or flow-control valve) is preset to a partially open setting in such a way as to correspond to a timed or speed-controlled automatic lowering of the movable frame 510 from the pallet-storage position to the pallet-dispensation position, regardless of whether the pallet that had been dispensed has been (in fact) removed or not from the pallet dispenser 2, once the vertical support of the pallet transporter 56 has been removed from below the movable frame 510. It will be appreciated that this embodiment does not practically include a detection assembly, and is mechanically or electro-mechanically simpler. This embodiment may be cheaper to manufacture.

It will be appreciated that the movable frame 510 is configured to movably hold, at least in part, the pallet stack between the pallet-storage position and the pallet-dispensation position. The movable frame 510 is also configured to hold the pallet stack relative to the pallet transporter in such a way that the pallet transporter is permitted to vertically lift, at least in part, the pallet stack and the movable frame 510 from the pallet-storage position toward the pallet-dispensation position as the movable frame 510 is provided, at least in part, with vertical-lift assistance through stored potential energy. The movable frame 510 is also configured to automatically vertically descend, after the pallet transporter has been moved entirely away from the movable frame 510, from the pallet-dispensation position toward the pallet-storage position. It will be appreciated that, in accordance with an option, a photocell may be used to initiate automatic movement of the movable frame 510. The movable frame 510 may be configured (in accordance with an option) to automatically vertically descend, after the pallet transporter has been moved entirely away from the movable frame 510, from the pallet-dispensation position toward the pallet-storage position, while the movable frame 510 receives an opposing force configured to slow down vertical decent of the movable frame 510 and the pallet stack to avoid free fall under gravity. For instance, the movable frame 510 may configured to be held at the pallet-dispensation position and locked out from vertical descent until the pallet transporter is moved entirely away from the movable frame 510. For instance, the movable frame 510 may be configured to automatically vertically descend, after the pallet transporter has been moved entirely away from the movable frame 510, in response to automatic detection that the pallet transporter is no longer present in the movable frame 510.

In summary, with reference to FIG. 7F, in general terms there is provided a method of operating a pallet dispensing system, comprising: holding a pallet stack relative to a pallet transporter in such a way that the pallet transporter is permitted to vertically lift, at least in part, the pallet stack and a movable frame being configured to movably hold, at least in part, the pallet stack, from the pallet-dispensation position (example, a position low on the ground) toward the pallet-storage position (example, high and above the ground) as the movable frame is provided, at least in part, with vertical-lift assistance through stored potential energy; and automatically vertically descending the movable frame from the pallet-storage position toward the pallet-dispensation position in response to the pallet transporter withdrawing, at least in part, vertical support to the movable frame.

In summary, with reference to FIG. 7F, in general terms there is provided an apparatus, comprising: a pallet dispensing system, including: a movable frame being configured to movably hold, at least in part, a pallet stack between a pallet-storage position and a pallet-dispensation position; the movable frame also being configured to hold the pallet stack relative to a pallet transporter in such a way that the pallet transporter is permitted to vertically lift, at least in part, the pallet stack and the movable frame from the pallet-dispensation position (example, a position low on the ground) toward the pallet-storage position (example, high and above the ground) as the movable frame is provided, at least in part, with vertical-lift assistance through stored potential energy; and the movable frame also being configured to automatically vertically descend from the pallet-storage position toward the pallet-dispensation position in response to the pallet transporter withdrawing, at least in part, vertical support to the movable frame.

With reference to FIG. 7F, (in accordance with an option), the movable frame is also configured to automatically vertically descend from the pallet-storage position toward the pallet-dispensation position in response to the pallet transporter withdrawing, at least in part, vertical support to the movable frame after the pallet transporter removes a pallet from the pallet stack being held by the movable frame at the pallet-storage position (example, high and above the ground). More specifically, the movable frame is also configured to automatically vertically descend without the movable frame responding to any operator input to do just so but with the movable frame responding to the pallet transporter withdrawing, at least in part, vertical support to the movable frame; this condition is expected when it is time for the pallet transporter to remove, at least in part, a pallet from the pallet stack held by the movable frame at the pallet-storage position (example, high and above the ground). It is understood that the movable frame is configured to automatically vertically descend at any time after a condition becomes true; the condition that is to become true is this: the pallet transporter withdraws (at least in part) vertical support to the movable frame. This condition may occur immediately at the time of withdrawal of the vertical support, or the condition may occur automatically at a time later after withdrawal of the vertical support to the movable frame. The condition does not require intervention from a user or a person or an operator, but rather the movable frame is configured to react automatically (thereby saving time and/or reducing machine complexity from a user operation point of view). For instance, vertical decent of the movable frame may occur quickly or slowly (as may be desired); for example, a travel time of 30 seconds may be provided for the movable frame to automatically vertically descend from the pallet-storage position (example, high and above the ground) toward the pallet-dispensation position (example, low on the ground). For this case, the operator operating the pallet transporter should act quickly and with care so as to avoid accidents and/or injury while the movable frame is vertically descending (that is, the pallet stack could reach the pallet-dispensation position before the pallet transporter has been completely moved away from the movable frame at a safe distance (to avoid unwanted interferences). For instance, the travel time (for decent) may be controlled by the volume of flow of fluid through the hydraulic valve; the hydraulic valve is set (that is, preset) between a fully open position and a closed position (the amount depends on the desired amount of travel time required for the movable frame). The hydraulic valve is configured to allow flow of hydraulic fluid corresponding to amount of the travel time desired (permitted) for decent (lowering) of the movable frame from the pallet-storage position (example, high and above the ground) to the pallet-dispensation position (located on the working surface or low to the ground). It will be appreciated that a relatively shorter travel time or a relatively faster decent may not be desirable since this condition may lead to an undesirable outcome (for safety for the case where the operator is inexperienced). For a relatively shorter travel time or a relatively faster decent, the operator should be properly trained on operating the pallet transporter as quickly and safely as possible (otherwise, a longer travel time or a slower decent may be an appropriate alternative in order to improve safety). In addition to a preset travel time or a speed-controlled decent, an additional technical feature (such as a gated feature or a detection assembly) may be added to determine the state of the machine at the time the pallet transporter no longer supports the weight of the movable frame (no longer provides vertical support); for instance, a photocell or an arm, etc., may be included, and may be configured to identify whether the pallet transporter has been safely moved away from possible interference with vertical decent of the movable frame. The additional technical feature simply adds another layer of safety to the operation of the movable frame during vertical decent of the movable frame. For instance, once the photocell provides an indication that the pallet transporter has moved to a safe distance away (relative to the movable frame) so that interference will not occur during vertical decent, then the movable frame may proceed with vertical decent to the pallet-dispensation position (example, low to the ground). Vertical decent may be implemented by opening the hydraulic valve in such a way that a preset amount of flow is allowed to control decent of the movable frame. The gated feature (gated condition or a state change detection) includes waiting for the pallet transporter to be completely removed (for improved safety factor or condition) from the movable frame before the movable frame is allowed to vertically descend to the pallet-dispensation position. For example, in an embodiment, immediately after confirmation that the pallet transporter has cleared away from the movable frame (that is, the state detection by a photo cell confirmation), then controlled vertical decent of the movable frame may begin toward the pallet-dispensation position, without operator intervention or input from the operator (thus simplifying operator duties). The gated condition provides improved safety (improvement over simply releasing the movable frame for vertical descent once the pallet transporter no longer provides vertical support to the movable frame at the pallet-storage position (example, high and above the ground).

Referring now to FIG. 7G, the next operational sequence is depicted.

The hydraulic valve 51 is placed in the open state, and the weight of the movable frame 510 and the pallet stack 12 push against the rod of the hydraulic cylinder 52 and thus the hydraulic fluid in the hydraulic cylinder 52 is urged to flow toward the hydraulic valve 51, through the hydraulic valve 51 and into the hydraulic reservoir 450. The hydraulic valve 51 presents a restricted orifice to the flow of hydraulic fluid, thus slowing down or moderating the flow of hydraulic fluid from the hydraulic cylinder 52 to the hydraulic reservoir 450. In the this manner, resistance or an opposing force is applied to the downward movement of the movable frame 510 and the pallet stack 12, thus slowing down the vertical decent of the movable frame 510 and the pallet stack 12 toward the work surface 8, thereby avoiding free fall under gravity. The opposing force provided by the hydraulic cylinder 52 cannot overcome the force of gravity acting on the movable frame 510 and the pallet stack 12.

Once the movable frame 510 vertically falls toward the work surface 8, the movable frame pushes on the spring assembly 54 and thus the movable frame 510 compresses the spring assembly 54. In this case, the spring assembly 54 stores energy (becomes compressed). The spring assembly 54 becomes compressed and stores potential kinetic energy received from the movable frame 510. The potential energy stored by the spring assembly 54 will be used (at least in part) in FIG. 7G to vertically lift the movable frame 510 away from the work surface 8. The spring assembly 54 is used later in the process of de-latching and positioning the movable frame 510 as depicted in FIG. 7A.

In accordance with one option, the hydraulic valve 51 is configured such that the hydraulic valve 51 is placed in the open state only when the pallet 10 and the pallet transporter 56 become completely cleared from the movable frame 510. With this option, the operator of the pallet transporter 56 may take their time to remove the pallet transporter 56 away from the movable frame 510 since the movable frame 510 for this case remains static or stationary (hanging above the work surface 8) until the hydraulic valve 51 is placed in the open state.

In accordance with another option, the hydraulic valve 51 is configured to be placed in the open state (a fluid flow state) automatically once the pallet transporter 56 begins to move away from the movable frame 510. It is understood that in this case the operator of the pallet transporter 56 must have sufficient skill to move the pallet transporter 56 and the pallet 10 away from the movable frame 510 as quickly as possible since the movable frame 510 has begun its vertical controlled decent, and it would be desired to avoid collision between the descending movable frame 510 and the pallet transporter 56 (naturally). It is understood that the movable frame 510 is allowed to descend to ground (in a controlled free fall) because fluid flows from the hydraulic cylinder 52 to the hydraulic reservoir 450 since the hydraulic valve 51 is placed in the open condition. As the movable frame 510 vertically descends toward the work surface 8, the latches 40 become de-latched from pallet 11 as the pallet stack 12 and movable frame 510 are moved toward the working surface. The latches 40 pivot away from the pallet 11. Specifically, the cam follower 760 allows the cam roller 740 to pivot the arm 720. The cam follower 760 causes automatic de-latching of the latch 40 as the movable frame 510 moves or descends toward the work surface 8. The spring assembly 54 has stored potential energy, ready to be used to lift the movable frame 510 once the latches 40 are placed in the un-latched condition (as depicted in FIG. 7G). Once the latches 40 are placed in the un-latched state, the movable frame 510 is pushed by the spring assembly 54 vertically upwardly and away from the work surface 8.

Therefore in view of the above, another embodiment may be provided in which the automatic lowering of the movable frame may be performed as soon as vertical support is removed from the movable frame at the pallet-storage position (example, high and above the ground). For instance, the hydraulic valve is connected in parallel to a check valve, and the check valve is configured to allow for the lifting of the movable frame by the pallet transporter; then, upon removal of the lifting action, the movable frame automatically starts to lower (vertical descent) with the volume of flow through the hydraulic valve controlling the speed at which the movable frame lowers. The greater the hydraulic valve is opened, the faster the movable frame vertically descends from the pallet-storage position (example, high and above the ground) to the pallet-storage position; then, the movable frame may descend relatively slowly over time. The hydraulic valve is preset or calibrated for a specific travel or vertical descent time (e.g. 30 seconds). Reference is made to FIG. 4a for detailed view of hydraulic system.

Referring now to FIG. 7H, the next operational sequence is depicted.

The spring assembly 54 has stored potential energy, ready to be used to lift the movable frame 510 once the latches 40 are placed in the un-latched condition (as depicted in FIG. 7G). Once the latches 40 are placed in the un-latched state, the movable frame 510 is pushed by the spring assembly 54 vertically upwardly and away from the work surface 8. Once de-latching occurs, the spring assembly 54 changes state from the compressed state to neutral state and thus the spring assembly 54 expends energy to lift the movable frame 510 vertically upwardly away from the work surface 8. The movable frame 510 moves vertically upward by force received from spring assembly 54. The spring assembly 54 expends kinetic energy that moves the movable frame 510 upwardly while the pallet stack 12 remains stationary on the work surface 8. Once the movable frame 510 moves vertically up and away from the work surface 8, the latches 40 securely engage pallet 13, and then the pallet 11 is available for removal from the bottom section of the pallet stack 12. The spring assembly 54 reaches the neutral state (not biased or not storing potential energy). The hydraulic valve 51 remains in the open state so that hydraulic fluid is ready to flow between the hydraulic cylinder 52 and the hydraulic reservoir 450 for the next dispensing cycle. The movable frame 510 held in a static position. The movable frame 510 remains at rest on the pallet stack 12, and the pallet stack 12 rests on the work surface 8. The cycle is ready to begin for the removal of pallet 11 once required to do just so.

Figure 7I:
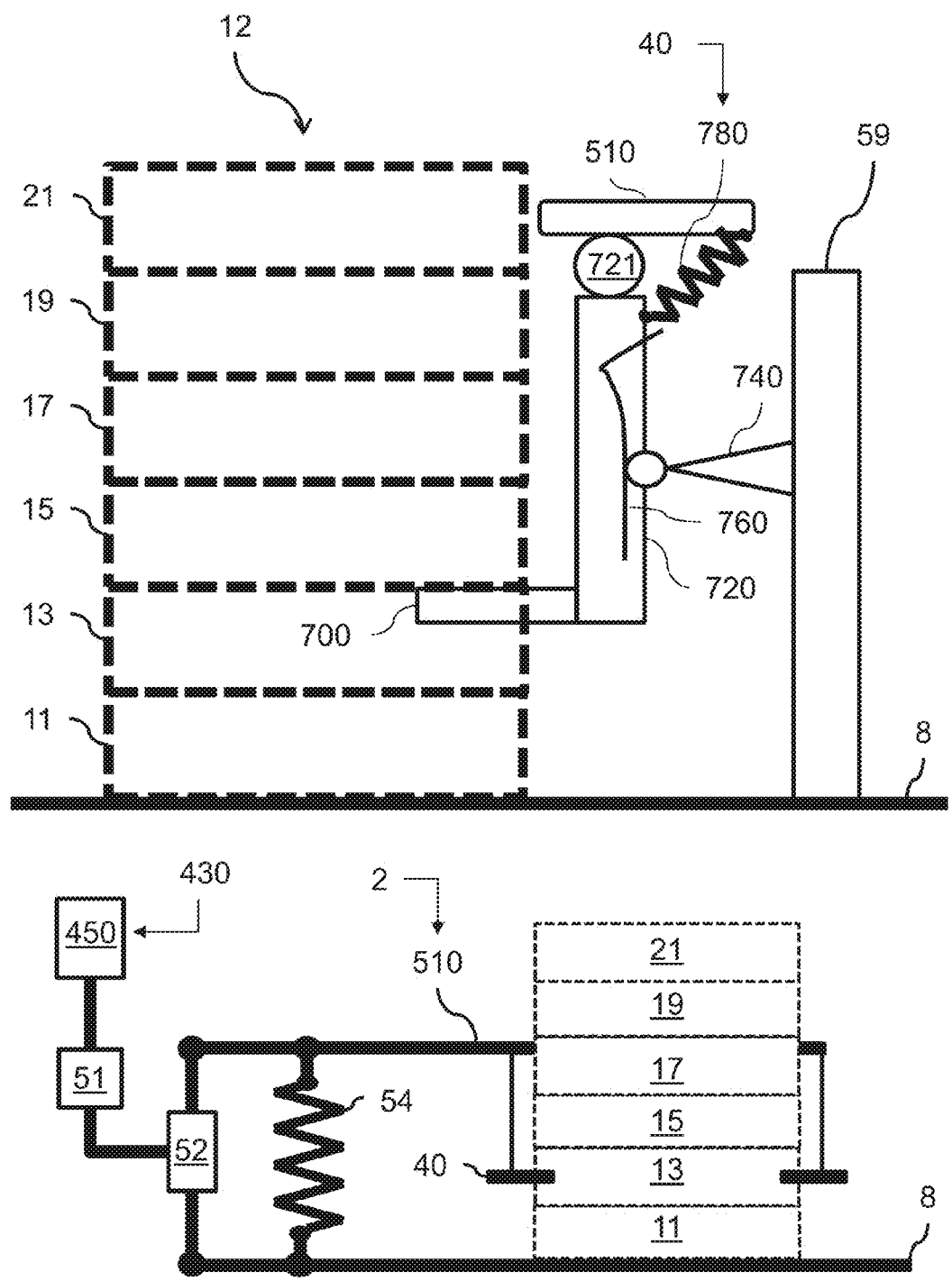

FIG. 7I depicts the operational sequence for inserting a pallet into the pallet dispenser 2.

The pallet transporter 56 (not depicted), enters the pallet dispenser 2 with the pallet 21 positioned on the pallet 19. The pallet 19 is positioned on the pallet 17. The pallet 17 is positioned on the pallet 15. The pallet 15 is then positioned on the pallet 13 located in the pallet dispenser 2.

To summarize (in view of FIGS. 7A to 7I), the pallet dispensing system (100) includes the movable frame (510) configured to movably hold, at least in part, the pallet stack (12) between the pallet-storage position and the pallet-dispensation position. The movable frame (510) is also configured to hold a pallet (10) of the pallet stack (12) relative to a pallet transporter (56) in such a way that the pallet transporter (56) is permitted to vertically lift the pallet stack (12) and allow the movable frame (510) to travel upwards because of the spring force (or other force provided by another device). The pallet dispensing system (100) also includes a dampening device configured to dampen, at least in part, free-fall descent of the movable frame (510) under influence of gravity from the pallet-storage position toward the pallet-dispensation position. Since the pallet transporter (56) lifts the pallet stack (12), a taller instance of the pallet stack 12 may be possible. In accordance with an option, the pallet dispensing system (100) is adapted such that the movable frame (510) is configured to movably hold the pallet stack (12) having the pallet (10) between the pallet-storage position and the pallet-dispensation position without consuming electrical energy, and the dampening device is configured to dampen free-fall descent of the movable frame (510) under influence of gravity from the pallet-storage position toward the pallet-dispensation position without consuming electrical energy.

In general terms, in view of FIGS. 7A to 7I, an apparatus includes a pallet dispensing system (100). The pallet dispensing system (100) includes a movable frame (510) configured to movably hold, at least in part, a pallet stack (12) between a pallet-storage position and a pallet-dispensation position. The movable frame (510) is also configured to hold a pallet (10) of the pallet stack (12) relative to a pallet transporter (56) in such a way that the pallet transporter (56) is permitted to vertically lift the pallet stack (12) and allow the movable frame (510) to travel upwards because of the spring force (or other force provided by another device).

Figure 8:
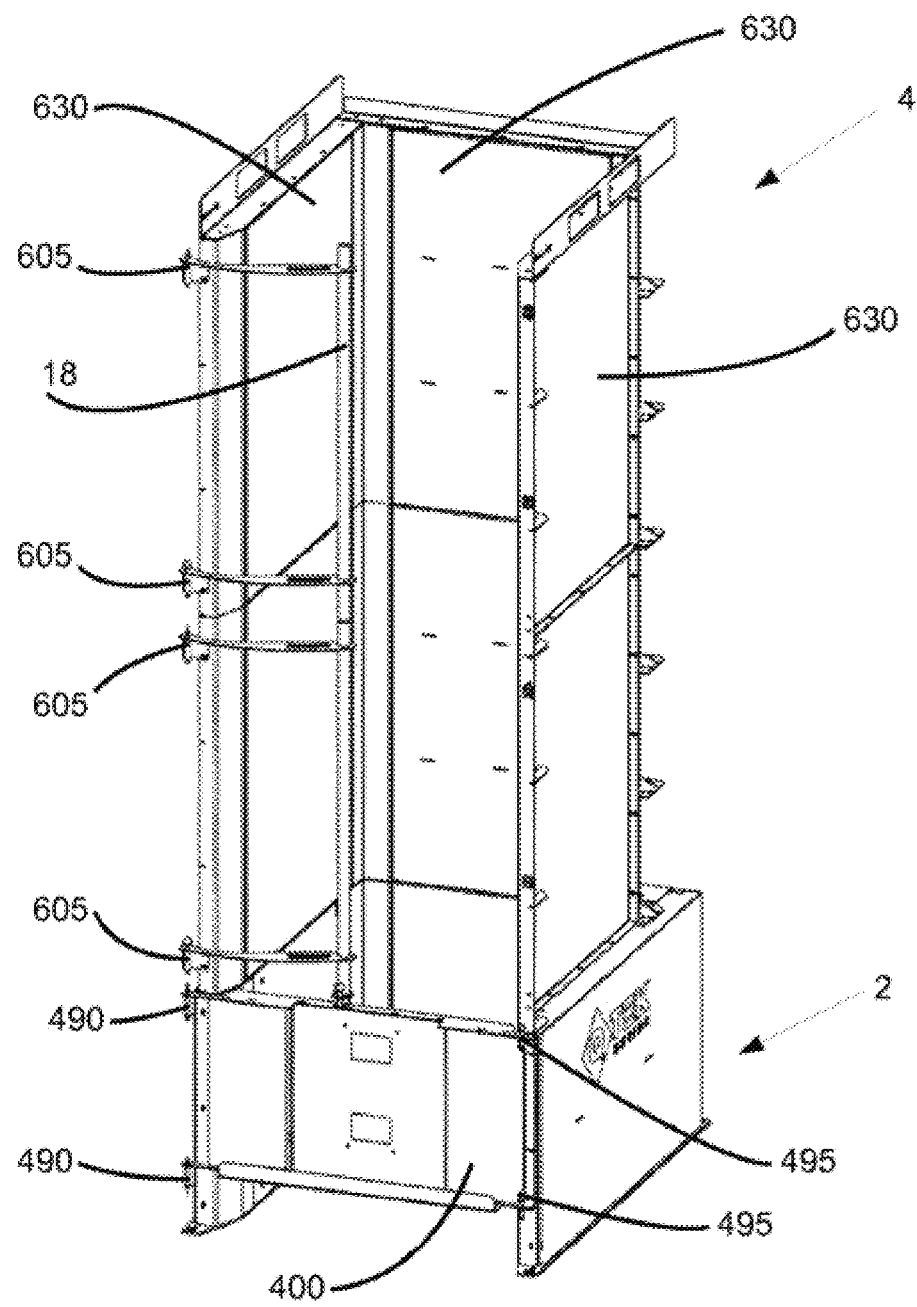
FIG. 8 is a perspective view of another embodiment of the pallet dispenser.

FIG. 8 is a perspective view of an example of the pallet dispenser 2 of FIG. 1.

FIG. 8 depicts the following components: the pallet dispenser 2, the pallet-stack enclosure 4, the pipes 18, the front side 400, the cotter pins 495, the hinge 490, the hinges 605, and the solid walls 630. The restraints can also include solid walls 630 and mesh walls (not shown). In yet another example, the restraints can include webbing (not shown) that is detachably connected to the instances of the support 600.

In some examples, as shown in FIG. 8, the front side of the pallet dispenser 2 (i.e., the front side of the movable 510 and stationary support frame 59) may need to open so that the pallet dispenser 2 can be serviced or reloaded with additional pallets 10. In this example, the front side 400 of the stationary support frame 59 may comprise one or more hinges 490 so that the front side of the stationary support frame 59 can be opened like a door. The hinges 490 may be between the front side 400 of the stationary support frame 59 and either of the first side 440 or the second side 460 of the stationary support frame 59.

A locking device for ensuring that the hinged front side of the stationary support frame 59 does not open when the pallet dispenser 2 is in operation may also be provided. In this example, locking pins such as cotter pins 495 may be used to secure the hinged front side 400 of the stationary support frame 59. The locking pin would typically be positioned at the opposite side of the hinge 490.

A skilled technician would understand that alternate means for securing the front 400 of the stationary support frame 59 could be used without departing from the scope of this disclosure. For example, a locking latch, sliding bolt, or cam roller and follower could be used to ensure that the front 400 of the stationary support frame 59 does not open while the pallet dispenser 2 is in operation.

In some example, the movable frame 510 may also comprise a front side 500. In the embodiment where the front side 400 of the stationary support frame 59 opens, the front side of the movable frame 510 may also open. In this example, the front side 400 of the movable frame would operate much in the same way as the front side 400 of the stationary support frame 59, as discussed above.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

Alternative Embodiments

In another embodiment, the pallet dispenser 2 comprises one or more dampeners to control the rate at which the movable frame 510 transitions from the raised state (position) to the lowered state (position). In some examples, the dampeners slow the lowering of the movable frame 510 and pallet stack 12 to prevent damage to the pallets 10 or the work surface 8. In other examples, the dampeners may be adjustable so that the rate at which the movable frame 510 transitions to the lowered state 32 can be adjusted.

In this example, the dampeners are one or more telescoping hydraulic cylinders 52 fillable with a compression-resistant fluid that is connected to a closed-loop hydraulic circuit 430. The closed-loop hydraulic circuit 430 further comprises a hydraulic reservoir 450 for storing a compression-resistant hydraulic fluid for the telescoping hydraulic cylinders 52. A skilled technician would understand that different means of dampening the transition could be used without departing from the scope of this disclosure. For example, a ratcheting mechanism could be used to dampen the rate at which the pallet dispenser 2 transitions from the raised state 30 to the lowered state 32.

In an example, one or more telescoping hydraulic cylinders 52 are connected to a hydraulic reservoir 450 in a closed-loop hydraulic circuit 430. The closed-loop hydraulic circuit 430 contains a compression-resistant or non-compressible fluid that is used to slow the lowering of the pallet dispenser 2 from the raised position 30 to the lowered position 32. In this example, as the movable frame 510 transitions to the raised state, compression-resistant fluid is drawn from the hydraulic reservoir 450 into the one or more telescoping hydraulic cylinders 52 through the closed-loop hydraulic circuit 430. In this example, the negative pressure created in the telescoping hydraulic cylinders 52 as the movable frame 510 is raised causes the fluid to be drawn into the telescoping hydraulic cylinders 52 from the hydraulic reservoir 450 through the closed-loop hydraulic circuit 430. The telescoping hydraulic cylinders 52 are configured to draw the compression-resistant hydraulic fluid from the hydraulic reservoir 450 to the telescoping hydraulic cylinders 52 without allowing the fluid to flow back into the reservoir. In this example, a one-way valve or a check valve is used. When the movable frame 510 is in the raised position 30 the telescoping hydraulic cylinders 52 should contain sufficient compression-resistant fluid to support the weight of the movable frame 510 and the pallet stack 12.

In this example, the use of a compression-resistant hydraulic fluid was preferred as the fluid does not compress and act like a spring when pressure or the weight of the pallet stack 12 is applied. This helps to control the motion of the movable frame 510 and pallet stack 12, and prevents the rebounding of the movable frame 510 and pallet stack 12 when the end of their motion is reached. In this example, a relatively lower viscosity food grade oil was used as the compression-resistant hydraulic fluid. A skilled technician would understand that other fluids could be used without departing from the scope of this disclosure. For instance, water or very light, low viscosity oils could also be used in the system depending on the environment.

The weight of the movable frame 510 and the pallet stack 12 is used to lower the pallet stack 12 and the movable frame 510 to the lowered position 32. In this example, the weight of the movable frame 510 and the pallet stack 12 exerts pressure on the telescoping hydraulic cylinders 52. This pressure is used to drain the hydraulic fluid in the telescoping cylinders through one or more drain means (not shown) on each of the telescoping cylinders. Generally the rate at which hydraulic fluid drains from the telescoping hydraulic cylinders 52 allows for the pallet stack 12 and movable frame 510 to lower at a slower rate than the pallet transporter 56 can lower the one or more pallets 10 to be removed from the pallet dispenser 2.

In some examples, the drain means may be conduit, tubing, or piping for returning the compression-resistant hydraulic fluid to the hydraulic reservoir 450. The design and diameter of the conduit, tubing, or piping used will depend on the desired hydraulic fluid drain rate.

In some examples, the rate at which the telescoping hydraulic cylinders 52 are drained can be adjusted so that the pallet stack 12 and movable frame 510 lower at a slower rate than the pallet transporter 56. In some examples, the closed-loop hydraulic circuit 430 uses a flow controller such as a flow control valve to adjust the rate at which the hydraulic fluid flows to the hydraulic reservoir 450. Other means of restricting the flow, such as an orifice, or using conduit or piping that allows for the telescoping hydraulic cylinders 52 to drain at a slower rate than the lowering rate of a particular model or type of the pallet transporter 56 could be used without departing from the scope of this disclosure.

In another example, the movable frame 510 remains in the raised position 30 until a state change event is triggered. In this example, the draining means may comprise a drain valve for holding the compression-resistant hydraulic fluid in the telescoping hydraulic cylinders 52 until a drain valve is opened. This allows the movable frame 510 and pallet stack 12 to be held in the raised position 30 until it is appropriate for the movable frame 510 and pallet stack 12 to be lowered. In some examples, the pallet dispenser 2 may comprise an arm attached to the drain valve and configured between the pallet stack 12 and the one or more pallets 10 to be removed from the pallet dispenser 2. When the arm is between the bottom-most pallet 10 and the pallet stack 12, the drain valve is closed and hydraulic fluid is held in the telescoping hydraulic cylinders 52. This keeps the pallet stack 12 and the movable frame 510 in the raised position 30. As the pallet transporter 56 lowers the bottom-most pallet 10, gravity causes the arm to pivot and open the valve, thereby allowing hydraulic fluid to drain from the telescoping hydraulic cylinders 52 and lowering the movable frame 510 to the lowered position 32. In alternate embodiments the arm may be configured to pivot and open the valve when the pallet 10 is removed from the pallet dispenser 2.

In an alternate embodiment, the user may manually operate the drain valve. In this example, an actuating means such as a pull cord, lever, or dial is provided that allows the operator to open the valve and drain the hydraulic fluid from the telescoping hydraulic cylinders 52, thereby transitioning the movable frame 510 to the lowered position 32.

In some examples, the pallet dispensing cycle is complete when the movable frame 510 is in the lowered state 32. In other examples, however, it may be preferable for the movable frame 510 to secure the pallet stack 12 before the movable frame 510 begins transitioning to the raised state 30. In another embodiment, a raising means is provided to transition the movable frame 510 from the lowered state to a ready raised position 34. In this ready raised position 34, the movable frame 510 secures the pallet stack 12 so that when the movable frame 510 is in the raised state 30, one or more pallets 10 can be separated from the pallet stack 12. In some examples, the ready raised position 34 is defined to be between the raised 30 and lowered 32 states.

In an example, when the movable frame 510 is in the lowered state 32, the securing device releases the pallet stack 12. Once released, the raising device is used to transition the movable frame 510 from the lowered state 32 to the ready raised position 34. When the movable frame 510 is in the ready raised position 34, the pallet stack 12 is re-secured so that one or more pallets 10 can be separated from the pallet stack 12 when the movable frame 510 is in the raised state 30.

In some examples, one or more elastic objects can be used to raise the movable frame 510 from the lowered state 32 to the ready raised position 34. For example, springs could be used that, when subjected only to the weight of the movable frame 510, have an un-sprung position that corresponds to the ready raised position 34. In this example, one or more cylinders (not depicted) containing a compressible gas or fluid is used to (configured to) raise the movable frame 510 to the ready raised position 34. These cylinders act as springs that, when subjected only to the weight of the movable frame 510, have a natural rest position that corresponds to the ready raised position 34 of the pallet dispenser 2. Examples of cylinders containing a compressible gas include, and are not limited to, gas shocks. These gas shocks are used to raise the movable frame 510 to the ready raised position 34. In this example, corresponding gas shocks are provided for each hydraulic cylinder 52 used in the pallet dispenser 2.

A skilled technician would understand that alternate elastic objects could be used to raise the movable frame 510 to the ready raised position 34 without departing from the scope of this disclosure. For instance, springs could be connected to the stationary support frame 59 and the top of the movable frame 510 so that when the pallet stack is unsecured the springs pull the movable frame 510 to the ready raised position 34. In an alternate embodiment, a counterweight, pulley, and cable system could be used to raise the movable frame to the ready raised position 34.

In another embodiment of the system aspect, a pallet transporter 56 is used to transport pallets and to transition the pallet dispenser 2 (and movable frame 510) from the ready 34 or lowered position 32 to the raised position 30. The pallet transporter 56 engages a pallet 10, raises the pallet stack 12 to a raised position 30, and removes one or more pallets 10 from the pallet dispenser 2. Examples of the pallet transporter 56 include pallet trucks, pallet jacks, and forklifts. A skilled technician would understand that alternate devices suitable for pallet handling could also be used without departing from the scope of this disclosure. For example, the pallet transport could be a conveyor or gravity roller having a rising platform.

In this embodiment of the system, the pallet transporter 56 provides the energy input for raising the pallet stack 12 and thereby transitioning the pallet dispenser 2 to the raised state 30. Gravity is used to transition the pallet dispenser 2 to the lowered state. In some examples, the weight of the pallet stack 12 and the movable frame 510 is used to transition the pallet dispenser 2 to the lowered state. In this example, the system does not require any other source of energy input to operate. For example, pumps, motors, sources of compressed air, generators, or other means to power a system are not required in this example.

In another example, the pallet dispensing system comprises a pallet-stack enclosure 4. The pallet-stack enclosure 4 prevents the pallet stack 12 from tipping, collapsing, or falling. In an example, the pallet-stack enclosure 4 comprises supports 600 attached to the top of the pallet dispenser 2. Restraints are configured between the supports to prevent the pallet stack from tipping, collapsing, or falling. In an example, the restraints are gates 14 or doors 16. In other examples, the restraints may be solid walls 630 (as depicted in FIG. 8) or mesh walls 620 walls (as depicted in FIG. 1). In another example, the restraints are webbing that are detachably connected to the supports 600 (FIG. 1).

In yet another example as shown in FIG. 8, the restraints are one or more bars or pipes 18 connected to the supports 600 via the hinges 605, the bars or pipes 18 being substantially the height of the supports 600.

Figure 9:
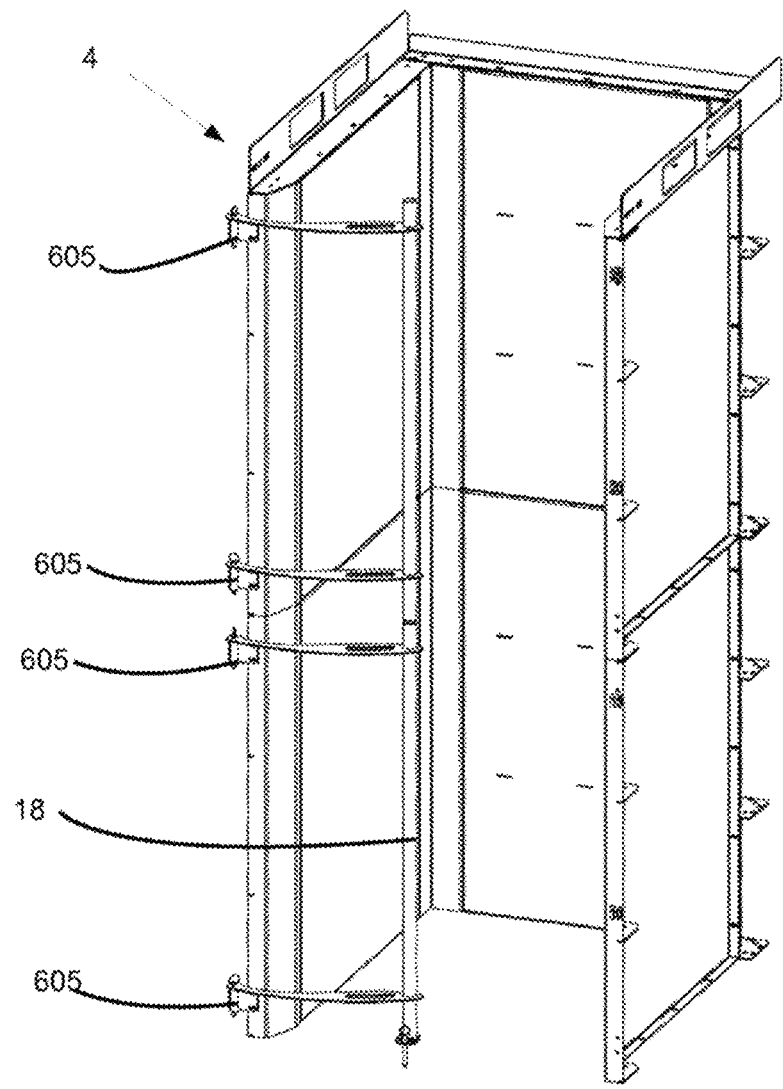
FIG. 9 is a perspective view of an embodiment of the pallet-stack enclosure.

FIG. 9 depicts a perspective view of an example of the pallet-stack enclosure 4.

FIG. 9 depicts the following components: the pallet-stack enclosure 4, the hinges 605, and the pipes 18.

In the example as shown in FIG. 9, the restraints are one or more bars or pipes 18 connected to the supports 600 via the hinges 605, the bars or pipes 18 being substantially the height of the supports 600.

In these examples, the restraints are movable or removable so that pallets 10 can be added to the pallet stack 12. In some examples, only one of the restraints is movable so that pallets can be added to the pallet stack. In this example, shown in FIG. 5, the movable restraint is configured so as to not interfere with the pallet transporter 56. This allows the pallet dispenser 2 to be used while pallets 10 are being added to the pallet stack 12. For example, using the hinged instance of the pipe 18 (the restraint) provided above, the hinged pipe 18 (the restraint) can be configured between the front instance of the support 600 and the back instance of the support 600 of the pallet-stack enclosure 4 on the right side of the pallet dispenser 2 (the hinges 605 for the pipe 18 (the pipe restraint or restraint) are shown in FIG. 5). This allows pallets 10 to be added to the pallet stack 12 from the side of the assembly while a pallet 10 is being dispensed through the front opening 480 of the pallet dispenser 2.

Depending on the installation requirements, the pallet-stack enclosure 4 and pallet dispenser 2 may be modular. In the examples shown in FIG. 1, the pallet dispenser 2 and the pallet-stack enclosure 4 combine into a single unit and are inseparable. In another example, as shown in FIGS. 5, 8, and 9, the pallet-stack enclosure 4 and the pallet dispenser 2 are modular and can be separated. FIG. 9 shows the pallet-stack enclosure 4 independent of the pallet dispenser 2. This modularity allows for different types of the pallet dispenser 2 and of the pallet-stack enclosure 4 to be used depending, for example, on the environment or style of pallet (two-way pallet or four-way pallet) used.

Detection Assembly

FIGS. 10A to 10D depict examples of a detection assembly 800 for use with the pallet dispenser 2.

Figure 10A:
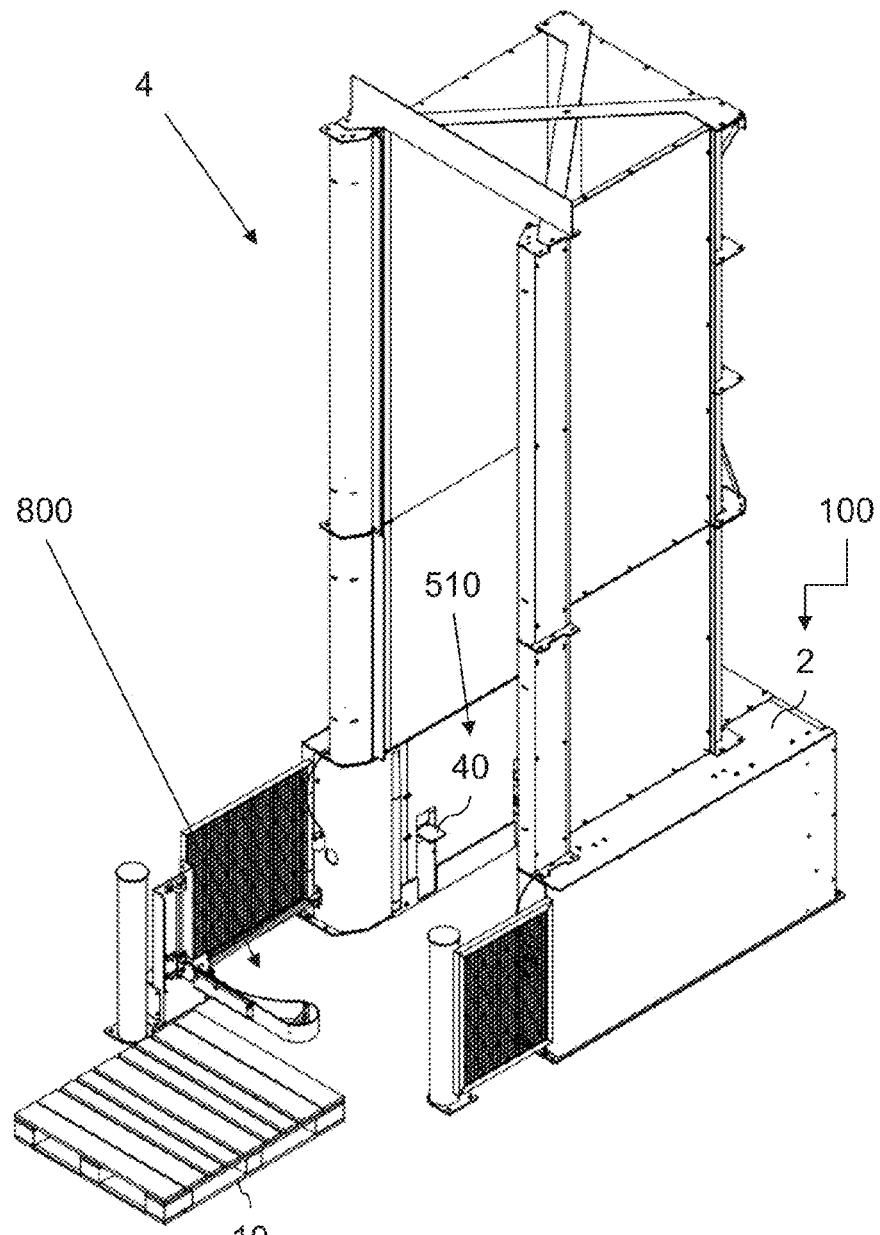
FIGS. 10A to 10D depict examples of a detection assembly for use with the pallet dispenser.

FIG. 10A depicts the following components: the pallet-stack enclosure 4, the pallet dispenser 2, the pallet dispensing system 100, the movable frame 510, the latch 40, the detection assembly 800 and the pallet 10. The pallet dispenser 2 includes a detection assembly 800 configured to detect dispensation of the pallet 10 from the movable frame 510 (of pallet dispenser 2).

In other examples, the pallet dispenser 2 includes a detection assembly 800 configured to detect once the pallet has been dispensed from the pallet dispenser 2.

Figure 10B:
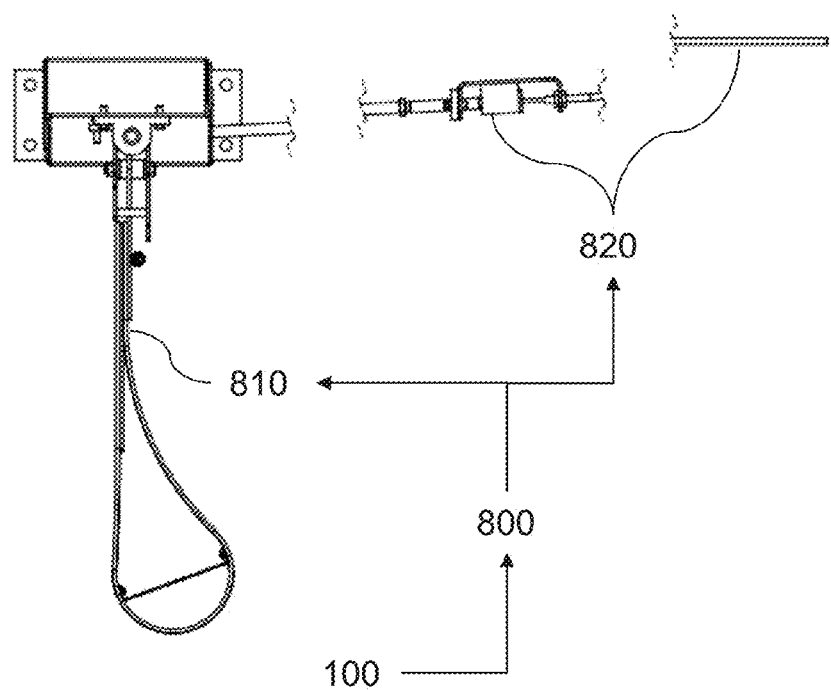

FIG. 10B depicts a partial top down view of an example of a detection assembly 800 of the pallet dispenser 2 of FIG. 1. FIG. 10B depicts the following components: the limit switch assembly 820, the detection assembly 800, the pallet dispensing system 100, and the actuator 810. The detection assembly 800 includes an electrical photo-eye device powered by a battery (and the battery is optionally charged by a solar panel), and is used to open an electric valve in such a way as to allow the movable frame 510 to travel downward. The battery may last for approximately 3000 dispenses (such as for 10 working days), and can be rechargable. One way to recharge the battery is to use a solar panel to keep the battery fully recharged. The downside with this option is different light sources provide varying wavelengths and therefore varying strengths to power a solar panel. Outdoor natural light provides the best source and is very practical in less developed warehouses because they tend to have warehouse skylights. High pressure Sodium and fluorescent lights are the most popular warehouse lights and power the solar panel fine. LED lights are the only lights that cannot power the solar panel however with future developments of solar panels this could change. Today, LED lighting is expensive and not very common in warehouses. Another way to recharge the battery is to exchange the battery for a second battery that has been recharged by an electrical source away from the machine. The intention would be for the plant to exchange this battery once per week. This option would not allow us to claim "zero" energy required however it is a very practical solution and will be offered as a good option if LED lighting is used in the warehouse. Of course, an option is to use no electrical components in the pallet dispensing system 100. In accordance with an option, the pallet dispensing system 100 does not use electrical power to raise or lower the pallet stack 12, such as by way of an electric motor or a powered lifting device. The battery is merely an option for the control the flow of hydraulic fluid or oil, or control the conversion of potential energy. In accordance with an option, electrical energy is not used to raise the pallet stack 12. To lower the pallet stack 12, the pallet dispensing system 100 uses gravity acting on the movable frame 510.

Generally speaking (in accordance with an option), the detection assembly 800 includes an operator-independent de-latching mechanism that may be used with the latch 40. The operator-independent de-latching mechanism is configured to de-latch the latch 40 from the latched state to the un-latched state, and may include all mechanical components, or a combination of mechanical components and electrical components (actuators) powered by a battery charged by a solar panel (if so desired). The operator-independent de-latching mechanism is used to prevent the operator from having to de-latch the latch 40 (if so desired). The detection assembly 800 may include all mechanical components, or a combination of mechanical components and electrical components (actuators) powered by a battery charged by a solar panel (if so desired).

Figure 10C:
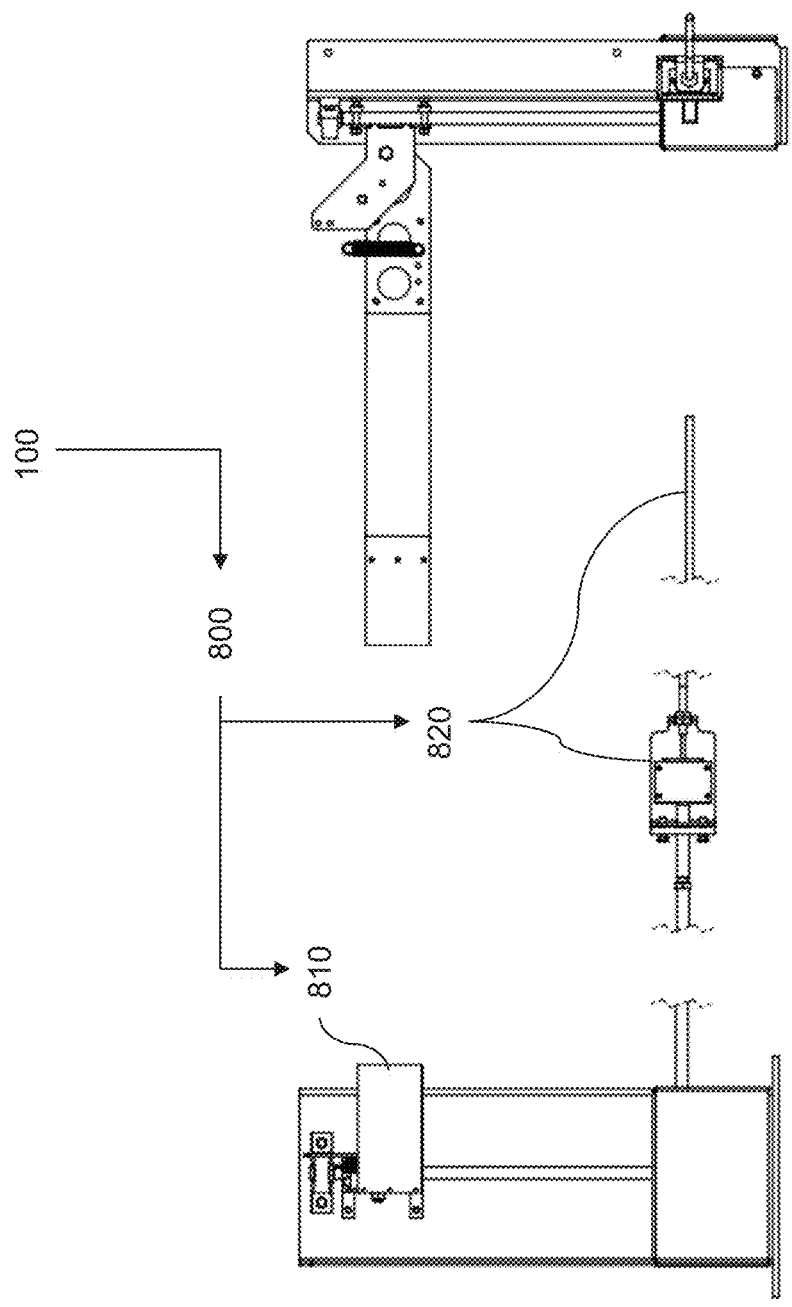

FIG. 10C depicts a partial side view of an example of a detection assembly 800 of the pallet dispenser 2 of FIG. 1. FIG. 10C depicts the following components: the pallet dispensing system 100, the detection assembly 800, the actuator 810 and the limit switch assembly 820.

Figure 10D:
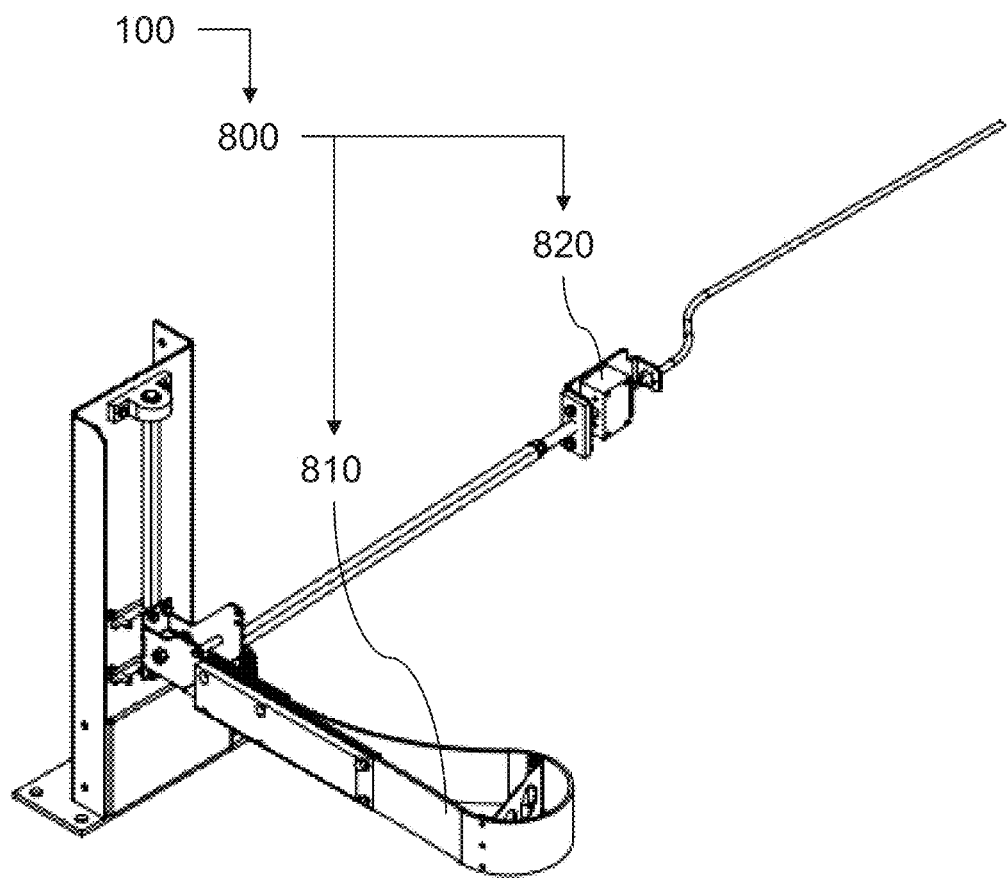

FIG. 10D depicts a perspective view of an example of a detection assembly 800 of the pallet dispenser 2 of FIG. 1. FIG. 10D depicts the following components: the pallet dispensing system 100, the detection assembly 800, the actuator 810, and the limit switch assembly 820.

A depicted in FIGS. 10B to 10D, the detection assembly 800 includes an actuator 810. The actuator 810 is located away from the pallet dispensing system 100 in such a way that the actuator 810 is only activated once the pallet 10 has been dispensed from the pallet dispenser 2. In some examples, the actuator 810 is configured to manipulate a mechanical signaling device (not shown and known) to indicate that the pallet 10 has been dispensed from the pallet dispenser 2.

In another example, the pallet dispenser 2 moves from the raised position 30 (FIG. 6) to the ready raised position 34 through the lowered position 32 (FIG. 6) once the detection assembly 800 is operated to detect that the pallet 10 has been dispensed from the pallet dispenser 2.

The pallet dispenser 2 includes a detection assembly 800 being configured to detect once the pallet has been dispensed from the pallet dispenser 2.

The pallet dispenser 2 moves from the raised position 30 (FIG. 6) to the raised position 34 through the lowered position 32 (FIG. 6) once the detection assembly 800 is operated to detect that the pallet 10 has been dispensed from the pallet dispenser 2.

Figure 11:
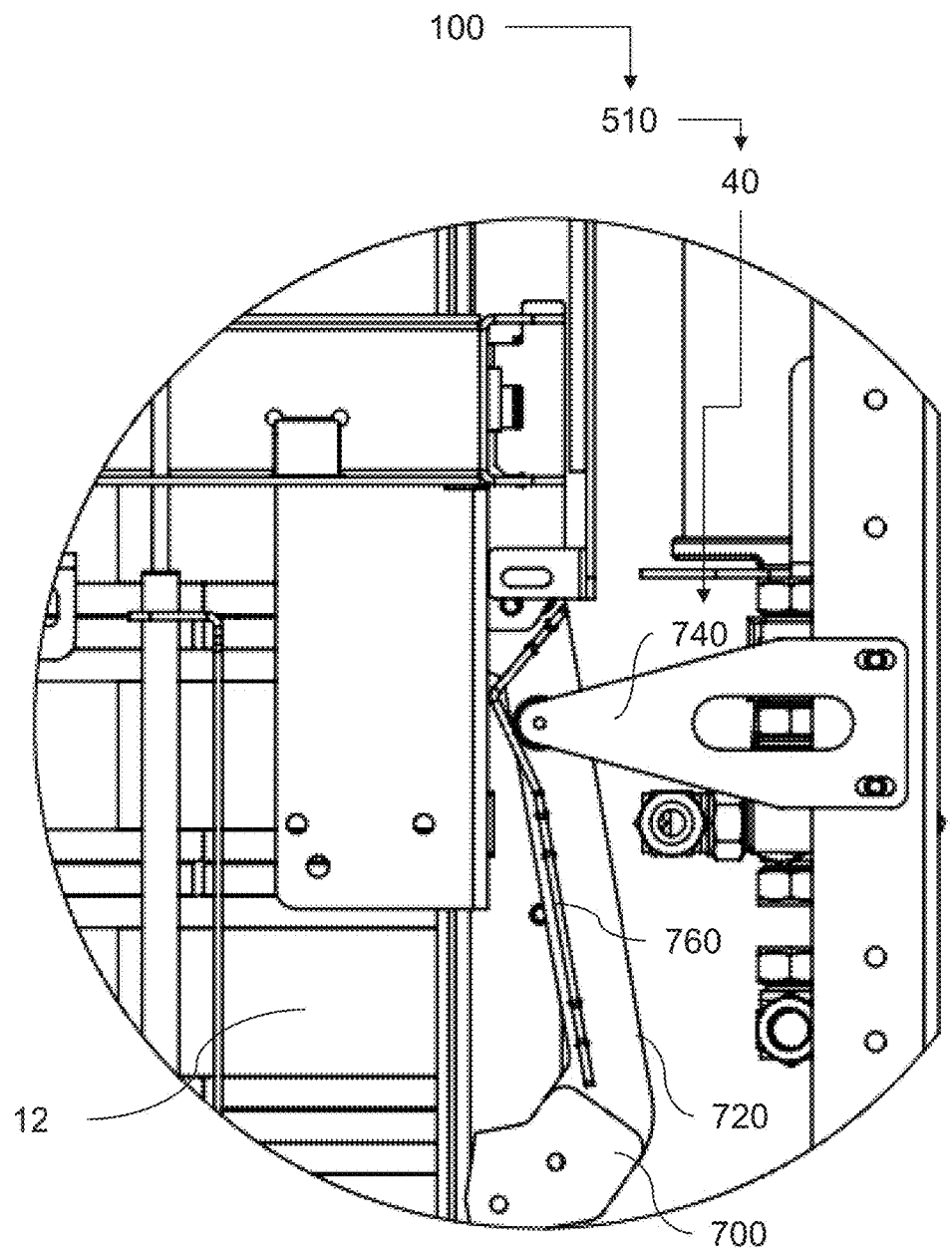
FIG. 11 depicts a partial side view of an example of a latch assembly of the pallet dispenser, encircled in FIG. 2G.
Figure 12:
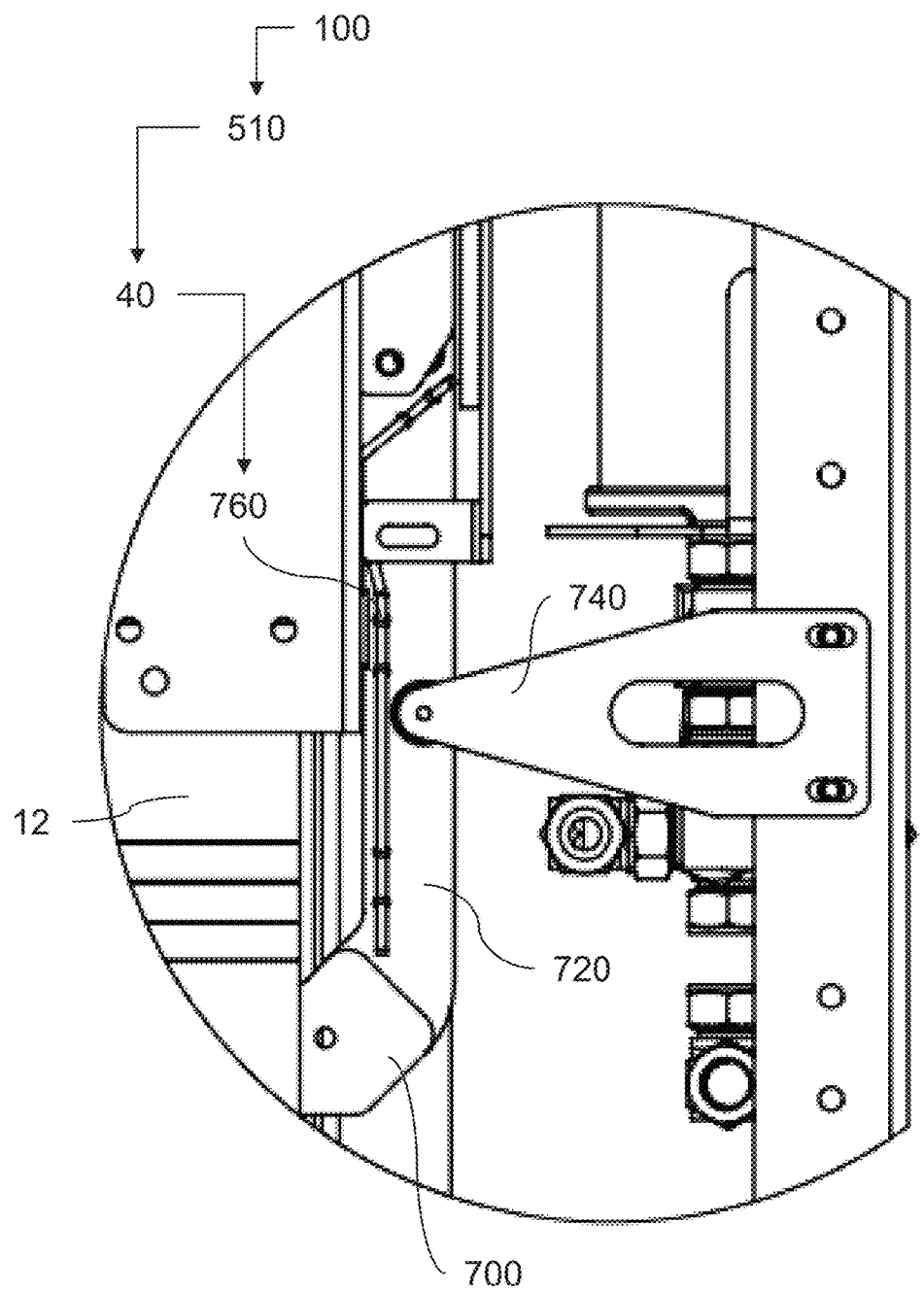

FIG. 11 depicts a partial side view of an example of the latch 40 of the pallet dispenser 2, encircled in FIG. 2G. FIG. 11 depicts the following components: the pallet stack 12, the latch 40, the pallet dispensing system 100, the movable frame 510, the dog 700, the arms 720, the cam roller 740, and the cam follower 760. The movable frame 510 is placed in the latched state otherwise.

A partial side view of an example of the latch 40 of the pallet dispenser 2, encircled in FIG. 2A, in a latched position. The pallet dispenser 2 is configured to interface with the latch 40 that is spring-loaded. The latch 40 is included in the movable frame 510, so that the movable frame 510 may be placed in the de-latched state once the movable frame 510 moves from the lowered position 32 (position depicted in FIG. 2G) to the ready raised position 34 (position depicted in FIG. 11).

FIG. 12 depicts the movable frame 510 placed in the latched state (a latched position), encircled in FIG. 2A.

Referring to FIG. 11 and FIG. 12, the latch 40 includes latches 40. The latches 40 include dogs 700, also called hooks, connected to the arms 720, and the arms 720 are movably attached to the movable frame 510 by a hinge 730. The latches 40 are configured to secure the pallet stack 12. In this example, the latches 40 secure a single instance of the pallet 11 in the pallet stack 12 such that the pallet stack 12 above the single instance of the pallet 11 is supported by the single instance of the pallet 11.

A cam follower 760 is integrated with the arm 720. A corresponding cam roller 740 is configured (placed) on the pallet dispenser 2 that interfaces with the cam follower 760. In other examples, however, the cam roller 740 is configured (placed) on the arm 720 and the cam follower 760 is configured (placed or positioned) on the pallet dispenser 2.

Referring to FIG. 11, the arms 720 are configured to interface with the cam follower 760 on the pallet dispenser 2 so that when the movable frame 510 with the pallet stack 12 is placed on the ground, the latches 40 do not engage the pallet 11. In this example, the tension provided by the cam spring 780 causes the latch 40 to pivot away from the pallet stack 12, thereby disengaging the pallet 11 once the movable frame 510 with the pallet stack 12 is placed or positioned on the ground.

In these examples, the cam followers 760 or the cam rollers 740 may be independent of the arm 720 in order to take advantage of the substantially vertical movement of the movable frame 510.

In some examples, the orientation of the dog 700 may depend on the configuration of the pallet 11 used in the facility. As depicted in FIG. 5, FIG. 6, and FIG. 7, the dogs 700 extend substantially perpendicularly from the arm 720. In other examples, the dogs 700 may extend at different angles in order to engage the pallet 11 as may be required.

As depicted in FIG. 2A and FIG. 2G, the movable frame 510 includes a latch 40 configured to secure and release the pallet stack 12. The latch 40 is configured to operate in a latched state and a de-latched state. In the latched state, as depicted in FIG. 2A to FIG. 2F, the movable frame 510 holds the pallet stack 12, and the movable frame 510 moves with the pallet stack 12. In the de-latched state, as depicted in FIG. 2G and FIG. 11, the movable frame 510 moves independently of the pallet stack 12.

As depicted in FIG. 12, the latches 40 secure the pallet 11 so that the pallet stack 12 is supported by the secured instance of the pallet 11. In this example, the cam follower 760 engages the arm 720 so as to prevent the latch 40 from springing back and disengaging the pallet 11.

In another example, the latch 40 includes the dogs 700. The dogs 700 are configured to engage the pallet 11 as depicted in FIG. 12. When the dogs 700 engage the pallet 11, the pallet stack 12 located above the pallet 11 is secured. In some examples, the dogs 700 may be chamfered not shown so as to engage the pallet 11 more readily by, for example, reducing the amount of friction needed to engage the pallet 11 if so desired.

Figure 13A:
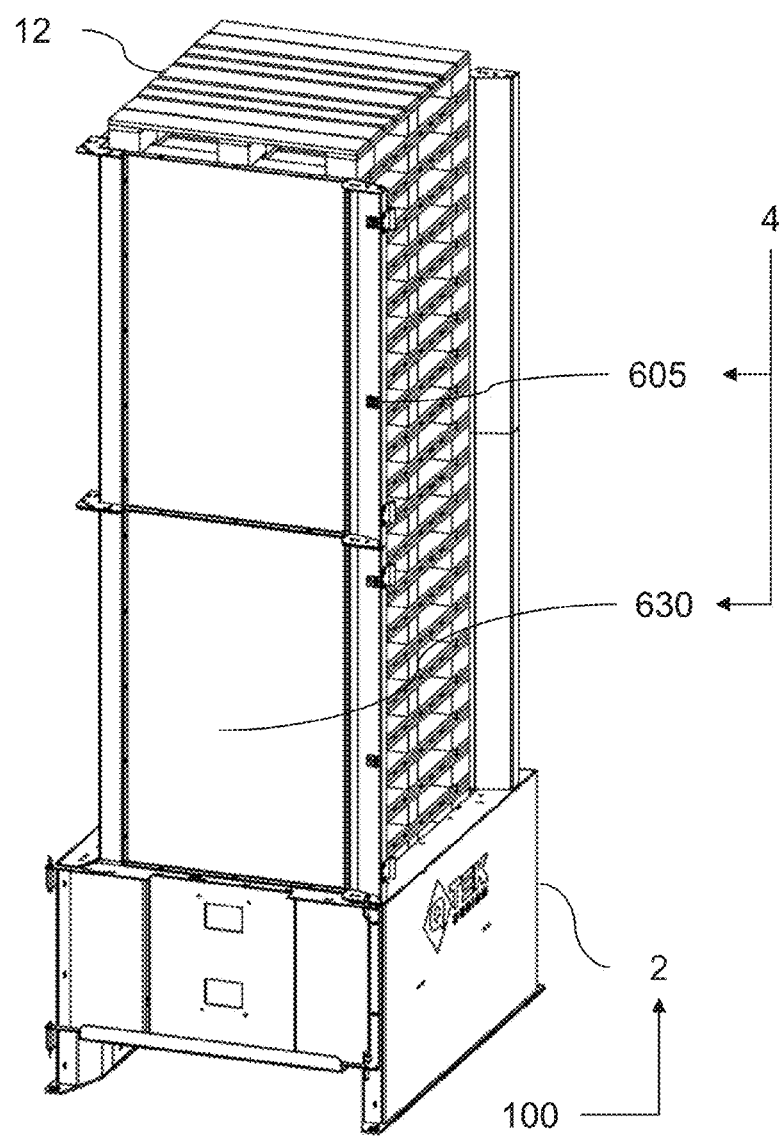
FIG. 13A depicts a perspective view of an example of the pallet dispenser of FIG. 1 including a side-loading pallet-enclosing assembly.

FIG. 13A depicts a perspective view of an example of the apparatus of FIG. 1 including a side-loading pallet-enclosing assembly. FIG. 13A depicts the following components: the pallet-stack enclosure 4, the hinges 605, the solid walls 630, the pallet dispenser 2, the pallet dispensing system 100, and the pallet stack 12.

As depicted in FIG. 13A, it may be preferable to configure the pallet-stack enclosure 4 so that the restraint is not in-line with the direction that pallets 10 are dispensed. In this example, the restraint is orthogonal to the direction that pallets 10 are dispensed. In this example, the pallet dispensing system 100 can be used while pallets 10 are being added to the pallet stack 12.

Figure 13B:
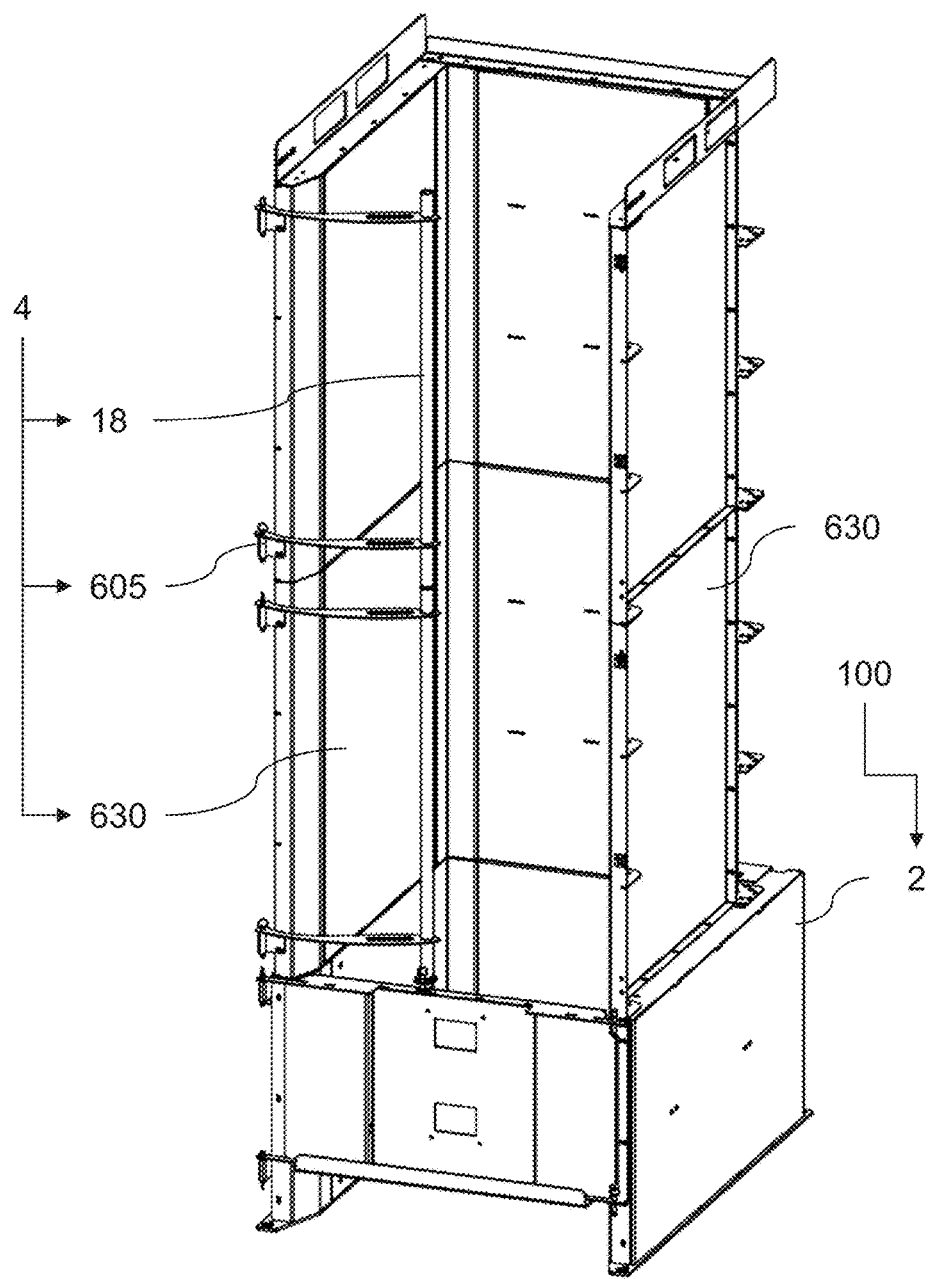
FIG. 13B depicts a perspective view of an example of a front loading pallet-enclosing assembly of the pallet dispenser of FIG. 1.

FIG. 13B depicts a perspective view of an example of a front loading pallet-enclosing assembly of the apparatus of FIG. 1. FIG. 13B depicts the following components: the pallet-stack enclosure 4, the pipes 18, the hinges 605, the solid walls 630, the pallet dispensing system 100 and the pallet dispenser 2.

As depicted in FIG. 13B, the restraints can include one or more bars alternately, pipes 18 connected to the supports 600 via the hinges 605. The bars 18 are substantially the height of the supports 600 and are used to keep the pallet stack 12 from tipping, collapsing, or falling when the pallet stack 12 is placed in the pallet dispensing system 100.

FIG. 13B depicts an example of the bar 18 configured to be moved so that pallets 10 can be added to the pallet stack 12. In this example, the pallet-stack enclosure 4 depicted in FIG. 9C is modular and can be placed on the pallet dispenser 2 in any orientation. As depicted in FIG. 13B, it may be preferable to orient the pallet-stack enclosure 4 so that the bar 18 restraint is in-line with the direction that pallets 10 are dispensed.

Figure 13C:
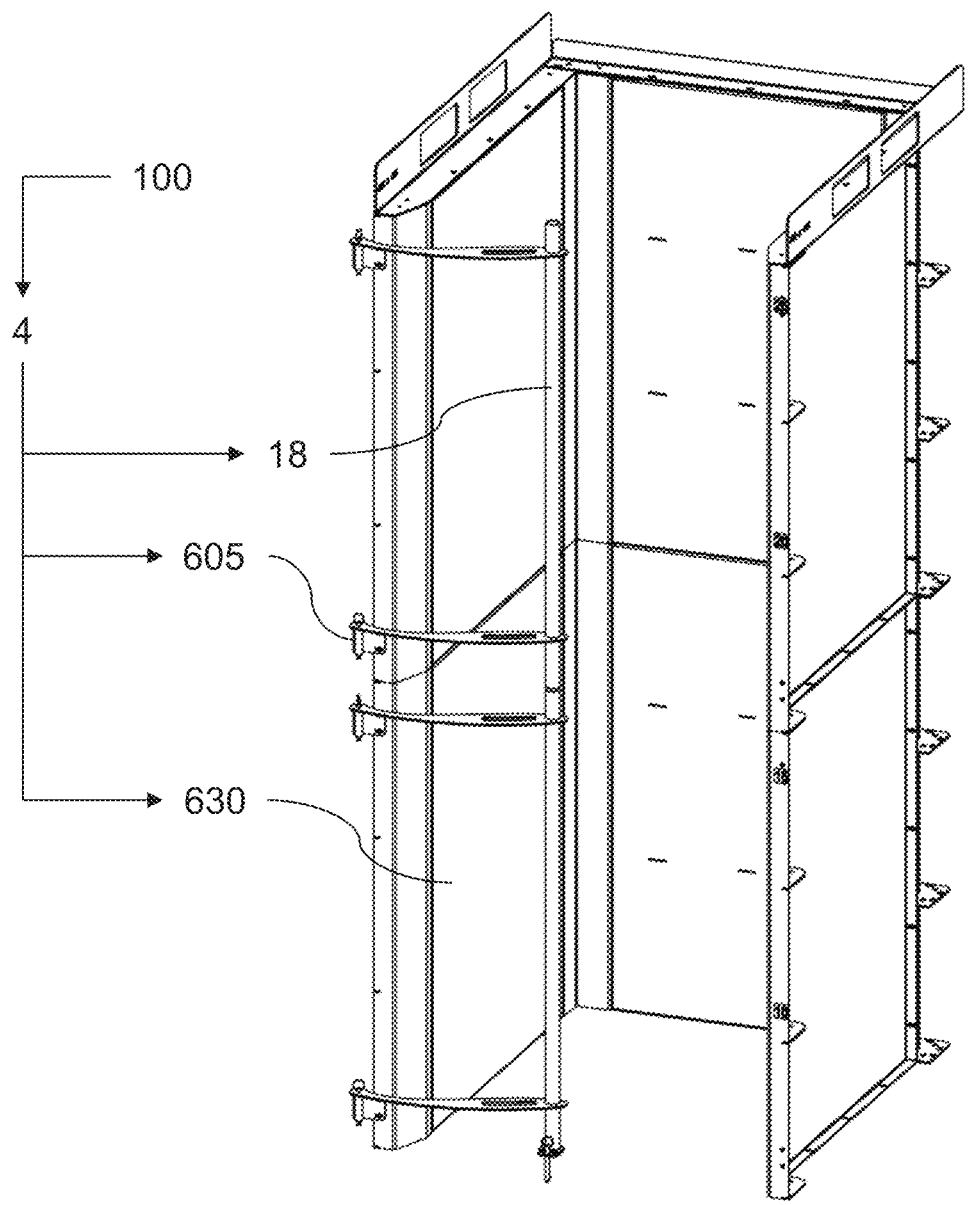
FIG. 13C depicts a perspective view of an example of the front loading pallet-enclosing assembly of FIG. 9B.

FIG. 13C depicts a perspective view of an example of the front loading pallet-enclosing assembly of FIG. 9B. FIG. 13B depicts the following components: the pallet dispensing system 100, the pallet-stack enclosure 4, the pipes 18, the hinges 605, and the solid walls 630.

As depicted in FIG. 13C, the restraints can include one or more bars alternately, pipes 18 connected to the supports 600 via the hinges 605. The bars 18 are substantially the height of the supports 600 and are used to keep the pallet stack 12 from tipping, collapsing, or falling when the pallet stack 12 is placed in the pallet dispensing system 100.

FIG. 13C depicts an example of the pallet-stack enclosure 4 that can be used with the pallet dispenser 2. As depicted, the pallet-stack enclosure 4 includes supports 600 attached to pallet dispenser 2. Restraints are configured between the supports 600 to prevent the pallet stack 12 from tipping, collapsing, or falling. In an example, the restraints can include gates not shown or doors not shown.

Figure 14:
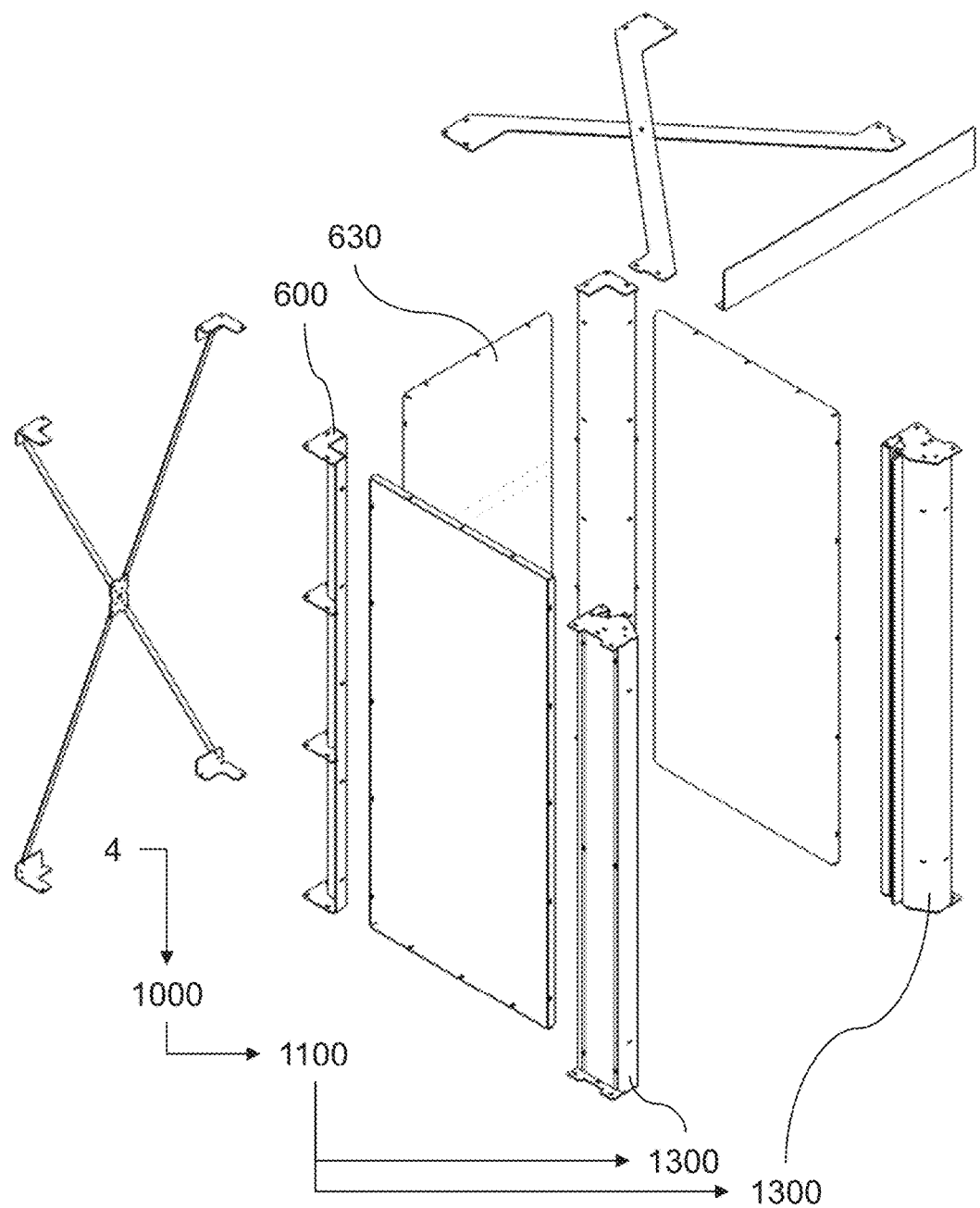
FIG. 14 depicts an exploded perspective view of an example of a locking-restraint apparatus of the front loading pallet-enclosing assembly of FIG. 9B.

FIG. 14 depicts an exploded perspective view of an example of a locking-restraint apparatus of the front loading pallet-enclosing assembly of FIG. 9B. FIG. 14 depicts the following components: the solid walls 630, the pallet-stack enclosure 4, the locking-restraint apparatus 1000, the spring-loaded restraints 1100, and the restraint 1300.

FIG. 14 depicts an example of the pallet-stack enclosure 4 that can be used with the pallet dispenser 2. As depicted, the pallet-stack enclosure 4 includes supports 600 attached to pallet dispenser 2. Restraints are configured between the supports 600 to prevent the pallet stack 12 from tipping, collapsing, or falling. In an example, the restraints can include gates not shown or doors not shown.

Figure 15:
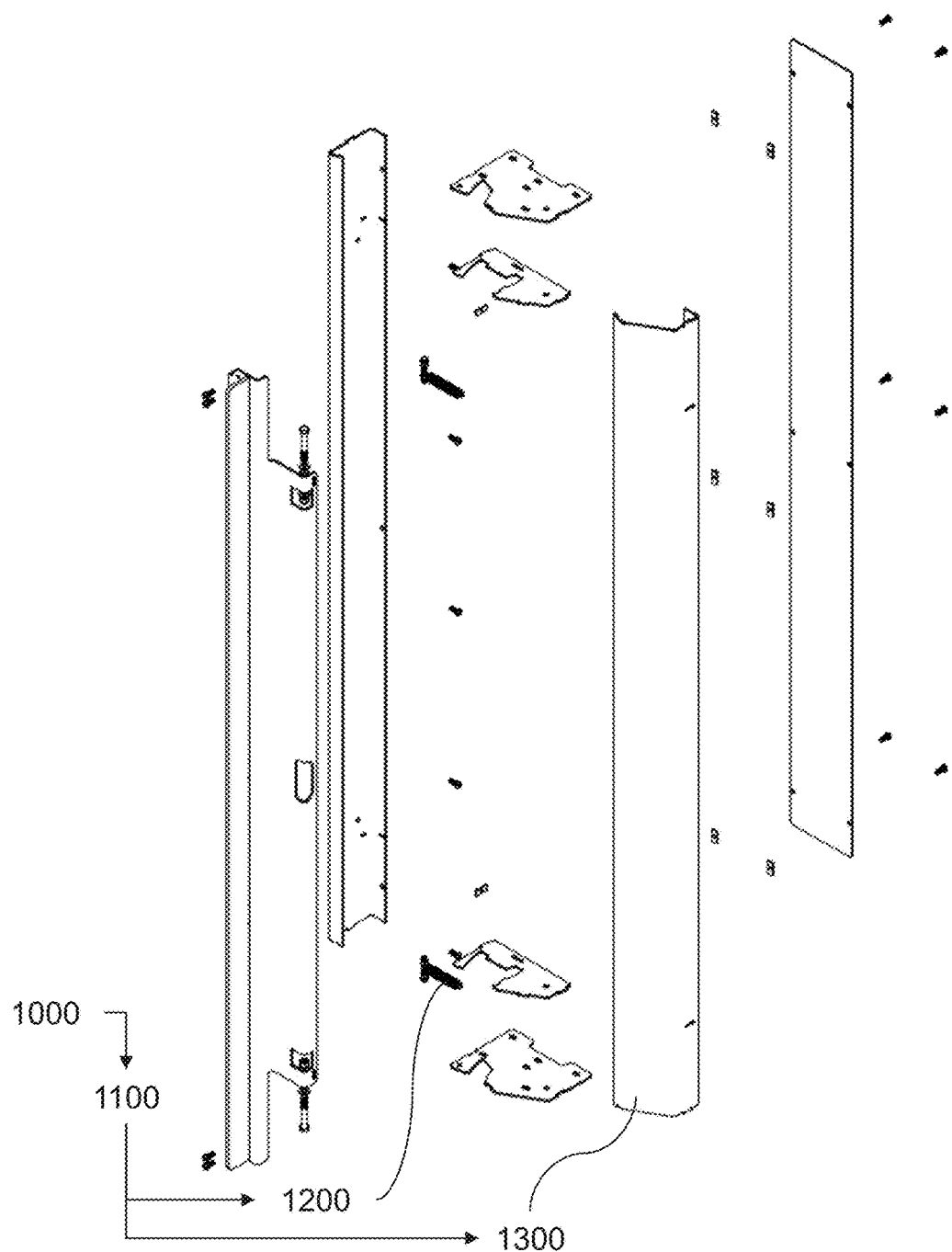
FIG. 15 depicts an exploded perspective view of the locking-restraint apparatus of the front loading pallet-enclosing assembly of FIG. 10.

FIG. 15 depicts an exploded perspective view of the locking-restraint apparatus of the front loading pallet-enclosing assembly of FIG. 10. FIG. 15 depicts the following components: the locking-restraint apparatus 1000, the spring-loaded restraints 1100, the spring 1200, and the restraint 1300.

Referring to FIG. 14 and FIG. 15, a locking-restraint apparatus 1000 is provided. The locking-restraint apparatus 1000 includes spring-loaded restraints 1100. The spring-loaded restraints 1100 are configured to pivot along an axis parallel to the supports 600. As a pallet 10 is loaded into the pallet-stack enclosure 4 the spring-loaded restraints 1100 pivot inwardly, from its initial position, towards the pallet stack 12. The spring-loaded restraints 1100 include a spring 1200 and a restraint 1300 that is substantially the height of the pallet-stack enclosure 4. Once the pallet 10 has been placed on the pallet stack 12, the spring-loaded restraints 1100 pivots back towards its initial position. Once in the initial position, the spring-loaded restraints 1100 prevent the pallet stack 12 from tipping, collapsing, or falling. In some examples, the pallet-stack enclosure 4 is modular, as depicted in FIG. 9C and FIG. 10. In other examples, the pallet-stack enclosure 4 may form a single unit with the pallet dispenser 2.

With reference to all of the FIGS., it will be appreciated that the pallets that are depicted in the FIGS. are examples of the two-way pallet. Therefore, the latches 40 include the dogs 700 that enter into the pallet from the front side and the back side of the pallet. The two-way pallet does not form holes on opposite sides, and therefore the latches 40 latch with the front side and the back side of the two-way pallet.

The four-way pallet defines holes on opposite sides; therefore, for the case of the four-way pallet, the latches 40 may be modified to engage the opposite sides of the pallet. It is preferred to engage the opposite sides of the pallet for the case where the pallet is of the four-way type of pallet since this arrangement may result in a simplified arrangement for the components of the pallet dispenser 2. As well, since the latches 40 (for this case) are positioned on opposite sides of the pallet, then the front side of the pallet is open and available for engagement with the pallet transporter 56, and therefore the pallet transporter 56 is not likely to inadvertently impart damage to the latches 40 (therefore likelihood of inadvertent damage to the latches 40 will be very low).

It will be appreciated that the gate of FIG. 10A may be customized for use with a particular type of pallet transporter.

Further Alternative Embodiments

In general terms, what is provided is an unpowered pallet dispensing system 100. Unpowered means electrically unpowered. That is, the pallet dispensing system 100 does not use electricity for raising or lowering the pallet stack 12. That is, the pallet dispensing system 100 includes no electrical components for providing energizing power to move the movable frame 510, and operates with the use of only mechanical components (preferably under the influence of gravity as the force used to dispense a pallet from the pallet stack 12).

The following are possible advantages provided by the pallet dispensing system 100: (A) the pallet dispensing system (100) is configured to dispense a pallet at floor level using a pallet truck or a pallet jack; (B) the pallet dispensing system 100 requires no air service or electrical service, and relatively easier to install at a relatively low cost; (C) by way of example, approximately four seconds after retrieving the pallet with a pallet truck, the pallet dispensing system 100 rests at the zero energy state, and therefore safety concerns are negligible (safety may be a concern); (D) because there are no electrical components, therefore the manufacturing cost for making the pallet dispensing system 100 is relatively lower; and/or (E) the pallet magazine height is limited by the lifting capacity of the pallet truck, and therefore a capacity of about 30 or about 40 pallets is inexpensive to achieve with the pallet dispensing system 100.

An example of the operation of the pallet dispenser 2 includes an operation (A) including resting the movable frame 510 (also called a steel frame having the latches 40) and the latches 40 inside a pallet located above the pallet making contact with the work surface 8 (the ground).

The next operation (B) includes waiting for the pallet transporter 56 to enter (couple with) the pallet resting on the work surface 8, which is located immediately below the pallet that is latched, via the latches 40, to the movable frame 510.

The next operation (C) includes raising the pallet stack 12 vertically away from the work surface 8 by a clearance gap having a sufficient size, such as about three inches (about seventy five millimeters). The clearance gap is configured to avoid potential movement interferences for the case where a pallet is moved into or away from (relative to) the pallet stack 12 positioned in the movable frame 510. It will be appreciated that some pallets may be slightly damaged or warped or misshaped (they may have nails extending outwardly from the pallet that may inadvertently catch with another pallet), and the clearance gap may provide improved facilitation or movement of potentially damaged instances of the pallet relative to the pallet stack 12.

The next operation (D) includes having the hydraulic cylinder 52 support the weight of the movable frame 510 and the pallet stack 12, and hold the movable frame 510 at an upper position located vertically higher from the work surface 8, relative to the position of the movable frame 510 in operation (B).

The next operation (E) includes waiting for the pallet transporter 56 to lower the pallet that the pallet transporter 56 is currently engaged with vertically downward toward the work surface 8, by about two inches (about fifty millimeters) (for example).

The next operation (F) includes waiting for the pallet transporter 56 to remove the pallet (the bottom most positioned pallet in the pallet stack 12), by backing out of the pallet dispensing system 100.

The next operation (G) includes opening the hydraulic valve 51 and allowing the hydraulic fluid to flow out the hydraulic cylinder 52, and through a speed control valve (a restriction orifice located in the hydraulic valve 51), and thereby allowing the movable frame 510 to fall under the influence of gravity, in a controlled free fall decent to the work surface 8. The movable frame 510 and the pallet stack 12 is lowered to the work surface 8 in about four seconds (for example).

The next operation (I) includes, once the movable frame 510 reaches the work surface 8, removing the weight of the pallet stack 12 from the movable frame 510 by de-latching operation of the latches 40; the latch 40 is positioned in the de-latched state (the arm 720 is moved or pivoted) so that the pallet stack 12 is now de-latched from the movable frame 510. The latches 40 are moved out of the pallet (by actuation of the cam spring 780 that pivot the latches).

The next operation (J) includes lifting the movable frame 510 by using the spring assembly 54, to vertically lift the movable frame 510 up by about four inches (about one hundred millimeters) (for example).

The next operation (K) includes latching the movable frame 510 with the pallet stack 12 by using the cam rollers 740 (cam follower) to push the cam follower 760 (steel guides) attached to the latches 40, and the arm 720 pivots back in with the pallet located above the pallet that contacts the work surface 8.

Generally, the hydraulic circuit 58 is self-contained, and includes a check valve, a flow control valve and hydraulic cylinders 52 configured to support and to lower the movable frame 510 and the pallet stack 12 to the ground. The pallet dispensing system 100 is configured to permit the raising of the pallet stack 12 and the movable frame 510 using the pallet truck. A spring loaded frame is configured to position the latches 40 into the pallet positioned one above the pallet that contacts the ground.

In view of FIGS. 7A to 7I, the following describes a method of establishing a vertical pallet stack and dispensing at least one pallet from a bottom end of the pallet stack. The method includes operations (A) to (L). An operation (A) includes receiving, in the vertical pallet stack, a plurality of individual pallets in overlying relationship. An operation (B) includes supporting a pallet dispensed from a bottom end of the pallet stack on a support surface in overlying relationship to the remainder of the pallet stack. An operation (C) includes supporting the remainder of the pallet stack above the support surface at a support position. An operation (D) includes lifting the remainder of the pallet stack from the support position to an elevated position. An operation (E) includes supporting the remainder of the pallet stack at the elevated position. An operation (F) includes removing the dispensed pallet so that the dispensed pallet is no longer in overlying relationship with the remainder of the pallet stack. An operation (G) includes allowing the remainder of the pallet stack to fall from the elevated position towards the support surface under the influence of gravity after the operation (F) of removing. An operation (H) includes dampening the fall of the remainder of the pallet stack towards the support surface. An operation (I) includes dispensing the lower most pallet from the bottom end of the remainder of the pallet stack. An operation (J) includes supporting the dispensed lower most pallet on the support surface. An operation (K) includes lifting the un-dispensed remainder of the pallet stack after the step of dispensing to the support position. An operation (L) includes supporting the un-dispensed remainder of the pallet stack at the support position after the operation (K) of lifting.

The method may include performing the operations (B) to (L) to dispense another pallet. The method may include modifying the operation of removing is performed at substantially floor level by a pallet truck or jack (pallet transporter). The method may include modifying the range of motion to be an entire range of motion from the elevated position to the support surface. The method may include having the support surface include a support surface of an automated pallet handling system. The method may include having a pallet truck or jack utilized to perform the operation (D). The method may include having the pallet truck or jack utilize the dispensed pallet of operation (B) to lift the remainder of the pallet stack. The method may include having the operation (K) performed by at least one biasing member.

Multi-Stack Pallet Dispensing

Figure 16:
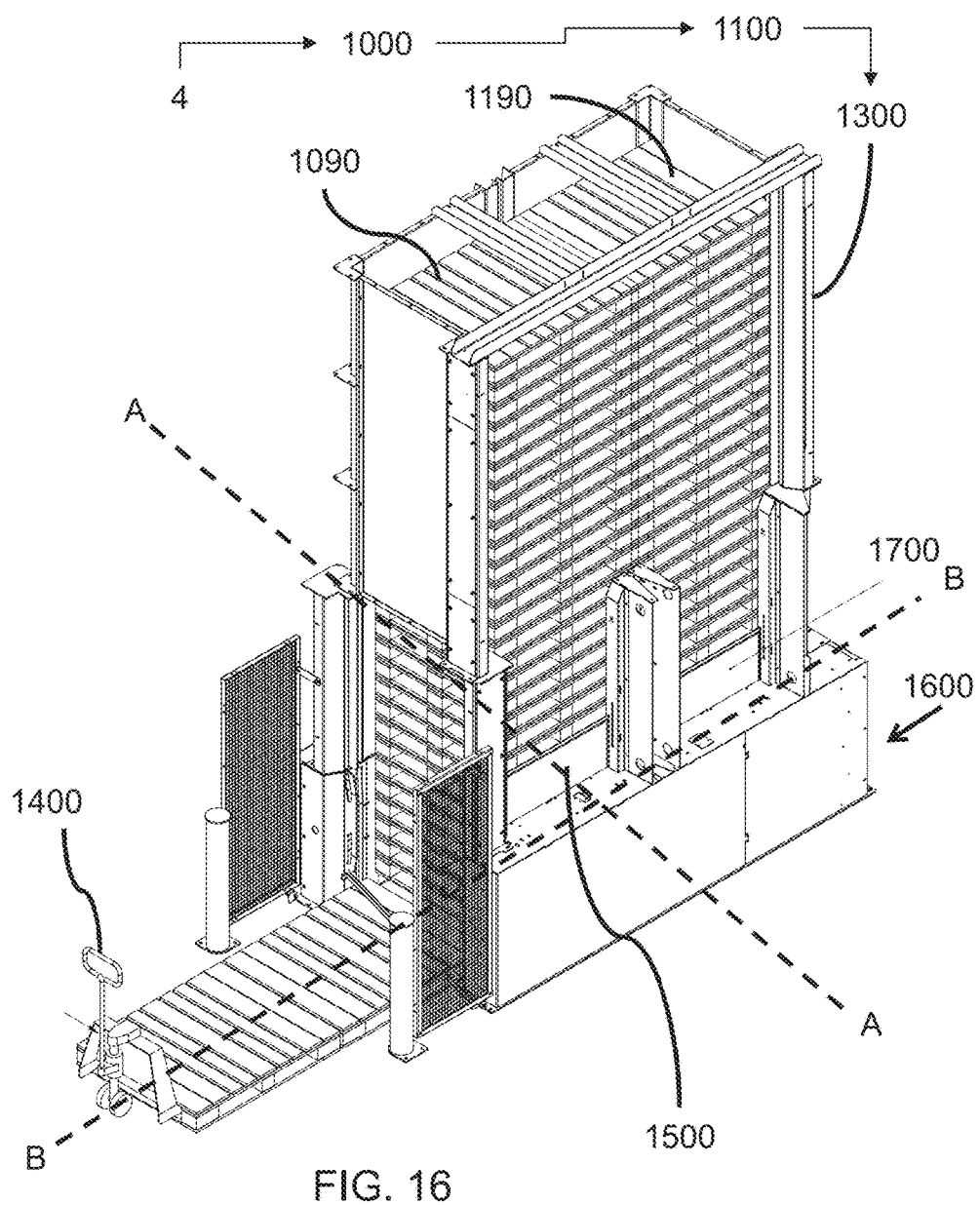
FIG. 16 depicts a perspective view of an example of a multi-stack pallet dispensing apparatus.

FIG. 16 depicts a perspective view of an example of a multi-stack pallet dispensing apparatus 1600.

In another example, as shown in FIG. 16, the multi-stack pallet dispensing apparatus 1600 is configured to dispense pallets from more than one pallet stack (preferably simultaneously). The movable frame 510 of the multi-stack pallet dispensing apparatus 1600 is configured to movably hold, at least in part, the first pallet stack 1090 and second pallet stack 1190. The two pallet stacks 1090 are configured to be aligned in-line with one another, so that a double-deep pallet transporter 1400 may be used to vertically lift, at least in part, both of the two in-line pallet stacks (that is, the first pallet stack 1090 and the second pallet stack 1190). The two in-line pallet stacks are configured to be in-line with one another.

Finger Guard 1700

In some examples, as shown in FIG. 16, a finger guard 1700 is provided on the pallet stack enclosure 4 and is positioned at or near where the pallet stack enclosure 4 attaches to the multi-stack pallet dispensing apparatus 1600. The finger guard 1700 is configured to prevent the operator from manually manipulating the pallet stack (i.e., the first pallet stack 1090 and the second pallet stack 1190), thereby preventing injury to the operator.

Double-Deep Pallet Transporter

A double-deep pallet transporter 1400 is configured to hold and transport two in-line pallets (and their associated loads as may be required). Examples of double-deep pallet transporters 1400 include double-deep pallet trucks and double-deep pallet jacks.

In-Line Pallet Configuration

Generally, the two in-line pallet stacks are configured in a way so that a double-deep pallet transporter 1400 may be used to simultaneously engage a single pallet from each of the two in-line pallet stacks (i.e., engaging two pallets, one pallet from each of the two in-line pallet stacks). In some examples, the two in-line pallet stacks may be in contact with each other. In other examples, the two in-line pallet stacks may be separated from each other.

Figure 17:
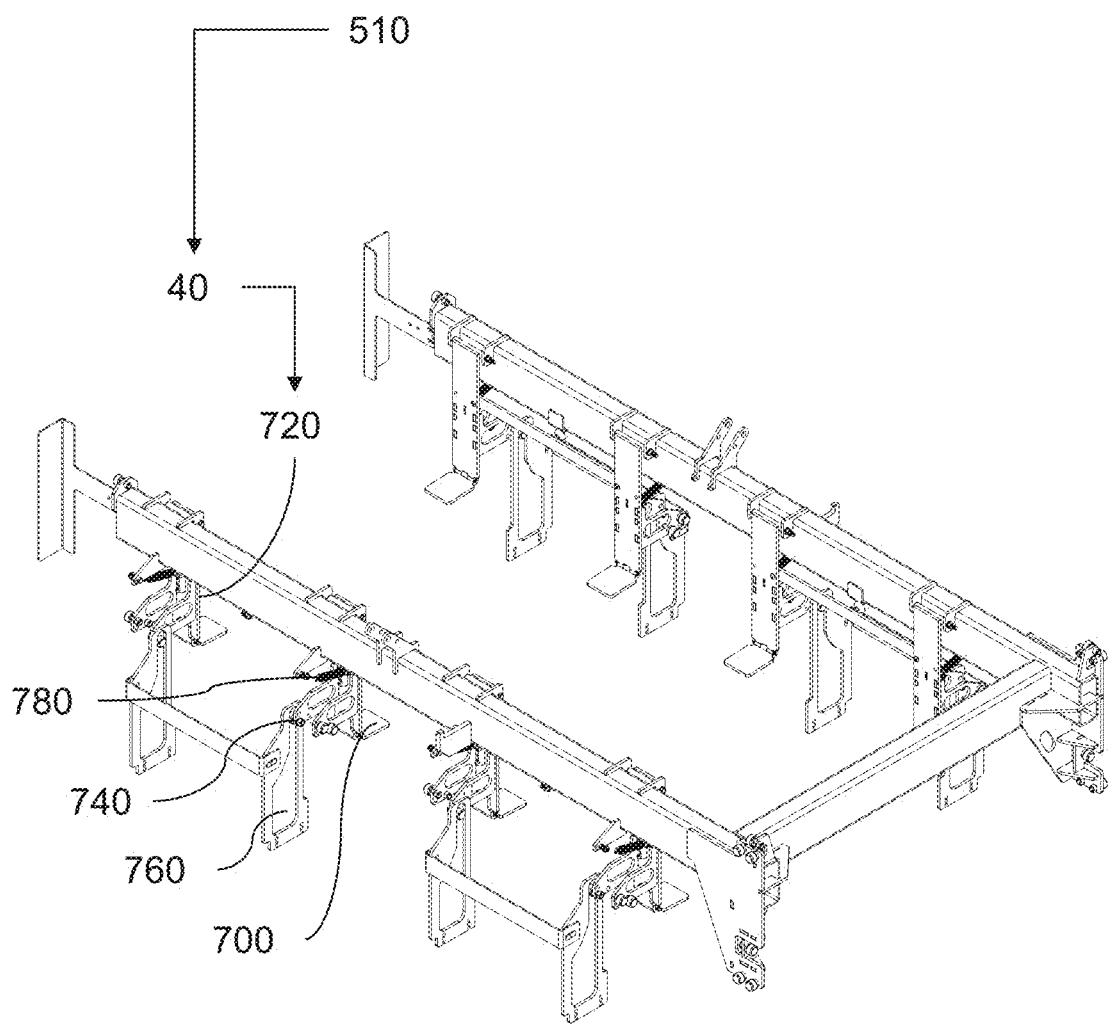
FIG. 17 depicts a perspective view of a movable frame usable in the multi-stack pallet dispensing apparatus of FIG. 16.

FIG. 17 depicts a perspective view of a movable frame usable in the multi-stack pallet dispensing apparatus 1600 of FIG. 16.

As shown in FIG. 17 (in some examples), the movable frame 510 has two instances of the securing mechanism 40 positioned in-line on the movable frame 510 so that the instances of the securing mechanism 40 may interface with a pallet in each of the two in-line pallet stacks. In this example, the two securing mechanisms 40 are configured (positioned) on the movable frame 510 so that the two securing mechanisms 40 operate simultaneously on each of the two in-line pallet stacks. This arrangement may ensure that the positions of each of the two securing mechanisms 40 are synchronized with each other.

Operational Sequence of Multi-Stack Pallet Dispensing

The operational sequence of a multi-stack pallet dispensing apparatus 1600 may be substantially the same as the operational sequence of the pallet dispenser 2 (as previously described). A difference between the pallet dispenser 2 and the multi-stack pallet dispensing 1600 apparatus is that the multi-stack pallet dispensing apparatus 1600 is configured to simultaneously dispense a pallet from each of the pallet stacks (e.g., the first pallet stack 1090 and the second pallet stack 1190) held in the multi-stack pallet dispensing apparatus 1600.

FIGS. 18A to 18H depict examples of the operations sequences of the multi-stack pallet dispensing apparatus 1600 of FIG. 16.

FIGS. 18A to 18H depict schematic example of a sequence of operations of the multi-stack pallet dispensing apparatus 1600 of FIG. 16. Each of FIGS. 18A to 18H include an upper schematic and a lower schematic, for the purpose of facilitating an understanding of the examples of the multi-stack pallet dispensing apparatus 1600. The upper schematic (of each of FIGS. 18A to 18H) depicts a partial cross-sectional schematic view of the multi-stack pallet dispenser across line A-A as shown in FIG. 16. It will be understood that for clarity, only the first pallet stack 1090 is shown, and that the same operation may be applied to second pallet stack 1190, which is in-line and behind the first pallet stack 1090, as shown in the lower schematic of FIGS. 18A to 18H. The lower schematic depicts a partial cross-sectional schematic view of the multi-stack pallet dispenser across the line B-B as shown in FIG. 16.

Figure 18A:
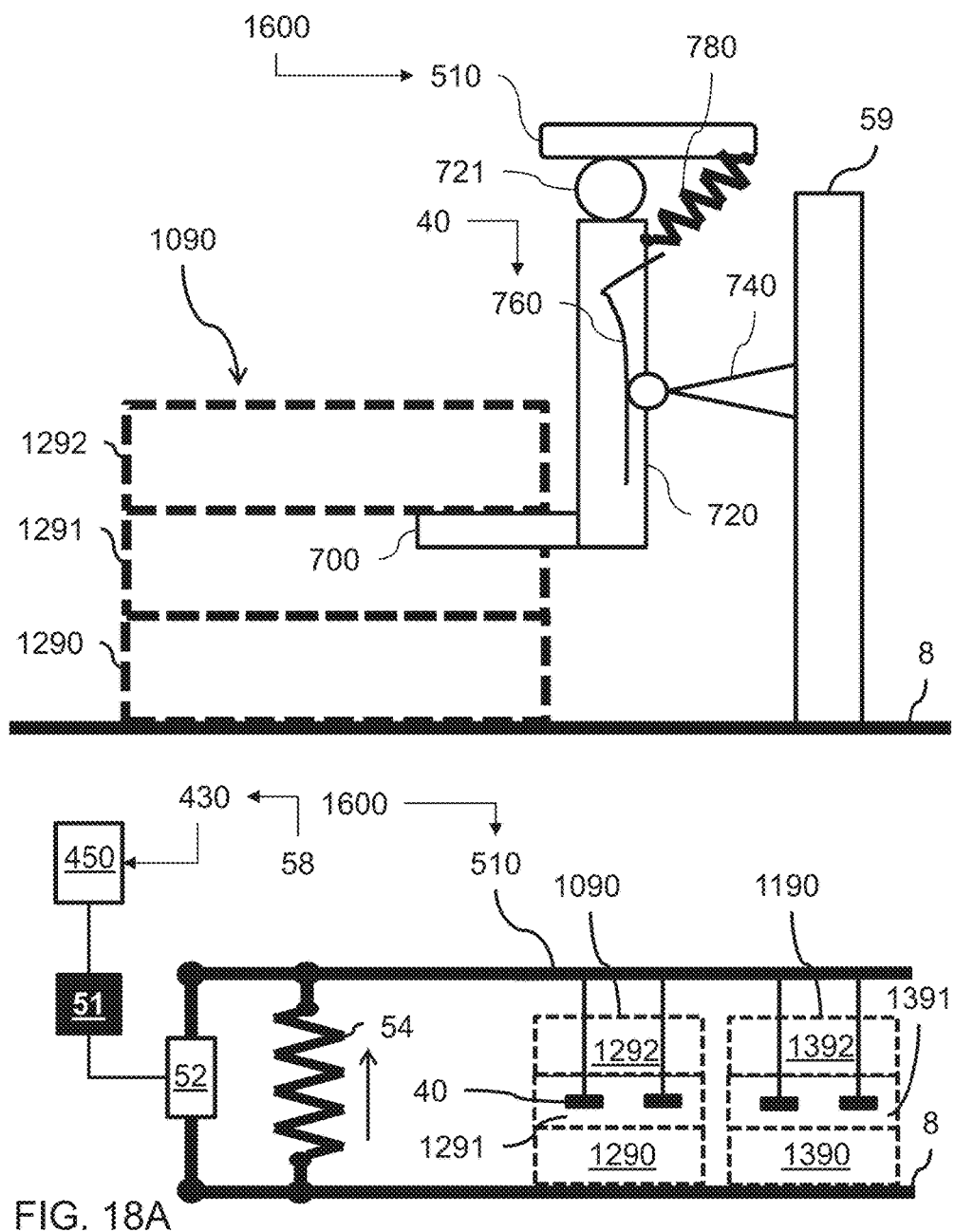

Referring now to FIG. 18A, an operational sequence is depicted.

The first pallet stack 1090 and the second pallet stack 1190 rest on the work surface 8 (or any equivalent work surface). The first pallet stack 1090 is held in the multi-stack pallet dispensing apparatus 1600. Specifically, the first pallet stack 1090 and the second pallet stack 1190 are latched to the movable frame 510. The movable frame 510 is configured to surround (at least in part) the first pallet stack 1090 and the second pallet stack 1190. For the sake of convenience, the first pallet stack 1090 and the second pallet stack 1190 are depicted as being shorter in height than the top section of the movable frame 510. It is understood that the first pallet stack 1090 and the second pallet stack 1190 may extend vertically beyond the upper section of the movable frame 510. The first pallet stack 1090 and the second pallet stack 1190 include a series of pallets positioned or stacked vertically one over the other (one above the other), one next to the other forming a first vertical column of pallets and a second vertical column of pallets. The first pallet stack 1090 and second pallet stack 1190 both include a first pallet 1290 and a second pallet 1390 that contacts the work surface 8. The pallet 1291 is positioned on (and contacts) a top surface of the pallet 1290. The pallet 1391 is positioned on (and contacts) a top surface of the pallet 1390. The pallet 1292 rests on (and contacts) the pallet 1291, and so on, etc. The pallet 1392 rests on (and contacts) the pallet 1391, and so on, etc.

The movable frame 510 is configured to be movable relative to the work surface 8. The stationary support frame 59 is configured to be stationary relative to the work surface 8 (such as, connected to or securely mounted to the work surface 8). It will be appreciated that only a portion of the stationary support frame 59 is depicted on one side of the movable frame 510, for the sake of convenient depiction and explanation.

The closed-loop hydraulic circuit 430 includes a hydraulic cylinder 52, a hydraulic valve 51 and a hydraulic reservoir 450. The hydraulic valve 51 is configured to selectively connect the hydraulic cylinder 52 to the hydraulic reservoir 450 in such a way that for the case where the hydraulic valve 51 is placed in the open state (open position), hydraulic fluid may flow between the hydraulic cylinder 52 and the hydraulic reservoir 450, and for the case where the hydraulic valve 51 is placed in the closed state (closed position), hydraulic fluid cannot flow between the hydraulic cylinder 52 and the hydraulic reservoir 450. In the open state, the hydraulic valve 51 is configured to provide a restriction (relatively smaller hydraulic orifice) so that the flow (flow rate, liters per hour) of hydraulic fluid may be moderated. As depicted for FIG. 7A, the hydraulic valve 51 is placed in the closed state so that the hydraulic fluid cannot flow between the hydraulic cylinder 52 and the hydraulic reservoir 450.

The hydraulic cylinder 52 includes opposite ends (a first end and a second end); the first end of the hydraulic cylinder 52 is securely mounted (operatively coupled) to the work surface 8. The second end of the hydraulic cylinder 52 is securely mounted (operatively coupled) to the movable frame 510. The hydraulic cylinder 52 is configured to moderate movement (limit speed) of the movable frame 510 along a vertical direction relative to the work surface 8. For instance, for the case where the movable frame 510 is released and is permitted to fall (under the influence of gravity) toward the work surface 8, the hydraulic cylinder 52 is configured to limit the speed of free fall in such a way that the movable frame 510 does not come crashing down to the work surface 8, and cause unwanted damage to the movable frame 510. During free fall of the movable frame 510, the movable frame 510 pushes against the operating rod of the hydraulic cylinder 52 so that the hydraulic fluid in the hydraulic cylinder 52 becomes pushed from the hydraulic cylinder 52, past the hydraulic valve 51 (the hydraulic valve 51 presents a flow restriction or a flow resistance) which slows down the flow rate of the hydraulic fluid leaving the hydraulic cylinder 52), and into the hydraulic reservoir 450.

As depicted, for the case where the hydraulic valve 51 is placed in the closed state, the movable frame 510 cannot be moved because the hydraulic fluid cannot be moved from the hydraulic cylinder 52 to the hydraulic reservoir 450, and for this case, the movable frame 510 is said to be in a locked (unmovable) position regardless of any forces applied to vertically) move the movable frame 510. It is preferred that the movable frame 510 is movable along the vertical axis or direction, and not laterally (side to side).

The movable frame 510 is configured to surround the pallet stack 12. The movable frame 510 includes latches 40 (also called a securing mechanism) positioned on opposite sides of the first pallet stack 1090 and the second pallet stack 1190. The latches 40 are configured to selectively latch the movable frame 510 with the first pallet stack 1090 (with the opposite sides of the first pallet stack 1090) and the second pallet stack 1190 (with the opposite sides of the second pallet stack 1190), between a latched state (latched condition as depicted in FIG. 18A) and an un-latched condition (an un-latched position) as depicted in FIG. 18G.

As depicted in FIG. 18A, the latches 40 latch the pallet 1291 and pallet 1391 of the first pallet stack 1090 and the second pallet stack 1190 respectively, with the movable frame 510, and in this manner the movable frame 510 and the first pallet stack 1090 and second pallet stack 1190 are latched or locked together; it will be understood that as depicted in FIG. 7A, the first pallet 1290 and second pallet 1390 are positioned on the ground (the pallet-dispensation position), and support the weight of the first pallet stack 1090 and second pallet stack 1190, respectively, in this case.

For the case where the hydraulic valve 51 is positioned in the open state, the weight of the pallet stack 12 keeps (urges) the movable frame 510 in a stationary position (the pallet-dispensation position) relative to the work surface 8, and keeps the movable frame 510 from moving vertically upward away from the work surface 8.

The spring assembly 54 includes opposite ends; specifically, the spring assembly 54 includes a first end configured to be operatively connected to the movable frame 510. The spring assembly 54 also includes a second end configured to be operatively connected to the work surface 8. The spring assembly 54 is configured to provide energy storage and conversion. The spring assembly 54 may also be called an energy-storage assembly. The spring assembly 54 is configured to selectively (directly or indirectly) convert mechanical kinetic energy into potential energy and vice versa. For example, the spring assembly 54 is configured to push or to move the movable frame 510 back to the position as depicted in FIG. 18A, which is also depicted in FIG. 18H as well. In FIG. 18H, the spring assembly 54 becomes compressed (receives mechanical kinetic energy from the movable frame 510 as the movable frame (510) moves under the force of gravity under a controlled decent), and the spring assembly 54 continues to stay compressed or become compressed as long as the latches 40 continue to latch the movable frame 510 with the pallet stack 12. Once the latches 40 release (release the movable frame 510 from the pallet stack 12), the spring assembly 54 is permitted to expand (because the latches have been released), and the spring assembly 54 converts potential energy (stored energy) into mechanical kinetic energy in such a way as to vertically move the movable frame 510 away from the work surface 8. As depicted in FIG. 18A, the spring assembly 54 is in the neutral state (in which no energy stored in the spring assembly 54). The action of the spring assembly 54 is described in connection with FIG. 18F and FIG. 18G.

Referring to FIG. 18A, in accordance with a specific example, the latch 40 includes: a cam roller 740, a cam pivot 721, an arm 720, a cam follower 760, and a dog 700. It will be appreciated that the instance of the latch 40 is depicted in the above schematic in FIG. 18A (for the sake of convenience). The dog 700 may be called an arm extension. The cam follower 760 is provided by the arm 720. The cam roller 740 is fixedly connected to the stationary support frame 59, and rollably contacts the cam follower 760 provided by the arm 720. The cam pivot 721 is operatively connected to the movable frame 510. The arm 720 is pivotally connected to the cam pivot 721 in such a way that the arm 720 is configured to pivot relative to the movable frame 510 between a latching state or a latching condition (as depicted in FIG. 18A), and a non-latching state or a non-latching condition as depicted in FIG. 18G. The arm 720 is configured to move relative to the cam roller 740 in response to vertical movement of the movable frame 510 in such a way that contact between the cam roller 740 and the cam follower 760 is operatively maintained. The dog 700 extends from the arm 720, at a lower portion of the arm 720. The dog 700 is configured to selectively engage a pallet of the pallet stack 12. For the case where the latch 40 is placed in the latched position (FIG. 18A), the dog 700 engages the pallet, such as the pallets 1291 and 1391. For the case where the latch 40 is placed in the un-latched position (FIG. 18G), the dog 700 does not engage (not latch) the pallet, such as the pallet 1291 and 1391.

Referring to FIG. 18A, the spring assembly 54 (which is an example of a rising device) is configured to apply a vertical lifting force to the movable frame 510, and the vertical lifting force is large enough to vertically lift the movable frame 510 upwardly away from the work surface 8. However, the movable frame 510 moves vertically upwardly and once the movable frame 510 engages with the first pallet stack 1090 and the second pallet stack 1190 (via the dogs 700 of the latches 40), the lifting force provided by the spring assembly 54 is not large enough to continue to vertically lift both the combined weight of the movable frame 510 and the first pallet stack 1090 and the second pallet stack 1190 upwardly and away from the work surface 8. As depicted in FIG. 18A, once the movable frame 510 moves vertically and engages (becomes latched) with the pallet stack 12, the movable frame 510 remains stationary relative to the pallet stack 12 while the lifting force of the spring assembly 54 continues to be applied to the movable frame 510, while the weight of the first pallet stack 1090 and the second pallet stack 1190 continue to overcome or defeat the lifting force provided by the spring assembly 54 to the movable frame 510.

Figure 18B:
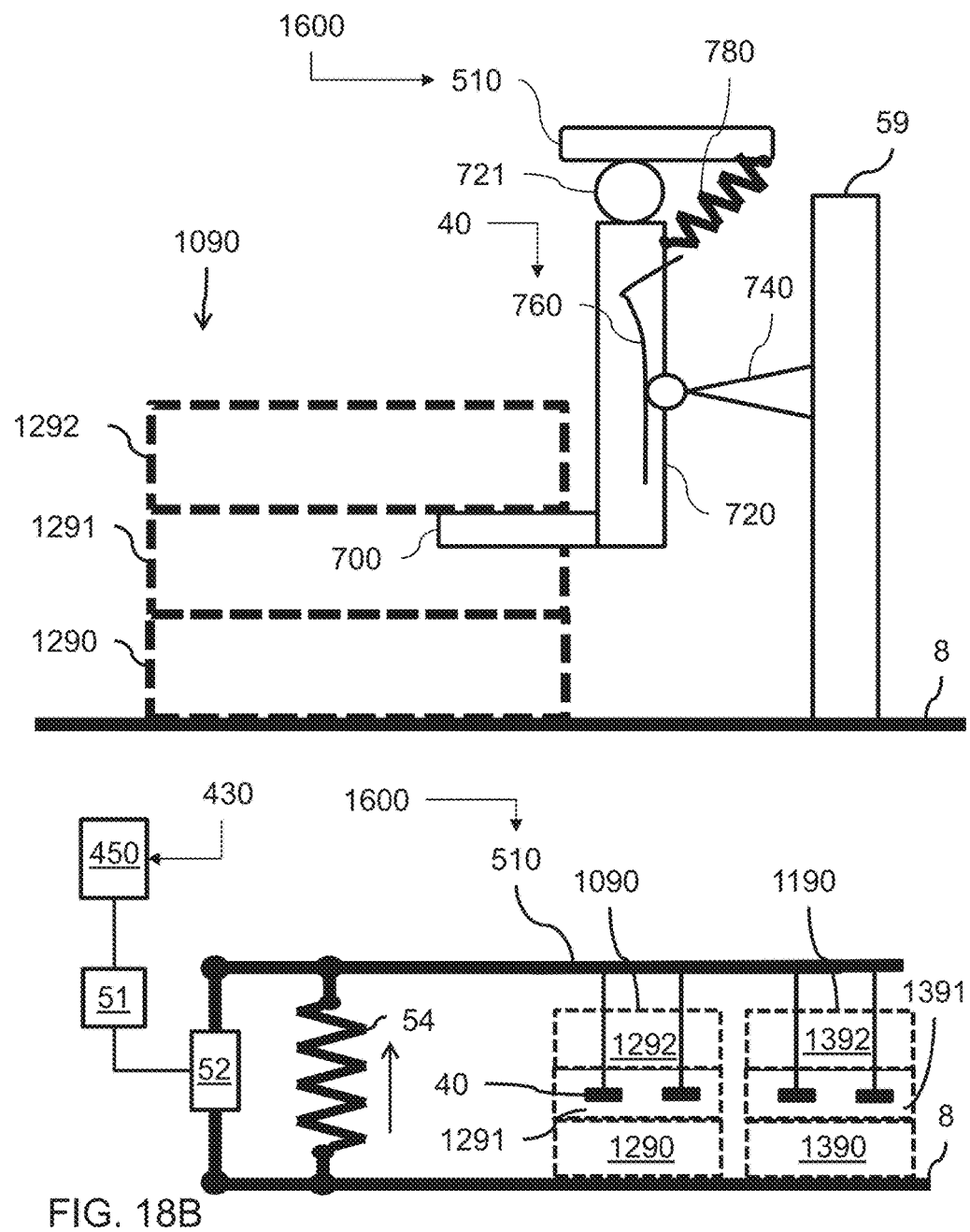

Referring now to FIG. 18B, the next operational sequence is depicted.

The hydraulic valve 51 is placed in the open state, so that the hydraulic fluid may flow between the hydraulic reservoir 450 and the hydraulic cylinder 52 in response to vertical movement of the movable frame 510 (to be caused by the double-deep pallet transporter 1400, which is not depicted in FIG. 18B but is depicted in FIG. 18C). For the case where the hydraulic valve 51 is placed in the open state and the movable frame 510 is not urged to be moved, then the fluid does not flow between the hydraulic reservoir 450 and the hydraulic cylinder 52. Once the hydraulic valve 51 is placed in the open state, and the movable frame 510 is free to fall (under influence of gravity) so that the dog 700 contacts the lower section of the pallet 11.

Referring now to FIG. 18C, the next operational sequence is depicted.

The double-deep pallet transporter 1400 is moved into the first pallet 1290 and the second pallet 1390. The first pallet 1290 and second pallet 1390 define an opening configured to receive the forks of the double-deep pallet transporter 1400. The double-deep pallet transporter 1400 is now ready to vertically lift the first pallet stack 1090 and the second pallet stack 1190 (and the movable frame 510) away from the work surface 8. As depicted, the double-deep pallet transporter 1400 is ready to lift the first pallet stack 1090 and the second pallet stack 1190 and the movable frame 510 (since the first pallet stack 1090, the second pallet stack 1190, and the movable frame 510 are latched together by the latches 40).

Figure 18D:
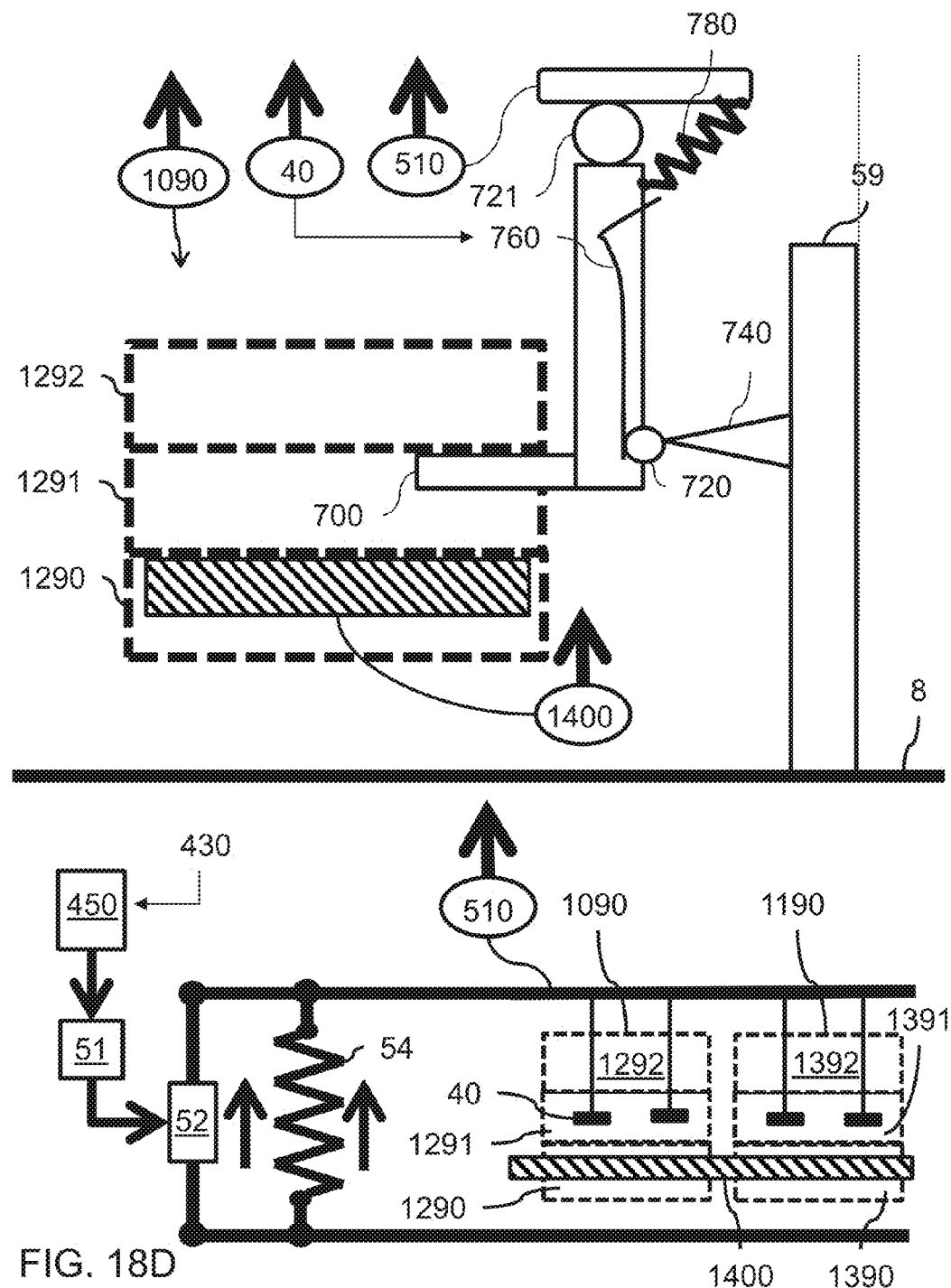

Referring now to FIG. 18D, the next operational sequence is depicted.

The spring assembly 54 is configured to apply the lifting force to the movable frame 510, and the lifting force is not large enough to lift the movable frame 510 vertically upwards away from the work surface 8 while the movable frame 510 remains engaged (latched) with the first pallet stack 1090 and the second pallet stack 1190 (via the dogs 700 of the latches 40), because the weight of the first pallet stack 1090 and the second pallet stack 1190 overcomes the lifting force applied by the spring assembly 54 to the movable frame 510. The lifting force provided by the spring assembly 54 is not large enough to vertically lift the combined weight of the movable frame 510 and the first pallet stack 1090 and the second pallet stack 1190 upwardly and away from the work surface 8. However, once the double-deep pallet transporter 1400 is engaged with the first pallet 1290 and the second pallet 1390 (i.e., the lower most pallets of the first pallet stack 1090 and the second pallet stack 1190), the double-deep pallet transporter 1400 is used to apply just enough vertical lifting force to the first pallet stack 1090 and the second pallet stack 1190 in such a way that the combination of the lifting force provided by the spring assembly 54 and the lifting force provided by the double-deep pallet transporter 1400 (in combination) are applied to the combination of the movable frame 510 and the first pallet stack 1090 and the second pallet stack 1190. The combined lifting force from both the spring assembly 54 and the double-deep pallet transporter 1400 is enough to vertically lift the combination of the movable frame 510 and the first pallet stack 1090 and the second pallet stack 1190 upwardly away from the work surface 8. Therefore, the movable frame 510 is configured to movably hold, at least in part, the first pallet stack 1090 and the second pallet stack 1190 between the pallet-storage position (example, higher off the ground) and the pallet-dispensation position (example, lower on the ground). The movable frame 510 is also configured to hold the first pallet stack 1090 and the second pallet stack 1190 relative to the double-deep pallet transporter 1400 in such a way that the double-deep pallet transporter 1400 is permitted to vertically lift the first pallet stack 1090 and the second pallet stack 1190 as the movable frame 510 is provided with vertical-lift assistance; the vertical-lift assistance may be provided, for example, from the spring assembly 54). In accordance with an option, the raising device (such as the spring assembly 54) is configured to vertically lift the movable frame 510 away from the pallet-dispensation position (example, lower on the ground) toward the pallet-storage position (higher above the ground) while the double-deep pallet transporter 1400 is permitted to vertically lift the first pallet stack 1090 and the second pallet stack 1190. In accordance with an option, the raising device (such as the spring assembly 54 may be electrically unpowered if so desired. For the case where the riser assembly or the spring assembly 54 is electrically unpowered, a technical advantage is that the apparatus may operate relatively faster than for the case where electrical power is used to vertically lift the movable frame 510.

The hydraulic valve 51 is in the open state. The double-deep pallet transporter 1400 vertically lifts the first pallet 1290 and the second pallet 1390 away from the work surface 8, thus lifting the pallet stack 12 and the movable frame 510 vertically above the work surface 8 because movable frame 510 is latched to the first pallet stack 1090 and the second pallet stack 1190 by way of the latch 40. The double-deep pallet transporter 1400 does the work of vertically lifting the first pallet stack 1090 and the second pallet stack 1190. The movable frame 510 pulls on the rod of the hydraulic cylinder 52, and since the hydraulic valve 51 is placed in the open state, then the hydraulic fluid flows from the hydraulic reservoir 450 to the hydraulic cylinder 52, thus filling the hydraulic cylinder 52 with additional hydraulic fluid. As the first pallet stack 1090 and the second pallet stack 1190 are moved vertically upward, and the latch 40 continues to contact the bottom section of the first pallet 1290 and the second pallet 1390 as the first pallet stack 1090 and the second pallet stack 1190 are vertically lifted away from the work surface 8. As depicted, for the case where the first pallet stack 1090 and second pallet stack 1190 are vertically lifted, the latch 40 transfers the weight of the movable frame 510 to the first pallet 1290 and second pallet 1390 of the first pallet stack 1090 and the second pallet stack 1190 respectively; and for this case, the weight of the first pallet stack 1090 and second pallet stack 1190 are fully supported by the double-deep pallet transporter 1400. The arm 720 is also vertically moved while the cam roller 740 remains stationary relative to the movement of the cam arm 720. Referring now to FIG. 18G, the next operational sequence is depicted.

Figure 18E:
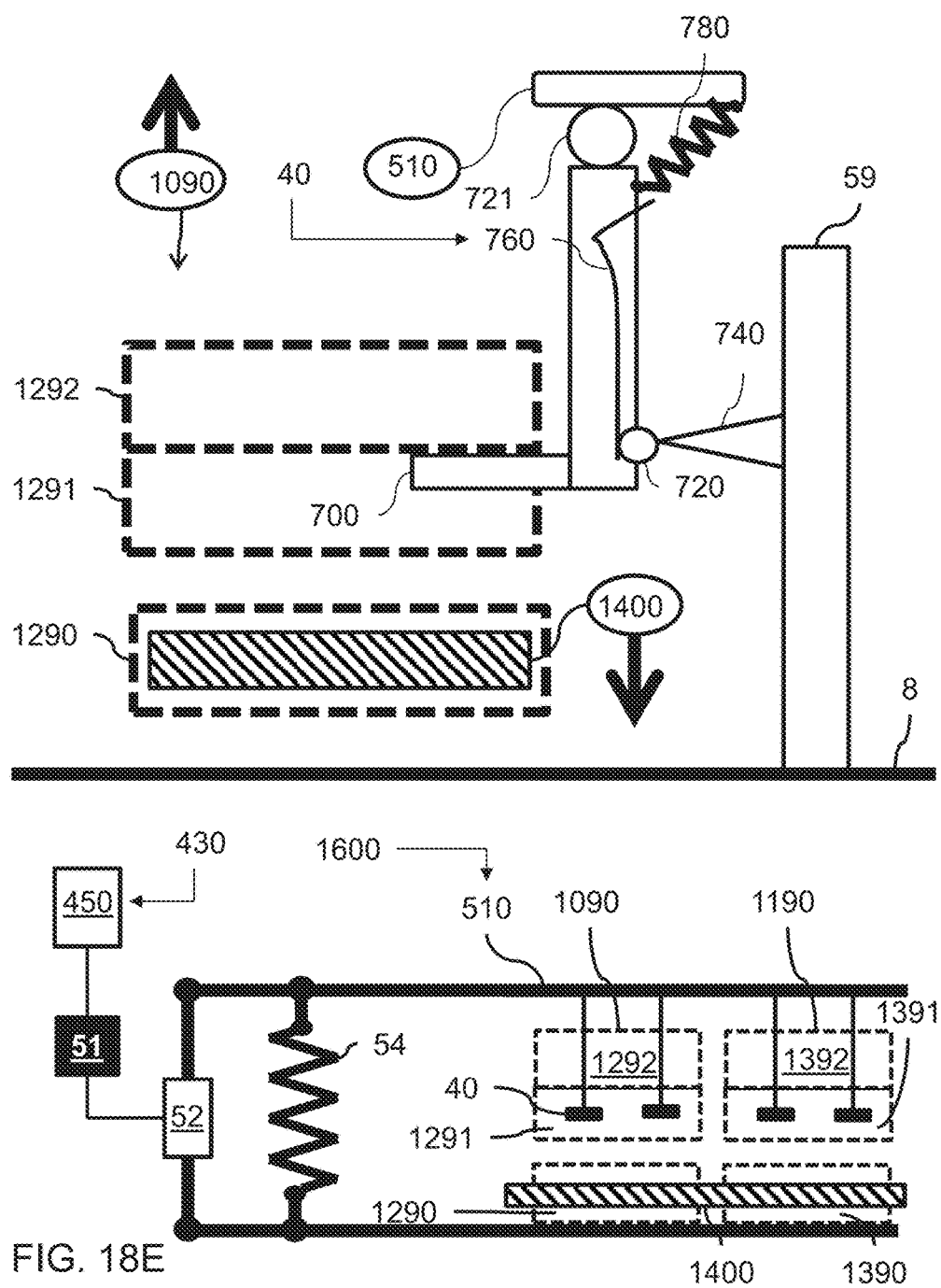

Referring now to FIG. 18E, the next operational sequence is depicted.

The hydraulic valve 51 is placed in a closed state. In this case, the fluid cannot flow out from the hydraulic cylinder 52, and so the hydraulic cylinder 52 is locked up and cannot move. The movable frame 510, as well, cannot move since the rod of the cylinder cannot move. Now, the double-deep pallet transporter 1400 moves the first pallet 1290 and second pallet 1390 vertically down and away from the first pallet stack 1090 and second pallet stack 1190 respectively, vertically downward towards the work surface 8. This is done in such a way that a clearance gap is formed between the top of pallet 1290, 1390 and the bottom of pallet 1291, 1391. The double-deep pallet transporter 1400 lowers the first pallet 1290 and the second pallet 1390 while pallet 1291 and pallet 1391 remains latched to the movable frame 510, with the rest of the first pallet stack 1090 and second pallet stack 1190 resting on pallet 1291 and pallet 1391 respectively. The weight of the movable frame 510 and the first pallet stack 1090 and the second pallet stack 1190 are supported by the hydraulic cylinder 52. Since there is no fluid flowing from the hydraulic cylinder 52, the hydraulic cylinder 52 is locked, and keeps the movable frame 510 from falling vertically toward the work surface 8. For the case depicted in FIG. 18E, gravity cannot overcome the force of the hydraulic cylinder 52 that acts to push or to maintain the position of the movable frame 510 in a stationary position relative to the stationary support frame 59. Thus, the movable frame 510 and first pallet stack 1090 and second pallet stack 1190 remain in static position, hanging above the work surface 8.

Figure 18F:
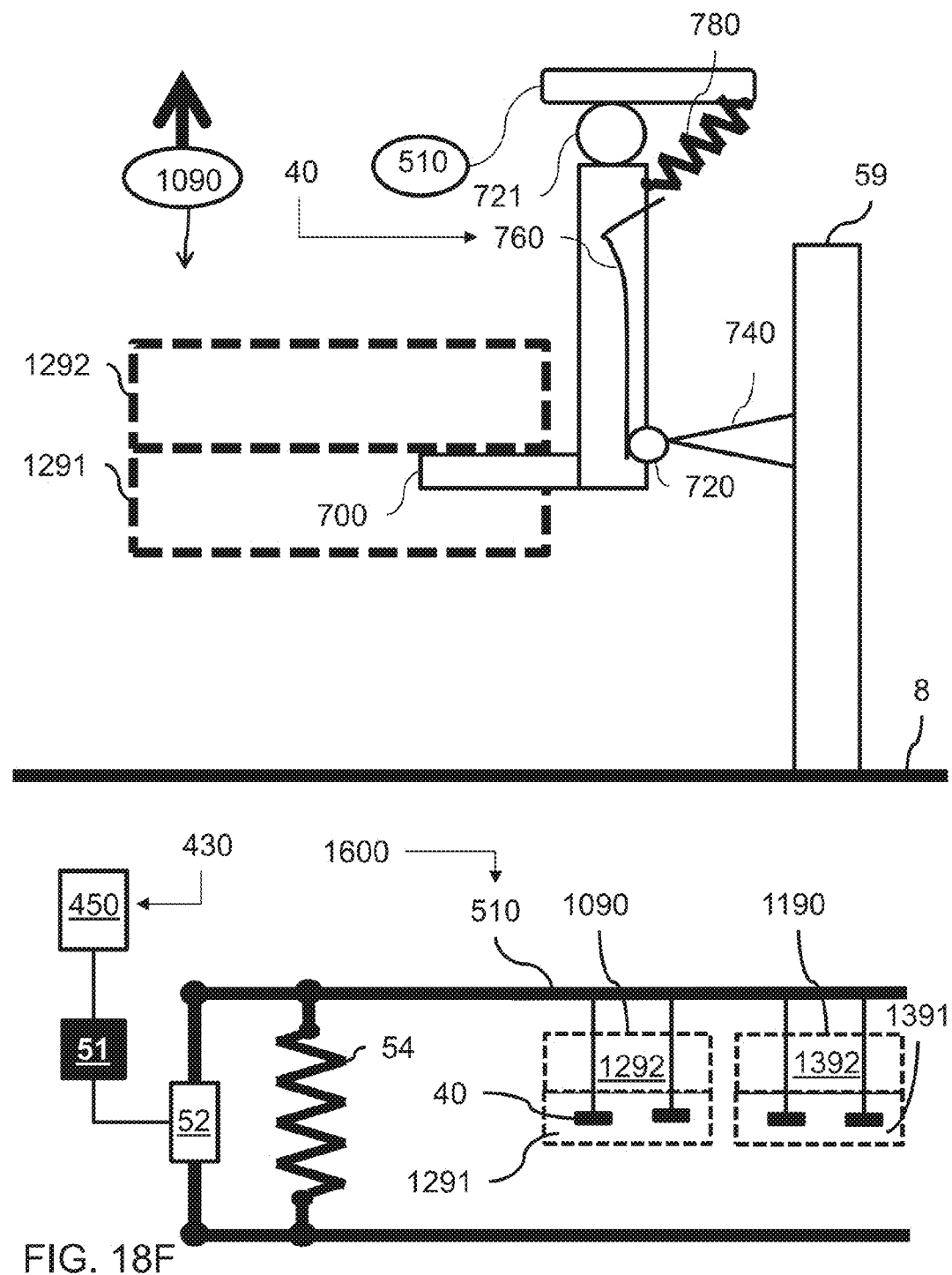
Figure 18H:
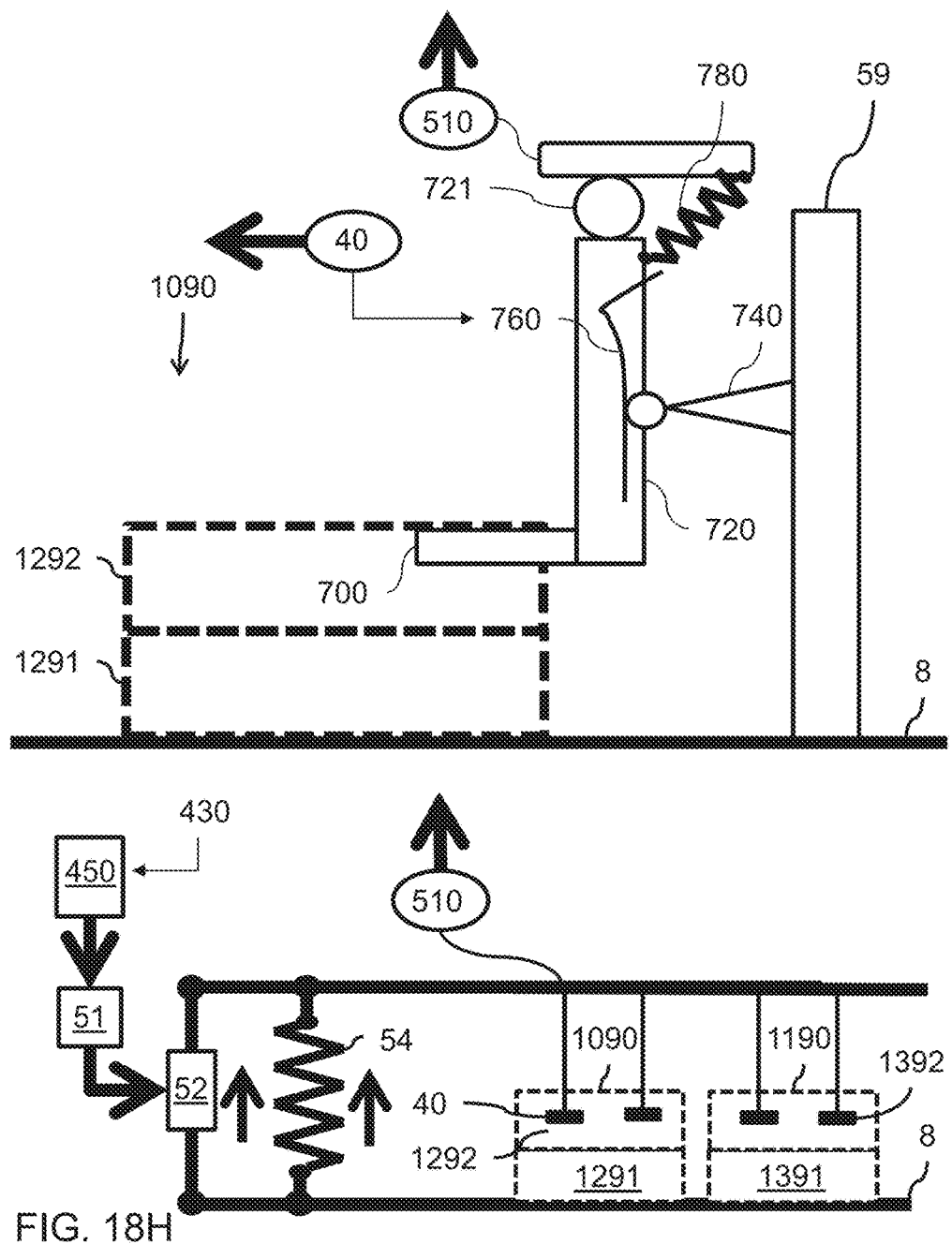

Referring now to FIG. 18F, the next operational sequence is depicted.

The hydraulic valve 51 remains in the closed state, there is no flow of fluid between the hydraulic cylinder 52 and the hydraulic reservoir 450, and the hydraulic cylinder 52 remains in a locked state and supports the weight of the movable frame 510 and the pallet stack 12 while the double-deep pallet transporter 1400 is moved entirely away from the movable frame 510. A photocell (not depicted and known) may be used to detect that the double-deep pallet transporter 1400 is no longer present below the movable frame 510. The signal from the photocell may be used to initiate the opening of the hydraulic valve 51 (depicted in FIG. 18G). As depicted in FIG. 18F, the movable frame 510 is held in the static (stationary) position above ground because the hydraulic valve 51 is closed, thus locking out movement of the movable frame 510.

Referring now to FIG. 18G, the next operational sequence is depicted.

The hydraulic valve 51 is placed in the open state, and the weight of the movable frame 510 and the pallet stack 12 push against the rod of the hydraulic cylinder 52 and thus the hydraulic fluid in the hydraulic cylinder 52 is urged to flow toward the hydraulic valve 51, through the hydraulic valve 51 and into the hydraulic reservoir 450. The hydraulic valve 51 presents a restricted orifice to the flow of hydraulic fluid, thus slowing down or moderating the flow of hydraulic fluid from the hydraulic cylinder 52 to the hydraulic reservoir 450. In the this manner, resistance or an opposing force is applied to the downward movement of the movable frame 510 and the first pallet stack 1090 and second pallet stack 1190, thus slowing down the vertical decent of the movable frame 510 and the first pallet stack 1090 and second pallet stack 1190 toward the work surface 8, thereby avoiding free fall under gravity. The opposing force provided by the hydraulic cylinder 52 cannot overcome the force of gravity acting on the movable frame 510 and the first pallet stack 1090 and the second pallet stack 1190

Once the movable frame 510 vertically falls toward the work surface 8, the movable frame pushes on the spring assembly 54 and thus the movable frame 510 compresses the spring assembly 54. In this case, the spring assembly 54 stores energy (becomes compressed). The spring assembly 54 becomes compressed and stores potential kinetic energy received from the movable frame 510. The potential energy stored by the spring assembly 54 will be used (at least in part) in FIG. 18G to vertically lift the movable frame 510 away from the work surface 8. The spring assembly 54 is used later in the process of de-latching and positioning the movable frame 510 as depicted in FIG. 18A.

In accordance with one option, the hydraulic valve 51 is configured such that the hydraulic valve 51 is placed in the open state only when the pallet 10 and the double-deep pallet transporter 1400 become completely cleared from the movable frame 510. With this option, the operator of the double-deep pallet transporter 1400 may take their time to remove the double-deep pallet transporter 1400 away from the movable frame 510 since the movable frame 510 for this case remains static or stationary (hanging above the work surface 8) until the hydraulic valve 51 is placed in the open state.

In accordance with another option, the hydraulic valve 51 is configured to be placed in the open state automatically once the double-deep pallet transporter 1400 begins to move away from the movable frame 510. It is understood that in this case the operator of the double-deep pallet transporter 1400 must have sufficient skill to move the double-deep pallet transporter 1400 and the first pallet 1290 and second pallet 1390 away from the movable frame 510 as quickly as possible since the movable frame 510 has begun its vertical controlled decent, and it would be desired to avoid collision between the descending movable frame 510 and the double-deep pallet transporter 1400 (naturally). It is understood that the movable frame 510 is allowed to descend to ground (in a controlled free fall) because fluid flows from the hydraulic cylinder 52 to the hydraulic reservoir 450 since the hydraulic valve 51 is placed in the open condition. As the movable frame 510 vertically descends toward the work surface 8, the latches 40 become de-latched from pallet 1291 and pallet 1391 as the first pallet stack 1090, the second pallet stack 1190, and movable frame 510 are moved toward the work surface. The latches 40 pivot away from pallet 1291 and pallet 1391. In the example depicted in FIG. 18G, the latches 40 visible in the figure would pivot towards the viewer while the latches 40 on the opposite side of the first pallet stack 1090 and second pallet stack 1190 would pivot away from the viewer. Specifically, the cam follower 760 allows the cam roller 740 to pivot the arm 720. The cam follower 760 causes automatic de-latching of the latch 40 as the movable frame 510 moves or descends toward the work surface 8. The spring assembly 54 has stored potential energy, ready to be used to lift the movable frame 510 once the latches 40 are placed in the un-latched condition (as depicted in FIG. 18G). Once the latches 40 are placed in the un-latched state, the movable frame 510 is pushed by the spring assembly 54 vertically upwardly and away from the work surface 8.

Referring now to FIG. 18H, the next operational sequence is depicted.

The spring assembly 54 has stored potential energy, ready to be used to lift the movable frame 510 once the latches 40 are placed in the un-latched condition (as depicted in FIG. 18G). Once the latches 40 are placed in the un-latched state, the movable frame 510 is pushed by the spring assembly 54 vertically upwardly and away from the work surface 8. Once de-latching occurs, the spring assembly 54 changes state from the compressed state to neutral state and thus the spring assembly 54 expends energy to lift the movable frame 510 vertically upwardly away from the work surface 8. The movable frame 510 moves vertically upward by force received from spring assembly 54. The spring assembly 54 expends kinetic energy that moves the movable frame 510 upwardly while the first pallet stack 1090 and second pallet stack 1190 remains stationary on the work surface 8. Once the movable frame 510 moves vertically up and away from the work surface 8, the latches 40 securely engage pallet 1292 and 1392 respectively, and then the pallet 1291 and pallet 1391 are available for removal from the bottom section of the first pallet stack 1090 and the second pallet stack 1190. The spring assembly 54 reaches the neutral state (not biased or not storing potential energy). The hydraulic valve 51 remains in the open state so that hydraulic fluid is ready to flow between the hydraulic cylinder 52 and the hydraulic reservoir 450 for the next dispensing cycle. The movable frame 510 held in a static position. The movable frame 510 remains at rest on the first pallet stack 1090 and the second pallet stack 1190, and the first pallet stack 1090 and the second pallet stack 1190 rests on the work surface 8. The cycle is ready to begin for the removal of pallets 1291 and 1391 once required to do so.

To summarize, in view of FIGS. 18A to 18H, the multi-stack pallet dispensing apparatus 1600 includes the movable frame 510 configured to movably hold, at least in part, the first pallet stack 1090 and the second pallet stack 1190 between the pallet-storage position and the pallet-dispensation position. The movable frame 510 is also configured to hold a pallet 1290, 1390 from each of the first pallet stack 1090 and the second pallet stack 1190 relative to a double-deep pallet transporter in such a way that the double-deep pallet transporter 1400 is permitted to vertically lift the first pallet stack 1090 and second pallet stack 1190 and allow the movable frame 510 to travel upwards because of the spring force or other force provided by another device. The multi-stack pallet dispensing apparatus 1600 also includes a dampening device configured to dampen, at least in part, free-fall descent of the movable frame 510 under influence of gravity from the pallet-storage position toward the pallet-dispensation position. Since the double-deep pallet transporter 1400 lifts the first pallet stack 1090 and the second pallet stack 1190, a taller instance of the first pallet stack 1090 and the second pallet stack 1190 may be possible. In accordance with an option, the multi-stack pallet dispensing apparatus 1600 is adapted such that the movable frame 510 is configured to movably hold the first pallet stack 1090 and the second pallet stack 1190 having the pallet 1290, 1390 of each of the first pallet stack 1090 and second pallet stack 1190 between the pallet-storage position and the pallet-dispensation position without consuming electrical energy, and the dampening device is configured to dampen free-fall descent of the movable frame 510 under influence of gravity from the pallet-storage position toward the pallet-dispensation position without consuming electrical energy.

In general terms, in view of FIGS. 18A to 18H, an apparatus includes a multi-stack pallet dispensing apparatus 1600. The multi-stack pallet dispensing apparatus 1600 includes a movable frame 510 configured to movably hold, at least in part, a first pallet stack 1090 and a second pallet stack 1190 between a pallet-storage position and a pallet-dispensation position. The movable frame 510 is also configured to hold a pallet 10 of the first pallet stack 1090 and the second pallet stack 1190 relative to a double-deep pallet transporter 1400 in such a way that the double-deep pallet transporter 1400 is permitted to vertically lift the first pallet stack 1090 and the second pallet stack 1190 and allow the movable frame 510 to travel upwards because of the spring force or other force provided by another device.

Further Description

The following clauses are offered as further description of the examples of the apparatus. Any one or more of the following clauses may be combinable with any another one or more of the following clauses. Any one of the following clauses may stand on its own merit without having to be combined with another other of the clauses. Clause (1): an apparatus of any clause mentioned in this paragraph, further comprising (if so desired) a pallet dispensing system (100), including: a movable frame (510) being configured to movably hold, at least in part, a pallet stack (12) between a pallet-storage position and a pallet-dispensation position, and the movable frame (510) also being configured to hold the pallet stack (12) relative to a pallet transporter (56) in such a way that the pallet transporter (56) is permitted to vertically lift, at least in part, the pallet stack (12) as the movable frame (510) is provided, at least in part, with vertical-lift assistance through stored potential energy. Clause (2): an apparatus of any clause mentioned in this paragraph, further comprising (if so desired) a raising device being configured to vertically lift the movable frame (510) away from the pallet-dispensation position toward the pallet-storage position while the pallet transporter (56) is permitted to vertically lift the pallet stack (12). Clause (3): an apparatus of any clause mentioned in this paragraph, further comprising (if so desired) a dampening device being configured to dampen, at least in part, free-fall descent of the movable frame (510) under influence of gravity from the pallet-storage position toward the pallet-dispensation position. Clause (4): an apparatus of any clause mentioned in this paragraph, wherein (if so desired) the movable frame (510) is configured to movably hold the pallet stack (12) having a pallet (10) between the pallet-storage position and the pallet-dispensation position without consuming electrical energy. Clause (5): an apparatus of any clause mentioned in this paragraph, wherein (if so desired) the dampening device is configured to dampen free-fall descent of the movable frame (510) under the influence of gravity from the pallet-storage position toward the pallet-dispensation position without consuming electrical energy. Clause (6): an apparatus of any clause mentioned in this paragraph, wherein (if so desired) the movable frame (510) is configured to movably hold the pallet stack (12) having a pallet (10) between the pallet-storage position and the pallet-dispensation position without consuming electrical energy; and the dampening device is configured to dampen free-fall descent of the movable frame (510) under the influence of gravity from the pallet-storage position toward the pallet-dispensation position without consuming electrical energy. Clause (7): an apparatus of any clause mentioned in this paragraph, wherein (if so desired) the dampening device includes: a hydraulic cylinder (52) being configured to cooperate with a hydraulic reservoir (450). Clause (8): an apparatus of any clause mentioned in this paragraph, further comprising (if so desired) a raising device being configured to move the movable frame (510) away from the pallet-dispensation position toward the pallet-storage position without consuming electrical energy. Clause (9): an apparatus of any clause mentioned in this paragraph, wherein (if so desired) the raising device includes: a spring assembly (54) being configured to apply, at least in part, an amount of mechanical kinetic energy being converted, at least in part, from an amount of mechanical potential energy to the movable frame (510) in such a way that application, at least in part, of the amount of mechanical kinetic energy to the movable frame (510) urges, at least in part, movement of the movable frame (510) away from the pallet-dispensation position toward the pallet-storage position. Clause (10): an apparatus of any clause mentioned in this paragraph, wherein (if so desired) the raising device includes: a counterweight assembly (790) configured to: store an amount of mechanical potential energy; and convert the amount of mechanical potential energy to an amount of mechanical kinetic energy. Clause (11): an apparatus of any clause mentioned in this paragraph, wherein (if so desired) the raising device includes: a cylinder filled with a compressible gas. Clause (12): an apparatus of any clause mentioned in this paragraph, further comprising (if so desired) a pallet dispensing system (100), including: a movable frame (510) being configured to: be non-electrically powered in such a way as to operate without consuming electrical energy; selectively latch with a pallet stack (12) having a pallet (10) between an unlatched state and a latched state; and movably hold, at least in part, the pallet stack (12) between a pallet-storage position and a pallet-dispensation position once the movable frame (510) and the pallet stack (12) are latched together; and a dampening device being configured to: be non-electrically powered in such a way as to operate without consuming electrical energy; operatively couple to the movable frame (510); and slow down free-fall descent of the movable frame (510) under influence of gravity from the pallet-storage position toward the pallet-dispensation position for a case where the movable frame (510) becomes unlatched from the pallet stack (12), and the movable frame (510) is free to descend under the influence of gravity from the pallet-storage position toward the pallet-dispensation position. Clause (13): an apparatus of any clause mentioned in this paragraph, wherein (if so desired) the dampening device includes: a hydraulic cylinder (52) being configured to cooperate with a hydraulic reservoir (450). Clause (14): an apparatus of any clause mentioned in this paragraph, further comprising (if so desired) a raising device being configured to: move the movable frame (510) away from the pallet-dispensation position toward the pallet-storage position without consuming electrical energy; and be non-electrically powered in such a way as to operate without consuming electrical energy. Clause (15): an apparatus of any clause mentioned in this paragraph, wherein (if so desired) the raising device includes: a spring assembly (54) being configured to apply, at least in part, an amount of mechanical kinetic energy being converted, at least in part, from an amount of mechanical potential energy to the movable frame (510) in such a way that application, at least in part, of the amount of mechanical kinetic energy to the movable frame (510) urges, at least in part, movement of the movable frame (510) away from the pallet-dispensation position toward the pallet-storage position. Clause (16): an apparatus of any clause mentioned in this paragraph, wherein (if so desired) the movable frame (510) is configured to movably hold, at least in part, the pallet stack (12) having the pallet (10); and once the pallet (10) has been dispensed, gravity moves the pallet stack (12) and the movable frame (510) to the pallet-dispensation position, the amount of mechanical kinetic energy of a moving instance of the pallet stack (12) being stored, at least in part, as the amount of mechanical potential energy. Clause (17): an apparatus of any clause mentioned in this paragraph, wherein (if so desired) the amount of mechanical kinetic energy converted from a stored amount of mechanical potential energy is used to move the movable frame (510) from the pallet-dispensation position to the pallet-storage position once the pallet (10) has been dispensed. Clause (18): an apparatus of any clause mentioned in this paragraph, wherein (if so desired) the raising device includes: a counterweight assembly (790) configured to: store the amount of mechanical potential energy; and convert the amount of mechanical potential energy to the amount of mechanical kinetic energy. Clause (19): an apparatus of any clause mentioned in this paragraph, wherein (if so desired) the spring assembly (54) is configured to: store the amount of mechanical potential energy; and convert the amount of mechanical potential energy into the amount of mechanical kinetic energy. Clause (20): an apparatus of any clause mentioned in this paragraph, wherein (if so desired) the movable frame (510) is configured to receive, to hold and to permit movement of the pallet stack (12) having the pallet (10); and the raising device is configured to operate without powered assistance other than by application of gravity to freely move the pallet stack (12). Clause (21): an apparatus of any clause mentioned in this paragraph, wherein (if so desired) the movable frame (510) is configured to receive, to hold and to permit movement of the pallet stack (12) having the pallet (10); and the movable frame (510) is configured to be moved from the pallet-storage position to the pallet-dispensation position by using a pallet moving assembly (55) on the pallet stack (12). Clause (22): an apparatus of any clause mentioned in this paragraph, wherein (if so desired) the movable frame (510) is configured to remain in the pallet-dispensation position until the pallet (10) has been dispensed. Clause (23): an apparatus of any clause mentioned in this paragraph, wherein (if so desired) the raising device includes: a hydraulic circuit (58) being coupled to the movable frame (510), and being configured to support the movable frame (510) in the pallet-dispensation position until the pallet (10) has been dispensed. Clause (24): an apparatus of any clause mentioned in this paragraph, wherein (if so desired) the hydraulic circuit (58) further configured to dampen movement of the movable frame (510) from the pallet-dispensation position. Clause (25): an apparatus of any clause mentioned in this paragraph, wherein (if so desired) the movable frame (510) is configured to receive, to hold and to permit movement of the pallet stack (12) having the pallet (10); and the hydraulic circuit (58) includes: a check valve (not shown) being connected to a hydraulic reservoir (450); a flow control valve (not shown) being connected to the check valve; and a hydraulic cylinder (52) being connected to the flow control valve, and also being configured to support and to lower the movable frame (510) having the pallet stack (12) to ground level. Clause (26): an apparatus of any clause mentioned in this paragraph, wherein (if so desired) the raising device includes: a detection assembly (800) being configured to detect dispensation of the pallet from the movable frame 510. Clause (27): an apparatus of any clause mentioned in this paragraph, wherein (if so desired) the movable frame (510 moves from the pallet-dispensation position to the pallet-storage position once the detection assembly (800) is operated to detect that the pallet (10) has been dispensed. Clause (28): an apparatus of any clause mentioned in this paragraph, wherein (if so desired) the movable frame (510) is configured to receive, to hold and to permit movement of the pallet stack (12) having the pallet (10); and the movable frame (510) includes: a spring-loaded latch assembly (710) configured to operate in the latched state and a de-latched state, in the latched state, (A) the movable frame (510) holds the pallet stack (12), and (B) the movable frame (510) moves with the pallet stack (12); and in the de-latched state, the movable frame (510) moves independently of the pallet stack (12). Clause (29): an apparatus of any clause mentioned in this paragraph, wherein (if so desired) the movable frame (510) is configured to interface with the spring-loaded latch assembly (710) of the movable frame (510) so that the movable frame (510) is placed in the de-latched state once the movable frame (510) moves from the pallet-dispensation position to the pallet-storage position; and the movable frame (510) is placed in the latched state otherwise. Clause (30): an apparatus of any clause mentioned in this paragraph, wherein (if so desired) the movable frame (510) is configured to receive, to hold and to permit movement of the pallet stack (12) having the pallet (10); and a pallet-enclosing assembly (610) configured to receive and enclose the pallet stack (12) so as to limit lateral movement of the pallet stack (12) once the pallet stack (12) is enclosed by the pallet-enclosing assembly (610). Clause (31): a method for dispensing pallets of any clause mentioned in this paragraph, further comprising (if so desired) moving a pallet stack (12) held in a movable frame (510) from a pallet-storage position to a pallet-dispensation position including: raising the pallet stack (12) held in the movable frame (510), the movable frame (510) being configured to be moved between the pallet-storage position and the pallet-dispensation position once the pallet stack (12) is raised; and dispensing a pallet from the movable frame (510). Clause (32): a method for dispensing pallets of any clause mentioned in this paragraph, wherein (if so desired) dispensing the pallet (10) includes: storing, at least in part, an amount of mechanical potential energy converted from an amount of mechanical kinetic energy once the movable frame (510) is moved from the pallet-storage position to the pallet-dispensation position; and removing the pallet (10). Clause (33): a method for dispensing pallets of any clause mentioned in this paragraph, wherein (if so desired) dispensing the pallet (10) further includes: moving the movable frame (510) from the pallet-dispensation position to the pallet-storage position once the pallet (10) has been removed, and a stored amount of mechanical potential energy is converted to the amount of mechanical kinetic energy, the amount of mechanical kinetic energy is used to move the movable frame (510) from the pallet-dispensation position to the pallet-storage position. Clause (34): a method for dispensing pallets of any clause mentioned in this paragraph, wherein (if so desired) dispensing the pallet (10) further includes: holding the movable frame (510) in the pallet-dispensation position until the pallet (10) has been dispensed. Clause (35): a method for dispensing pallets of any clause mentioned in this paragraph, wherein (if so desired) dispensing the pallet (10) further includes: de-latching the pallet stack (12) from the movable frame (510) once the pallet (10) has been dispensed, and the movable frame (510) is moved from the pallet-dispensation position to the pallet-storage position, and the movable frame (510) is latched to the pallet stack (12) otherwise. Clause (36): a method for dispensing pallets of any clause mentioned in this paragraph, further comprising (if so desired) raising the pallet stack (12) by using a pallet moving assembly (55). Clause (37): a method for dispensing pallets of any clause mentioned in this paragraph, further comprising (if so desired) dispensing the pallet using energy being input by the pallet moving assembly (55) and a stored amount of mechanical potential energy. Clause (38): a method for dispensing pallets of any clause mentioned in this paragraph, wherein (if so desired) the amount of mechanical kinetic energy being converted to the amount of mechanical potential energy includes gravity acting on the pallet stack (12) once the pallet (10) has been dispensed. Clause (39): a method for dispensing pallets of any clause mentioned in this paragraph, further comprising (if so desired) dampening, at least in part, free-fall descent of a pallet stack (12) under influence of gravity from a pallet-storage position toward a pallet-dispensation position without consuming electrical energy. Clause (40): a method for dispensing pallets of any clause mentioned in this paragraph, further comprising (if so desired) movably holding, at least in part, the pallet stack (12) between the pallet-storage position and the pallet-dispensation position without consuming electrical energy. Clause (41): a method of establishing a vertical pallet stack and dispensing at least one pallet from a bottom end of the vertical pallet stack, the method of any clause mentioned in this paragraph, further comprising (if so desired) receiving, in the vertical pallet stack, a plurality of individual pallets in overlying relationship; supporting a pallet dispensed from the bottom end of the vertical pallet stack on a support surface in overlying relationship to a remainder of the vertical pallet stack; supporting the remainder of the vertical pallet stack above the support surface at a support position; lifting the remainder of the vertical pallet stack from the support position to an elevated position; supporting the remainder of the vertical pallet stack at the elevated position; removing a dispensed pallet so that the dispensed pallet is no longer in overlying relationship with the remainder of the vertical pallet stack; allowing the remainder of the vertical pallet stack to fall from the elevated position towards the support surface under the influence of gravity after removing the dispensed pallet; dampening the fall of the remainder of the vertical pallet stack towards the support surface; dispensing a lower most pallet from the bottom end of the remainder of the vertical pallet stack; supporting the dispensed lower most pallet on the support surface; lifting an un-dispensed remainder of the vertical pallet stack after the step of dispensing to the support position; and supporting the un-dispensed remainder of the vertical pallet stack at the support position after lifting the un-dispensed remainder of the vertical pallet stack after dispensing to the support position. Clause (42): a method of establishing a vertical pallet stack and dispensing at least one pallet from a bottom end of the vertical pallet stack, the method of any clause mentioned in this paragraph, further comprising (if so desired) dispensing another pallet. Clause (43): a method of establishing a vertical pallet stack and dispensing at least one pallet from a bottom end of the vertical pallet stack, the method of any clause mentioned in this paragraph, further comprising (if so desired) removing the pallet is performed at substantially floor level by a pallet truck. Clause (44): a method of establishing a vertical pallet stack and dispensing at least one pallet from a bottom end of the vertical pallet stack, the method of any clause mentioned in this paragraph, further comprising (if so desired) modifying a range of motion to be an entire range of motion from the elevated position to the support surface. Clause (45): a method of establishing a vertical pallet stack and dispensing at least one pallet from a bottom end of the vertical pallet stack, the method of any clause mentioned in this paragraph, further comprising (if so desired) having the support surface include the support surface of an automated pallet handling system. Clause (46): a method of establishing a vertical pallet stack and dispensing at least one pallet from a bottom end of the vertical pallet stack, the method of any clause mentioned in this paragraph, further comprising (if so desired) having a pallet truck utilized to perform the lifting of the remainder of the vertical pallet stack from the support position to the elevated position. Clause (47): a method of establishing a vertical pallet stack and dispensing at least one pallet from a bottom end of the vertical pallet stack, the method of any clause mentioned in this paragraph, further comprising (if so desired) having a pallet truck utilize the dispensed pallet being dispensed from the bottom end of the vertical pallet stack on the support surface in the overlying relationship to the remainder of the vertical pallet stack, to lift the remainder of the vertical pallet stack. Clause (48): a method of establishing a vertical pallet stack and dispensing at least one pallet from a bottom end of the vertical pallet stack, the method of any clause mentioned in this paragraph, further comprising (if so desired) lifting the un-dispensed remainder of the vertical pallet stack after the step of dispensing to the support position is performed by at least one biasing member.

In view of the foregoing description, the following clauses are provided to summarize the above detailed description: Clause (1): a method is provided for dispensing pallets. An unpowered pallet dispenser 2 contains a stack of pallets. A pallet transporter 56 such as a pallet jack engages a pallet in the pallet stack 12. In some examples, the pallet transporter 56 may engage the bottom pallet of the pallet stack 12. The pallet transporter 56 then raises the pallet stack 12. The pallet dispenser 2 secures the pallet stack 12 such that one or more pallets, including the pallet engaged by the pallet transporter 56, can be separated from the pallet stack 12. The pallet transporter 56 then lowers the one or more pallets such that the one or more pallets are separated from the pallet stack 12. Once separated, the one or more pallets can be removed from the pallet dispenser 2. The pallet dispenser 2 then uses the weight of the pallet stack 12 to lower the pallet stack 12 so that the pallet stack 12 can be engaged by the pallet transporter 56. In those examples where the pallet transporter 56 engages the bottom pallet, the pallet stack 12 is lowered to the work surface 8. In some examples, the work surface 8 is the floor. Clause (2): an unpowered pallet dispenser 2 is provided. The unpowered pallet dispenser 2 includes a stationary support frame 59 and movable frame 510 for securing a pallet stack 12. The stationary support frame 59 supports the movable frame 510. The movable frame 510 has a raised position 30 and a lowered position 32. A pallet transporter 56 is used to raise the movable frame 510 to its raised position 30. When the movable frame 510 is in the raised position 30 one or more pallets can be separated from the pallet stack 12 by the pallet transporter 56. The one or more pallets can then be removed by the pallet transporter 56. The weight of the movable frame 510 and the pallet stack 12 is then used to lower the movable frame 510 to the lowered position 32. Clause (3): a system is provided for dispensing pallets. The system includes an unpowered pallet dispenser 2, a pallet enclosure, and a pallet transporter 56. Clause (4): a method for dispensing pallets is provided. The method includes engaging a pallet stack 12 stored in an unpowered pallet dispenser 2 using a pallet transporter 56. The unpowered pallet dispenser 2 includes a raised state 30 and a lowered state 32, and a securing mechanism configured to releasably secure the pallet stack 12. The pallet transporter 56 is configured to raise and lower a load (a pallet stack 12). The method also includes raising the pallet stack 12 using the pallet transporter 56. The unpowered pallet dispenser 2 transitioning to a raised state 30 when the pallet stack 12 is raised. The method further includes securing the pallet stack 12 using the securing mechanism so that one or more pallets are separable from the pallet stack 12. The method further includes separating one or more pallets from the pallet stack 12 by lowering the pallet transporter 56. The method further includes removing the one or more pallets from the pallet dispenser 2 using the pallet transporter 56. The method further includes lowering the pallet stack 12 using the weight of the pallet stack 12. The unpowered pallet dispenser 2 transitions to a lowered state 32 when the pallet stack 12 is lowered. Clause (4): the step of securing may include securing the pallet stack 12 immediately above the one or more pallets to be separated from the pallet stack. Clause (5): the securing device may include one or more spring-loaded latches for releasably securing the pallet stack 12. Clause (6): the lowering of the pallet stack 12 may be dampened using one or more dampeners. Clause (7): the one or more dampeners may include one or more hydraulic cylinders fillable with a compression-resistant fluid contained in a closed-loop hydraulic circuit 430. Clause (8): the pallet dispenser 2 may secure the pallet stack 12 before the pallet stack 12 is raised. Clause (9): the unpowered pallet dispenser 2 may include raisers for transitioning the unpowered pallet dispenser 2 to a ready state after the lowered state 32 where the pallet stack 12 is secured so that one or more pallets are separable from the pallet stack 12 when the unpowered pallet dispenser 2 is in the raised state 30. Clause (10): the raisers may include one or more cylinders filled with a compressible gas. Clause (11): the pallet dispenser 2 may secure the pallet stack 12 while the pallet stack 12 is being raised. Clause (12): the pallet dispenser 2 may secure the pallet stack 12 after the pallet stack 12 is raised but before the pallet stack 12 is lowered. Clause (13): the pallet stack 12 may be lowered while the one or more pallets are removed from the pallet dispenser 2 using the pallet transporter 56. Clause (14): the pallet stack 12 may be lowered after the one or more pallets are removed from the pallet dispenser 2 using the pallet transporter 56. Clause (15): a pallet dispenser 2 is provided. The pallet dispenser 2 includes a stationary support frame 59 having a front side, a back side, and a first side and a second side. The front side, the back side, and first side and the second side form an enclosure enclosing a pallet stack 12. The stationary support frame 59 is configured to allow for at least one pallet to be removed from the pallet stack 12 through at least one of the sides of the stationary support frame 59. The pallet dispenser 2 also includes a movable frame 510 that is movably connected to the stationary support frame 59. The movable frame 510 is movable between a raised position 30 and a lowered position 32. The movable frame 510 includes a securing device configured to releasably secure the pallet stack 12 so that one or more pallets are separable from the pallet stack 12 when the movable frame 510 is raised to the raised position 30. The movable frame 510 transitioning to a lowered position 32 when the one or more pallets have been separated from the pallet stack 12. Wherein a pallet transporter 56 is used to raise the movable frame 510 to the raised position 30 and to remove the at least one pallet from the stationary support frame 59 and movable frame 510. Clause (16): the securing device may include one or more latches for engaging one or more pallets in the pallet stack 12. Clause (16A): the pallet stack 12 may be secured by having the one or more latches engage the pallet immediately above the bottom pallet in the pallet stack 12. Clause (17): the latch 40 may include an arm 720 hingedly connected to the movable frame 510. A spring connects the arm 720 to the movable frame 510. A dog 700 is connected to the arm 720 for engaging the pallet stack 12. The arm 720 is configured to interact with the stationary support frame 59 so that when the movable frame 510 is raised to the raised position 30, the dog 700 engages the pallet stack 12. When the movable frame 510 is in the lowered position 32 the dog 700 disengages the pallet stack 12. Clause (18): the pallet dispenser 2 may include one or more dampening devices for dampening the lowering of the pallet stack 12 when the movable frame 510 transitions from the raised position 30 to the lowered position 32. Clause (19): the dampening device may include an adjustment device for adjusting the rate at which the movable frame 510 transitions from the raised position 30 to the lowered position 32. Clause (20): the one or more dampening devices may include one or more telescoping hydraulic cylinders 52. The one or more telescoping hydraulic cylinders 52 are fillable with a compression-resistant hydraulic fluid. A hydraulic circuit 58 contains a compression-resistant hydraulic fluid. The one or more telescoping hydraulic cylinders 52 are in fluid communication with the hydraulic circuit 58. As the movable frame 510 is raised, the one or more telescoping hydraulic cylinders 52 are filled with the compression-resistant hydraulic fluid from the hydraulic circuit 58. As the movable frame 510 is lowered, the compression-resistant hydraulic fluid drains from the one or more telescoping hydraulic cylinders 52 to the hydraulic circuit 58. Clause (21): the pallet dispenser 2 may include a raising device for raising the movable frame 510 from the lowered position 32 to a ready position. The ready position is configured between the raised position 30 and lowered position 32. The securing device secures the pallet stack 12 when the movable frame 510 is in the ready position. Clause (22): the raising device may include one or more telescoping hydraulic cylinders 52 filled with a compressible gas. Clause (23): a system for dispensing pallets is provided. The system includes a pallet transporter 56 for raising and transporting one or more pallets, a pallet dispenser 2 for dispensing pallets; and a pallet-stack enclosure 4 for enclosing a pallet stack 12. Clause (24): a method for dispensing pallets, and the method includes: operation (A), including engaging a pallet stack 12 stored in an unpowered pallet dispenser 2 using a pallet transporter 56. The unpowered pallet dispenser 2 includes a raised state 30 and a lowered state 32, and a securing mechanism for releasably securing the pallet stack 12, and the pallet transporter 56 capable of raising and lowering a load. Operation (B), including raising the pallet stack 12 using the pallet transporter 56, the unpowered pallet dispenser 2 transitioning to a raised state 30 when the pallet stack 12 is raised. Operation (C), including securing the pallet stack 12 using the securing mechanism so that one or more pallets are separable from the pallet stack 12. Operation (D), including separating one or more pallets from the pallet stack 12 by lowering the pallet transporter 56. Operation (E), including removing the one or more pallets from the pallet dispenser 2 using the pallet transporter 56. Operation (F), including lowering the pallet stack 12 using the weight of the pallet stack 12, the unpowered pallet dispenser 2 transitioning to a lowered state 32 when the pallet stack 12 is lowered. Clause (25): the method of clause (24), wherein the operation of securing the pallet stack 12 using the securing mechanism includes securing the pallet stack 12 immediately above the one or more pallets to be separated from the pallet stack. Clause (26): the method of clause (24), wherein the securing device includes one or more spring 1200-loaded latches for releasably securing the pallet stack 12. Clause (27): the method of clause (25), wherein the securing device includes one or more spring 1200-loaded latches for releasably securing the pallet stack 12. Clause (28): the method of clause (24), wherein the lowering of the pallet stack 12 is dampened using one or more dampeners. Clause (29): the method of clause (28), wherein the one or more dampeners includes one or more hydraulic cylinders fillable with a compression-resistant fluid contained in a closed-loop hydraulic circuit 430. Clause (30): the method of clause (24), wherein the pallet dispenser 2 secures the pallet stack 12 before the pallet stack 12 is raised. Clause (31): the method of clause (24), wherein the unpowered pallet dispenser 2 includes raisers for transitioning the unpowered pallet dispenser 2 to a ready state after the lowered state 32, and the pallet stack 12 is secured so that one or more pallets are separable from the pallet stack 12 when the unpowered pallet dispenser 2 is in the raised state 30. Clause (32): the method of clause (31), wherein the raisers include one or more cylinders filled with a compressible gas. Clause (33): the method of clause (24), wherein the pallet dispenser 2 secures the pallet stack 12 while the pallet stack 12 is being raised. Clause (34): the method of clause (24), wherein the pallet dispenser 2 secures the pallet stack 12 after the pallet stack 12 is raised but before the pallet stack 12 is lowered. Clause (35): the method of clause (24), wherein the pallet stack 12 is lowered while the one or more pallets are removed from the pallet dispenser 2 using the pallet transporter 56. Clause (36): the method of clause (24), wherein the pallet stack 12 is lowered after the one or more pallets are removed from the pallet dispenser 2 using the pallet transporter 56. Clause (37): a pallet dispenser 2, including: a support 600 frame having a front side, a back side, and a first side and the second side; the front side, back side, and first side and the second side forming an enclosure enclosing a pallet stack 12; the stationary support frame 59 configured to allow for at least one pallet to be removed from the pallet stack 12 through at least one of the sides of the stationary support frame 59; and a movable frame 510 movably connected to the stationary support frame 59, the movable frame 510 movable between a raised position and a lowered position 32; the movable frame 510 including a securing device for releasably securing the pallet stack 12 so that one or more pallets are separable from the pallet stack 12 when the movable frame 510 is being raised to the raised position 30; and the movable frame 510 transitioning to a lowered position 32 when the one or more pallets have been separated from the pallet stack 12; wherein a pallet transporter 56 is used to raise the movable frame 510 to the raised position 30 and to remove the at least one pallet from the stationary support frame 59 and movable frame 510. Clause (38): the pallet dispenser 2 of clause (37), wherein the securing device includes one or more latches for engaging one or more pallets in the pallet stack 12. Clause (39): the pallet dispenser 2 of clause (38), wherein the pallet stack 12 secures the pallet stack 12 by having the one or more latches engage the pallet immediately above the bottom pallet in the pallet stack 12. Clause (40): the pallet dispenser 2 of clause (39), wherein the latch 40 includes an arm 720 hingedly connected to the movable frame 510; a spring 1200 connecting the arm 720 to the movable frame 510; a dog 700 connected to the arm 720 for engaging the pallet stack 12; the arm 720 configured to interact with the stationary support frame 59 so that when the movable frame 510 is being raised to the raised position 30, the dog 700 engages the pallet stack 12; and when the movable frame 510 is in the lowered position 32 the dog 700 disengages the pallet stack 12. Clause (41): the pallet dispenser 2 of clause (37), wherein: the pallet dispenser 2 includes one or more dampening devices for dampening the lowering of the pallet stack 12 when the movable frame 510 transitions from the raised position 30 to the lowered position 32. Clause (42): the pallet dispenser 2 of clause (41), wherein: the one or more dampening devices includes an adjustment device for adjusting the rate at which the movable frame 510 transitions from the raised position 30 to the lowered position 32. Clause (43): the pallet dispenser 2 of clause (41), wherein the one or more dampening devices includes one or more telescoping cylinders; the one or more telescoping cylinders fillable with a compression-resistant hydraulic fluid; a hydraulic circuit 58 containing a compression-resistant hydraulic fluid, the one or more telescoping cylinders in fluid communication with the hydraulic circuit 58; as the movable frame 510 is being raised, the one or more telescoping cylinders are filled with the compression-resistant hydraulic fluid from the hydraulic circuit 58; and as the movable frame 510 is being lowered, the compression-resistant hydraulic fluid drains from the one or more telescoping cylinders to the hydraulic circuit 58. Clause (44): the pallet dispenser 2 of clause (37), further including: a raising device for raising the movable frame 510 from the lowered position 32 to a ready position, the ready position configured between the raised position and the lowered position 32, and the securing device securing the pallet stack 12 when the movable frame 510 is in the ready position. Clause (45): the pallet dispenser 2 of clause (44), wherein the raising device includes one or more telescoping cylinders filled with a compressible gas, or counterweights. Clause (46): a system for dispensing pallets, the system including: a pallet transporter 56 for raising and transporting one or more pallets; a pallet dispenser 2 for dispensing pallets; and a pallet-stack enclosure 4 for enclosing a pallet stack 12.

It may be appreciated that the assemblies and modules described above may be connected with each other as may be used to perform desired functions and tasks that are within the scope of persons of skill in the art to make such combinations and permutations without having to describe each and every one of them in explicit terms. There is no particular assembly, or components that are superior to any of the equivalents available to the art. There is no particular mode of practicing the disclosed subject matter that is superior to others, so long as the functions may be performed. It is believed that all the crucial aspects of the disclosed subject matter have been provided in this document. It is understood that the scope of the present invention is limited to the scope provided by the independent claim(s), and it is also understood that the scope of the present invention is not limited to: (i) the dependent claims, (ii) the detailed description of the non-limiting embodiments (examples), (iii) the summary, (iv) the abstract, and/or (v) the description provided outside of this document (that is, outside of the instant application as filed, as prosecuted, and/or as granted). It is understood, for the purposes of this document, that the phrase "includes" is equivalent to the word "comprising." It is noted that the foregoing has outlined the non-limiting embodiments (examples). The description is made for particular non-limiting embodiments (examples). It is understood that the non-limiting embodiments are merely illustrative as examples.

It is obvious that the foregoing embodiments of the invention are examples and can be varied in many ways. Such present or future variations are not to be regarded as a departure from the scope of the invention, and all such modifications as would be obvious to one skilled in the art are intended to be included within the scope of the following claims.

What is claimed is:

1. A method for dispensing a pallet from a stack of pallets fitted on a vertically-movable frame within a pallet-stack enclosure, in cooperation with a pallet transport device, comprising the steps of:

latching the frame to a first pallet in the stack of pallets while the stack of pallets is in a storage position on a work surface;

engaging a second pallet in the stack of pallets below the latched first pallet with the pallet transport device;

raising the frame and the stack of pallets with the pallet transport device to place the stack of pallets in a dispensing position;

lowering the second pallet with the pallet transport device relative to the latched first pallet to release the second pallet from the stack of pallets; and withdrawing the released second pallet from the frame with the pallet transport device.

2. The method of claim 1 further comprising:

detecting a position of the pallet transport device; and automatically lowering the frame and the stack of pallets from the dispensing position to the storage position in response to detecting that the pallet transport device reached a predetermined position relative to the frame.

3. The method of 2, wherein the step of detecting the pallet transport device position comprises providing a photocell that determines when the pallet transport device is no longer beneath the pallet stack.

4. The method of claim 1 wherein latches extend into and vertically engage the first pallet while the frame and the stack of pallets is raised by the pallet transport device.

5. The method of claim 1 further comprising:

unlatching the frame from the stack of pallets after the second pallet is withdrawn; and automatically raising the frame relative to the stack of pallets which automatically latches the frame to a third pallet in the stack of pallets above the first pallet.

6. The method of claim 5, wherein at least one compressed spring automatically extends when the frame is unlatched from the stack of patents to raise the frame relative to the stack of patents.

7. The method of claim 1, wherein the step of latching the frame to a first pallet comprises latching the frame with at least one dog as the at least one dog moves upward relative to the stack of patents.

8. The method of claim 1, wherein the second pallet engages the first pallet.

* * * * *